US012750457B1

(12) United States Patent
Lafnoune

(10) Patent No.: US 12,750,457 B1
(45) Date of Patent: Sep. 29, 2026

(54) CREATING PACKAGED VIDEO SEGMENTS HAVING INTERACTIVE OVERLAYS WITH DEFINABLE USER PATHS

(71) Applicant: ViralGains Inc., Boston, MA (US)

(72) Inventor: Safaa Lafnoune, Sharon, MA (US)

( * ) Notice: Subject to any disclaimer, the term of this patent is extended or adjusted under 35 U.S.C. 154(b) by 315 days.

(21) Appl. No.: 18/346,140

(22) Filed: Jun. 30, 2023

Related U.S. Application Data

(60) Provisional application No. 63/367,482, filed on Jun. 30, 2022.

(51) Int. Cl.

| | |
|---|---|
| ***H04N 5/265*** | (2006.01) |
| ***H04N 21/431*** | (2011.01) |
| ***H04N 21/472*** | (2011.01) |
| ***H04N 21/845*** | (2011.01) |
| ***H04N 21/858*** | (2011.01) |

(52) U.S. Cl.
CPC ........... *H04N 5/265* (2013.01); *H04N 21/431* (2013.01); *H04N 21/47217* (2013.01); *H04N 21/8456* (2013.01); *H04N 21/858* (2013.01)

(58) Field of Classification Search
CPC ........... H04N 21/431; H04N 21/47217; H04N 21/8456; H04N 21/858; G06F 3/0482; G06F 3/04842
See application file for complete search history.

(56) References Cited

FOREIGN PATENT DOCUMENTS

CN 102591574 A * 7/2012 ....... H04N 21/47217

OTHER PUBLICATIONS

Baid, "Adobe Captivate Quiz Result Analyzer", Adobe Blog published on Aug. 20, 2010 https://elearning.adobe.com/2010/08/adobe-captivate-quiz-result-analyzer/ (Year: 2010).*

Adobe Digital Learning, "Tutorial: Branch-aware Quiz", Uploaded to YouTube on Jun. 15, 2012 https://www.youtube.com/watch?v=C-_Ja8vIZQw (Year: 2012).*

VestergaardCo, "Tracking & Reporting Quiz Results with Adobe Captivate and Quiz Result Analyzer", Uploaded to YouTube on Mar. 21, 2012 (Year: 2012).*

(Continued)

*Primary Examiner* — Kee M Tung
*Assistant Examiner* — Thang Gia Huynh
(74) *Attorney, Agent, or Firm* — Outside General Counsel, LLP; Alexander Franco

(57) ABSTRACT

A design-user can use a design interface to create packaged video segments, which the design-user can then schedule and/or configure for distribution and/or presentation to various target end-users. Interactive overlays that are displayed to overlay video content and through which end-users can interact with the packaged video segment can be configured through the design interface. A source interactive overlay can be configured to cause display of a target overlay in response to a defined interaction by an end-user with the source interactive overlay during playback of the video segment. Links between source and target overlays can be displayed in a schematic representation along with a timeline corresponding to a duration of the video segment. Display of a target overlay can alternatively be triggered based on a rule comprising a combination of one or more interactions by and end-user with previously presented interactive overlays.

20 Claims, 62 Drawing Sheets

(56) References Cited

OTHER PUBLICATIONS

Paul Wilson's eLearning Tutorials, "Adobe Captivate—Adding a Timer Using Learning Interactions" Uploaded to YouTube on Jul. 7, 2015 https://www.youtube.com/watch?v=yrFSnNqLmu8 (Year: 2015).*
Adobe Digital Learning, "Advanced Actions with Adobe Captivate (2017 Release)" Uploaded to YouTube on Feb. 12, 2018 https://www.youtube.com/watch?v=UJJxEpJwyek (Year: 2018).*
Adobe Digital Learning, "How to Create Interactive Videos with Adobe Captivate 2019" Uploaded to YouTube on Jun. 13, 2019 https://www.youtube.com/watch?v=Ri00HMIKVoc (Year: 2019).*
Paul Wilson's eLearning Tutorials, "Multiple Interactive Video Overlay Slides in Adobe Captivate Classic Update 2" Uploaded to YouTube on Jun. 26, 2019 https://www.youtube.com/watch?v=ibBVFEvodAw (Year: 2019).*
Adobe in a Minute, "How to Overlay Image in Premiere Pro", Jan. 28, 2020, https://www.youtube.com/watch?v=ZHbQiEJ7VOI (Year: 2020).*

* cited by examiner

1700

CREATING PACKAGED VIDEO SEGMENTS HAVING INTERACTIVE OVERLAYS WITH DEFINABLE USER PATHS

RELATED APPLICATIONS

The subject matter of this application is related to U.S. Provisional Application No. 63/367,482 filed on 2022 Jun. 30, which is hereby incorporated by reference in its entirety.

SUMMARY OF THE INVENTION

A design interface supports creation and management of packaged video segments. The design interface can include multiple web pages and/or frames that support various aspects of creating and/or managing the packaged video segments. The design interface can be supported, implemented and/or operated by a server computer system (also referred to herein as the "system") accessible over the Internet by a design-user (a user of the design interface) through a computer user interface using a web browser operating on a personal or desktop computing device. Other configurations, such as using an installed software program on a desktop computer, are also possible. The design-user can use the design interface to create packaged video segments, which the design-user can then schedule and/or configure for distribution and/or presentation to various target end-users.

Interactive overlays that are displayed to overlay video content and through which end-users can interact with the packaged video segment can be configured through the design interface. A source interactive overlay can be configured to cause display of a target overlay in response to a defined interaction by an end-user with the source interactive overlay during playback of the video segment. Links between source and target overlays can be displayed in a schematic representation along with a timeline corresponding to a duration of the video segment. Display of a target overlay can alternatively be triggered based on a rule comprising a combination of one or more interactions by and end-user with previously presented interactive overlays.

A method is performed by a computer system having at least one processor and a memory. The method includes: displaying to a design-user, through a computer user interface, a design interface for creating a packaged video segment having a plurality of overlays that overlay the video segment during presentation; receiving from the design-user through the design interface, for each of the overlays, a specification of the each overlay comprising: an overlay type; a timing for displaying the overlay; and a specification of at least one item of content for display within the overlay; wherein one or more of the plurality of overlays are interactive overlays, and wherein the received specification of each interactive overlay further comprises: a specification of at least one end-user selectable feature for inclusion within the interactive overlay; presenting to the design-user within the design interface a schematic representation of the plurality of overlays in conjunction with a timeline corresponding to a duration of the video segment, wherein one or more of the overlays is represented in the schematic representation by a visual indication along the timeline of a timing for displaying the overlay relative to playback of the video segment; and receiving from the design-user through the design interface, a specification of each of one or more links between overlays, wherein for each link of the one or more links between overlays: the link links an end-user selectable feature of a source interactive overlay to a target overlay; the link is visually indicated on the schematic representation; and during an end-user presentation of the packaged video segment, selection of an end-user selectable feature of the source interactive overlay by an end-user causes a display of the target overlay to the end-user.

The method can further include: receiving from the design-user through the user interface, for one finale overlay of the plurality of overlays, a specification indicating that the one finale overlay is to be presented upon completion of presentation of the video segment during the end-user presentation, in response to determining that the end-user has not interacted with any of the one or more interactive overlays.

The method can further include: receiving from the design-user through the user interface, for each of at least one overlay of the plurality of overlays, a no-interaction specification indicating that the each overlay is to be presented upon determining, during the end-user presentation of the packaged video segment, that the end-user has not yet interacted with any of the one or more interactive overlays.

The no-interaction specification for at least one overlay further can define a playback time during presentation of the packaged video segment by which it is to be determined whether the end-user has not yet interacted with any of the one or more interactive overlays.

The defined playback time for at least one overlay can correspond to an end of the video segment.

The timing for displaying the overlay for at least one of the plurality of overlays can be a timing relative to playback of the video segment.

The timing for displaying the overlay for at least one of the plurality of overlays can be a timing relative to selection of an end-user selectable feature of a source interactive overlay.

The method can further include: maintaining a set of warning rules defining disallowed combinations of overlays, wherein the set of warning rules comprises: a rule based on overlapping timing for displaying multiple overlays.

The set of warning rules can further comprise: a rule based on overlapping positioning for displaying multiple overlays.

The set of warning rules can further comprise: a rule based on overlapping positioning and timing for displaying multiple overlays.

The set of warning rules can account for links between overlays in determining whether multiple overlays can have overlapping positioning or timing.

The method can further include: presenting the packaged video segment to each end-user of a plurality of end-users, wherein the packaged video segment is presented to each end-user on a respective personal computing device; in response to presenting the packaged video segment to the each end-user, receiving from the respective personal computing device user responses collected in association with presentation of the packaged video segment to the end-user; aggregating user responses by the plurality of end-users; and presenting the aggregated user responses in the design interface.

The method can further include: displaying in the design interface a graph-based representation of the interactive overlays and one or more of the links between overlays showing all possible paths from a start of presentation of the packaged video segment to each interactive overlay, wherein the aggregated user responses for each interactive overlay are presented within a user interface feature representing the each interactive overlay as a node within the graph-based representation.

A method is performed by a computer system having at least one processor and a memory. The method includes: displaying to a design-user, through a computer user interface, a design interface for creating a packaged video segment having a plurality of overlays that overlay the video segment during presentation; receiving from the design-user through the design interface, for each of the overlays, a specification of the each overlay comprising: an overlay type; a timing for displaying the overlay; and a specification of at least one item of content for display within the overlay; wherein one or more of the plurality of overlays are interactive overlays, and wherein the received specification of each interactive overlay further comprises: a specification of at least one end-user selectable feature for inclusion within the interactive overlay; presenting to the design-user within the design interface a schematic representation of the plurality of overlays in conjunction with a timeline corresponding to a duration of the video segment, wherein one or more of the overlays is represented in the schematic representation by a visual indication along the timeline of a timing for displaying the overlay relative to playback of the video segment; and for at least one target overlay of the plurality of overlays, receiving from the design-user through the design interface, a specification of a rule comprising a logical combination of one or more conditions, wherein satisfaction of the logical combination of one or more conditions during presentation of the packaged video segment to an end-user triggers a display of the target overlay to the end-user, and wherein each of the one or more conditions defines a set of one or more end-user selectable features of a referenced source interactive overlay of the plurality of overlays for which selection by the end-user satisfies the condition.

The method can further include: for a referenced source interactive overlay of a target overlay, displaying on the schematic representation a visual link between the target overlay and the referenced source interactive overlay.

The method can further include: presenting the packaged video segment to each end-user of a plurality of end-users, wherein the packaged video segment is presented to each end-user on a respective personal computing device; in response to presenting the packaged video segment to the each end-user, receiving from the respective personal computing device user responses collected in association with presentation of the packaged video segment to the end-user; aggregating user responses by the plurality of end-users; and presenting the aggregated user responses in the design interface.

The memory of the computer system having at least one processor and a memory can have instructions stored thereon that are executed by the at least one processor and cause the computer system to perform any of the foregoing methods.

A non-transitory computer readable medium can have instructions stored thereon, wherein the instructions are executed by the least one processor and cause the at least one processor to perform any of the foregoing methods.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

Overview

A design interface supports creation and management of packaged video segments. The design interface can include multiple web pages and/or frames that support various aspects of creating and/or managing the packaged video segments. The design interface can be supported, implemented and/or operated by a server computer system (also referred to herein as the "system") accessible over the Internet by a design-user (a user of the design interface) through a computer user interface using a web browser operating on a personal or desktop computing device. Other configurations, such as using an installed software program on a desktop computer, are also possible. The design-user can use the design interface to create packaged video segments, which the design-user can then schedule and/or configure for distribution and/or presentation to various target end-users.

Interactive overlays that are displayed to overlay video content and through which end-users can interact with the packaged video segment can be configured through the design interface. A source interactive overlay can be configured to cause display of a target overlay in response to a defined interaction by an end-user with the source interactive overlay during playback of the video segment. Links between source and target overlays can be displayed in a schematic representation along with a timeline corresponding to a duration of the video segment. Display of a target overlay can alternatively be triggered based on a rule comprising a combination of one or more interactions by and end-user with previously presented interactive overlays.

Design User Interface

Figure 1:
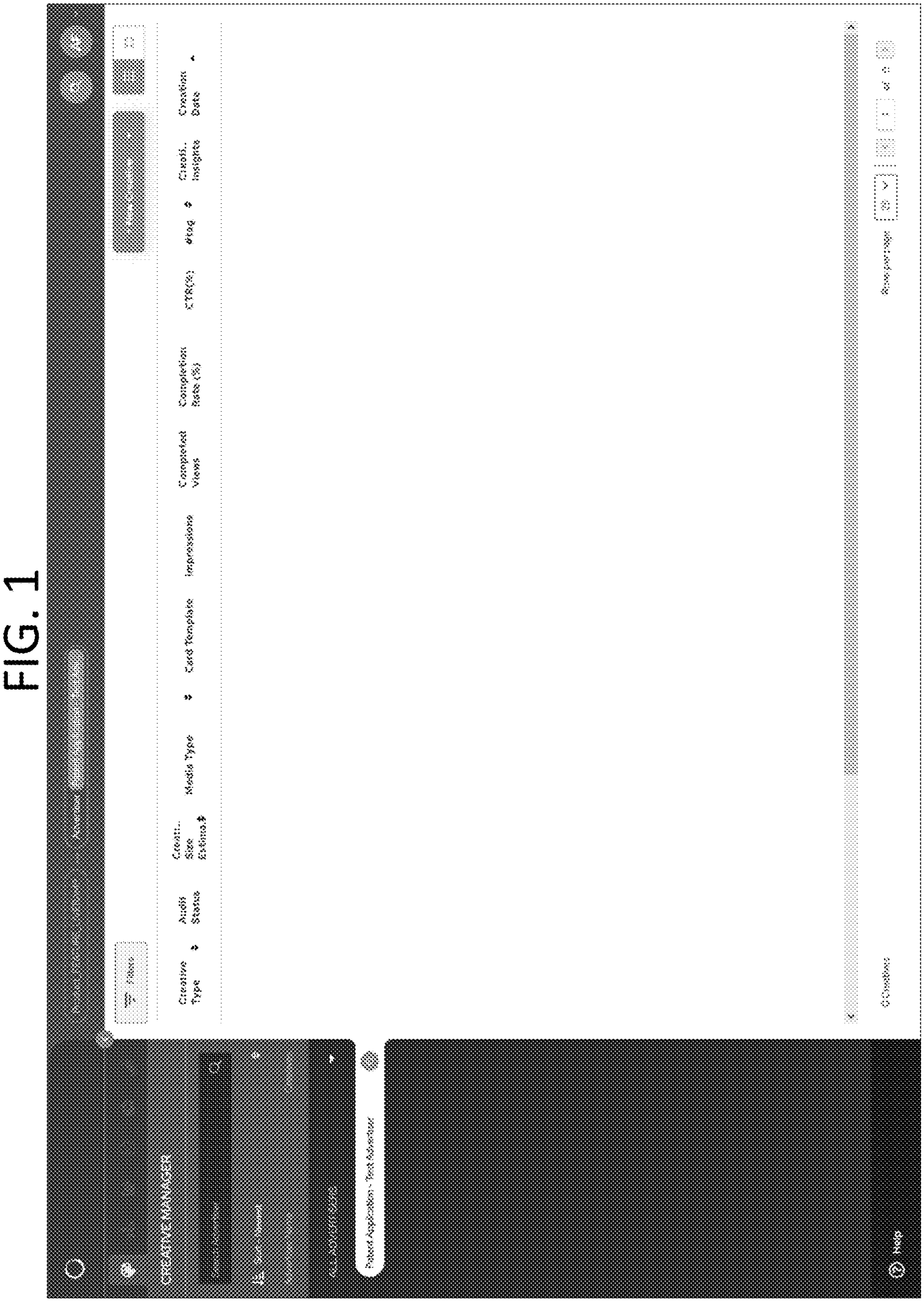
FIGS. 1, 2A-D, 3A-J, 4A-G, 5A-E, 6A-E, 7A-D, 8A-G, and 9A-E show various screenshots of web pages of a design interface in accordance with one embodiment.

FIG. 1 illustrates a creative manager portion of a design interface that lists various packaged video segments along with statistics, such as completed views, relating to the presentation of various packaged video segments to end-users. In the illustrated figure no packaged video segments have yet been created, and the design-user next selects the "+New Creative" button to start creation of a new packaged video segment.

Figure 2A:
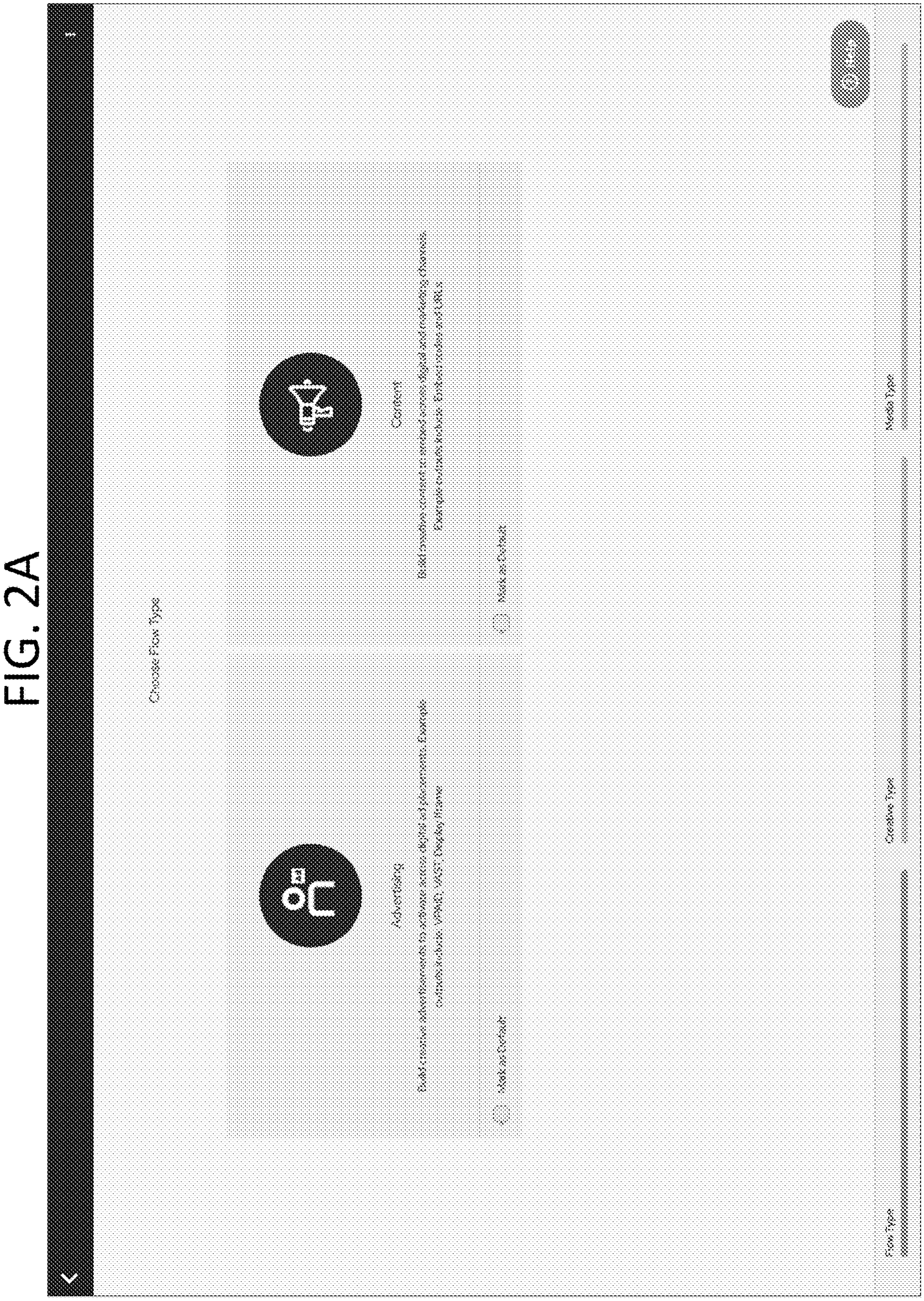

FIG. 2A illustrates a first page shown to the design-user on a "Creative Setup" tab after selecting the "+New Creative" button, where the design-user is prompted to elect whether they want to create a packaged video segment configured for advertising or for content. The advertising option is intended to be used to build creative advertisements that are designed for activation across digital ad placements. The content option is intended for use outside of advertising environments, allowing for creatives to be embedded and shared directly on a brand's website, as well as across digital and marketing channels. In the illustrated page, the design-user selects "Advertising".

Figure 2B:
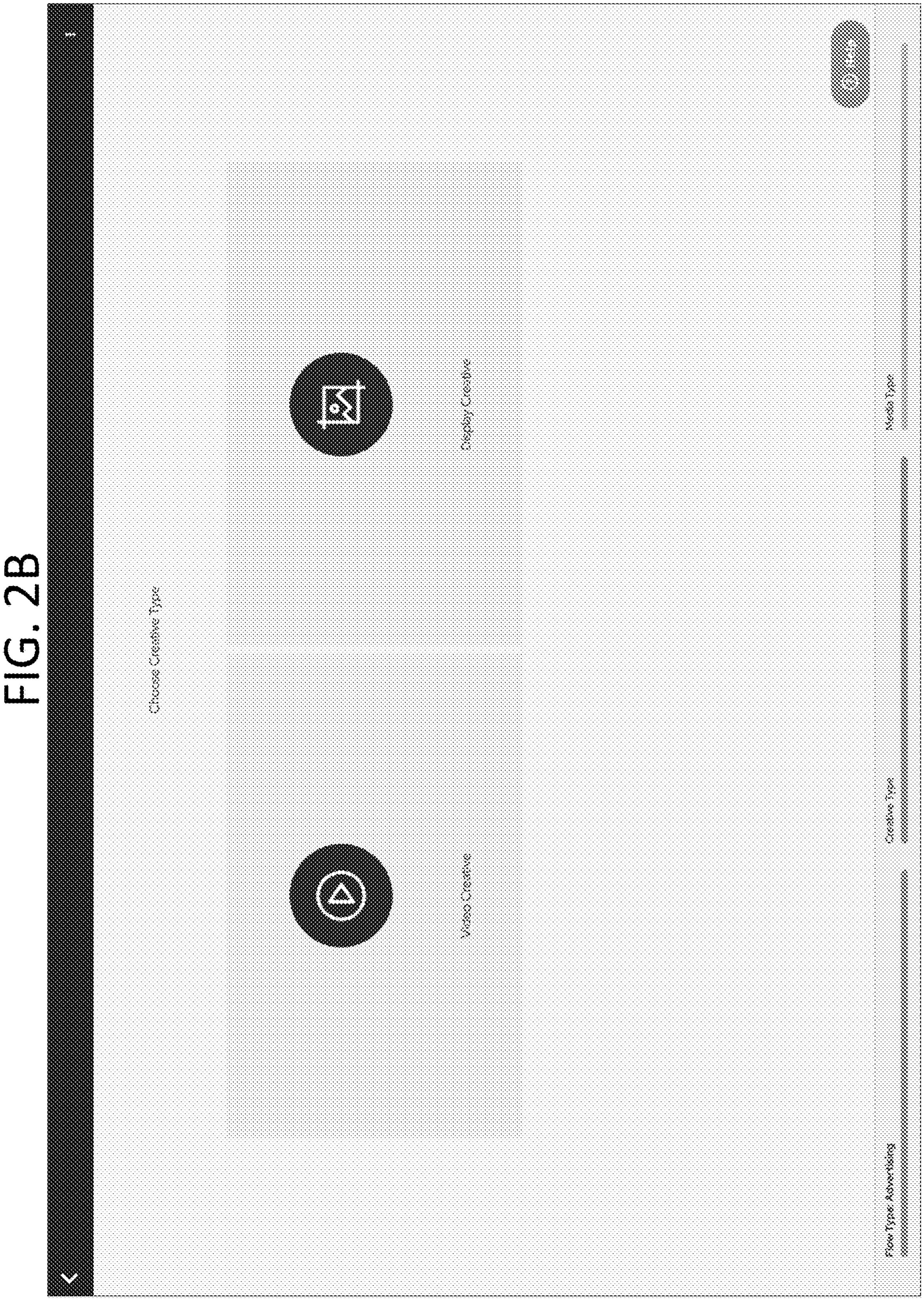
Figure 2C:
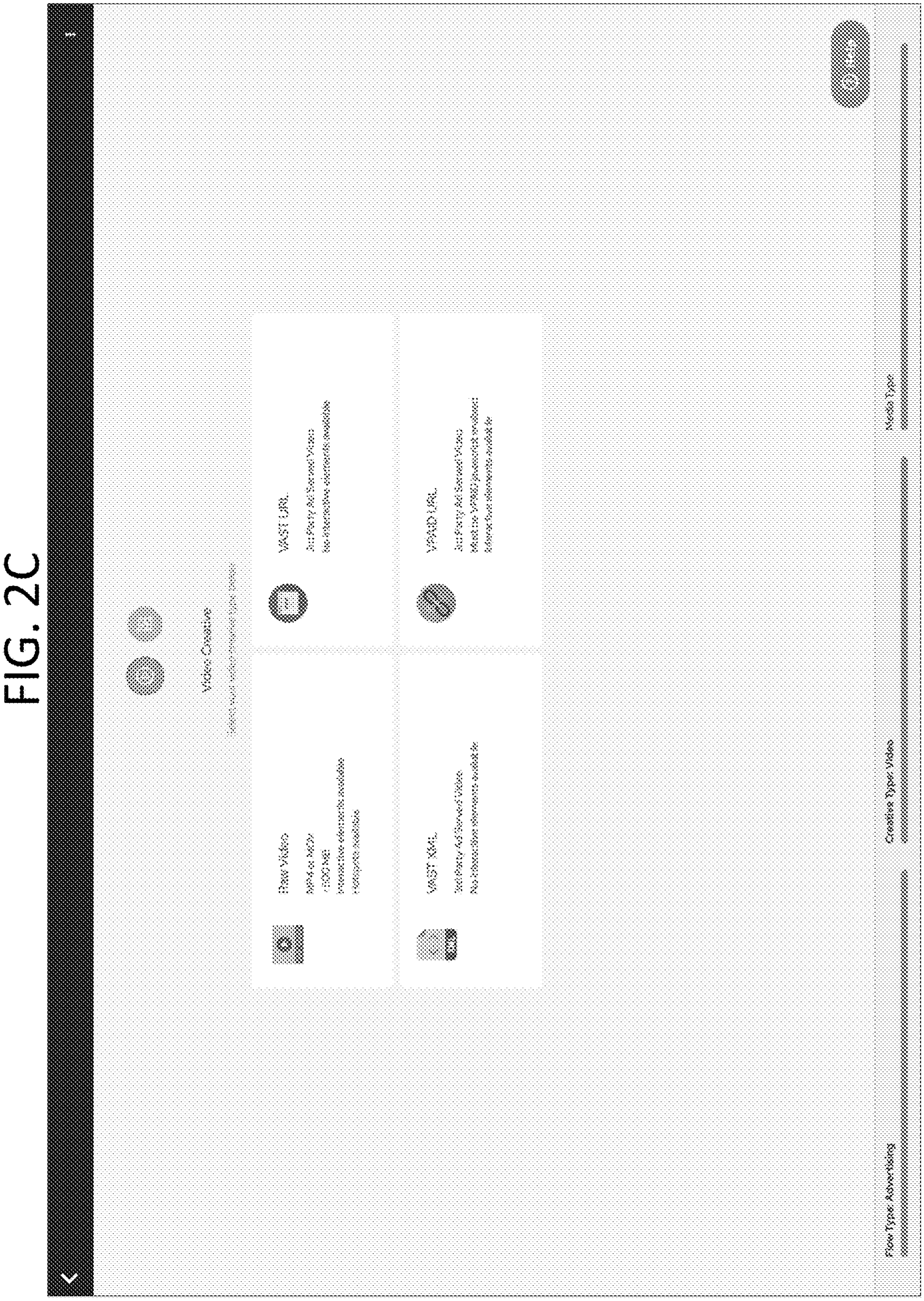
Figure 2D:
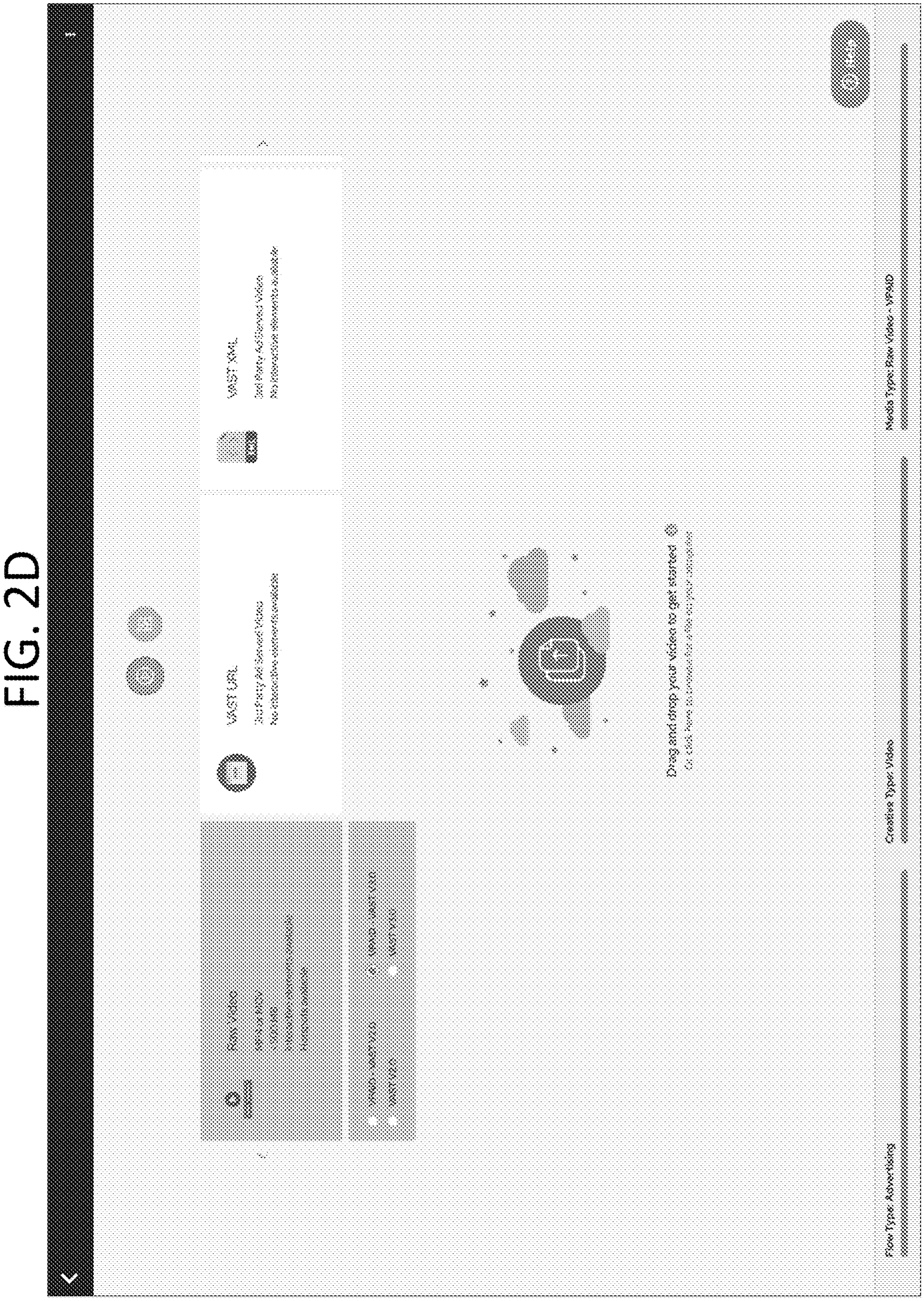

FIG. 2B illustrates a next page shown to the design user in which the design-user selects "Video Creative" to create a packaged video segment as opposed to a "Display Creative", which would be for a display advertisement. FIG. 2C illustrates a next page in which the design-user selects "Raw Video", since the user in this case will upload a raw video file to serve as the basis of the packaged video segment, but other options are available as shown. FIG. 2D illustrates a next page that enables the design-user to upload a selected video file to serve as the basis of the packaged video segment.

Figure 3A:
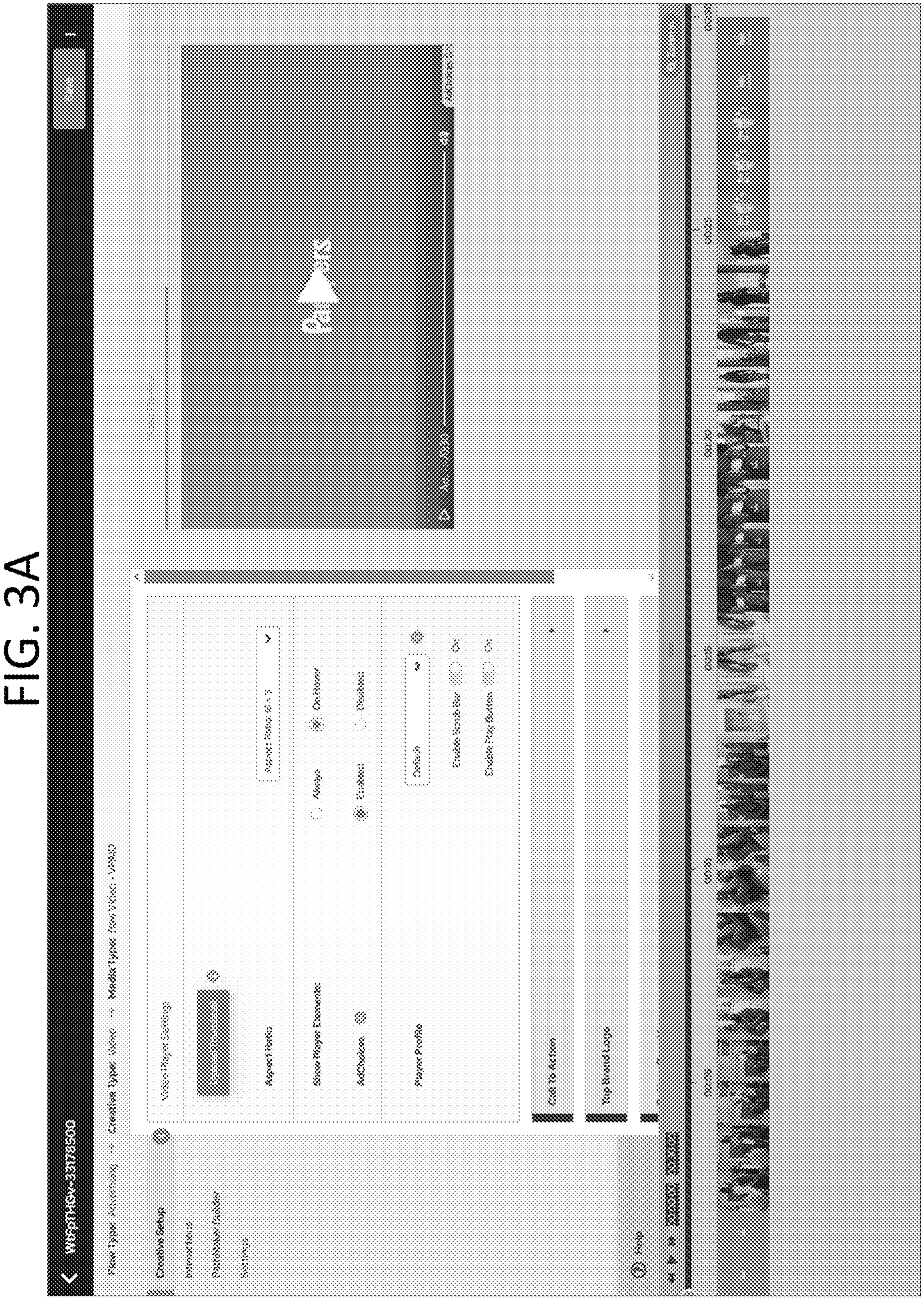

FIG. 3A illustrates a first page shown to the design-user in the design interface after uploading or otherwise selecting or identifying a video segment to serve as the basis of the packaged video segment. The center left portion of the page shows an expanded "Video Player Settings" area that permits the design-user to configure various aspects of the video segment during playback to an end-user, such as the aspect ratio and whether to display a scrub bar and/or a play button. The right portion of the page shows a video player that allows the design-user to preview the uploaded video segment as configured.

Figure 3B:
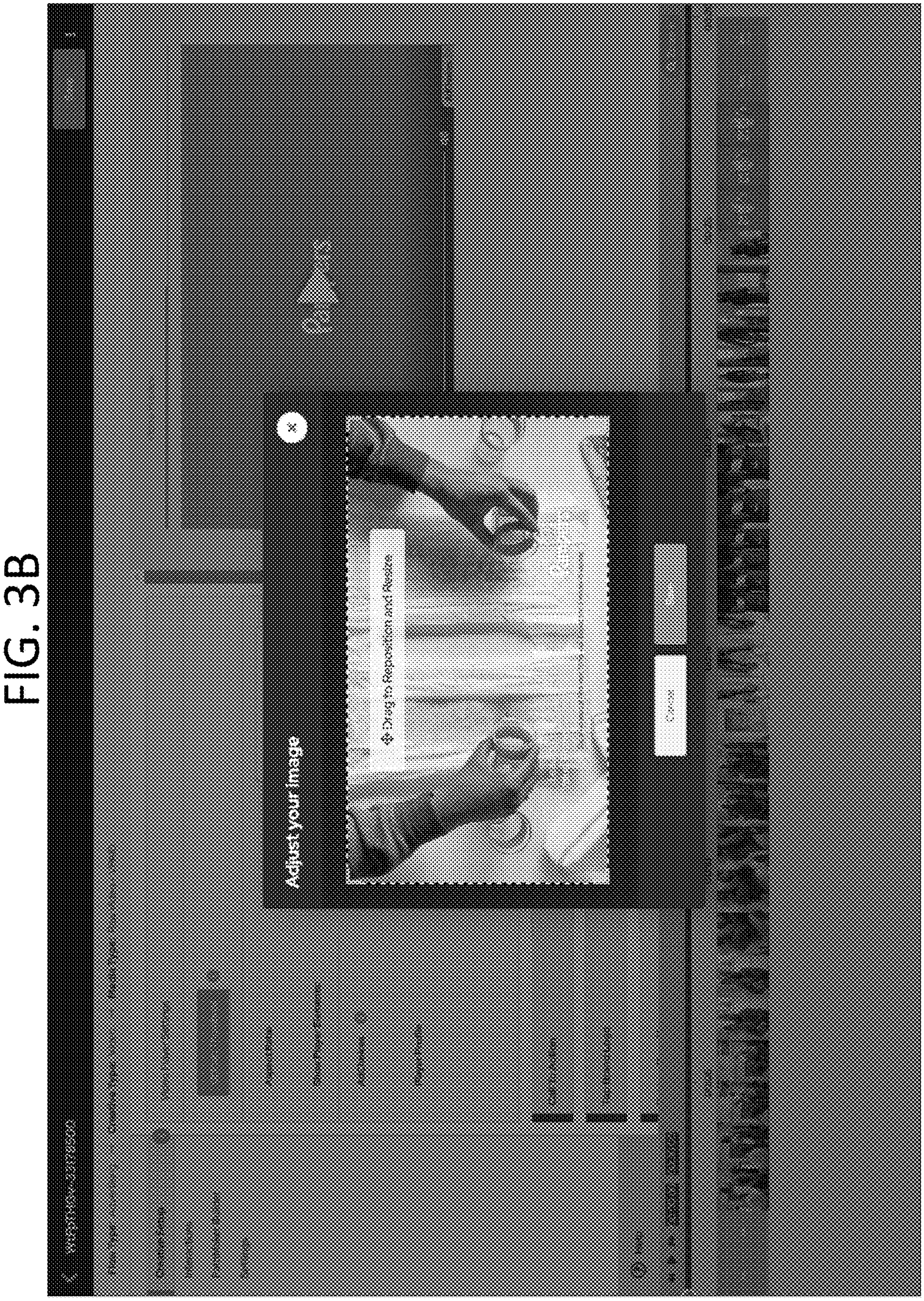
Figure 3C:
Figure 3D:

FIG. 3B illustrates a page shown to the design-user after selecting the "Upload Thumbnail" option for the video segment and selecting an image for upload. FIG. 3C illustrates a page shown after the design user uploads and positions the thumbnail for the selected video. FIG. 3D illustrates a page showing the "Creative Setup" tab with its frame scrolled down to show additional options for configuring the presentation of the selected or uploaded video segment.

Figure 3E:
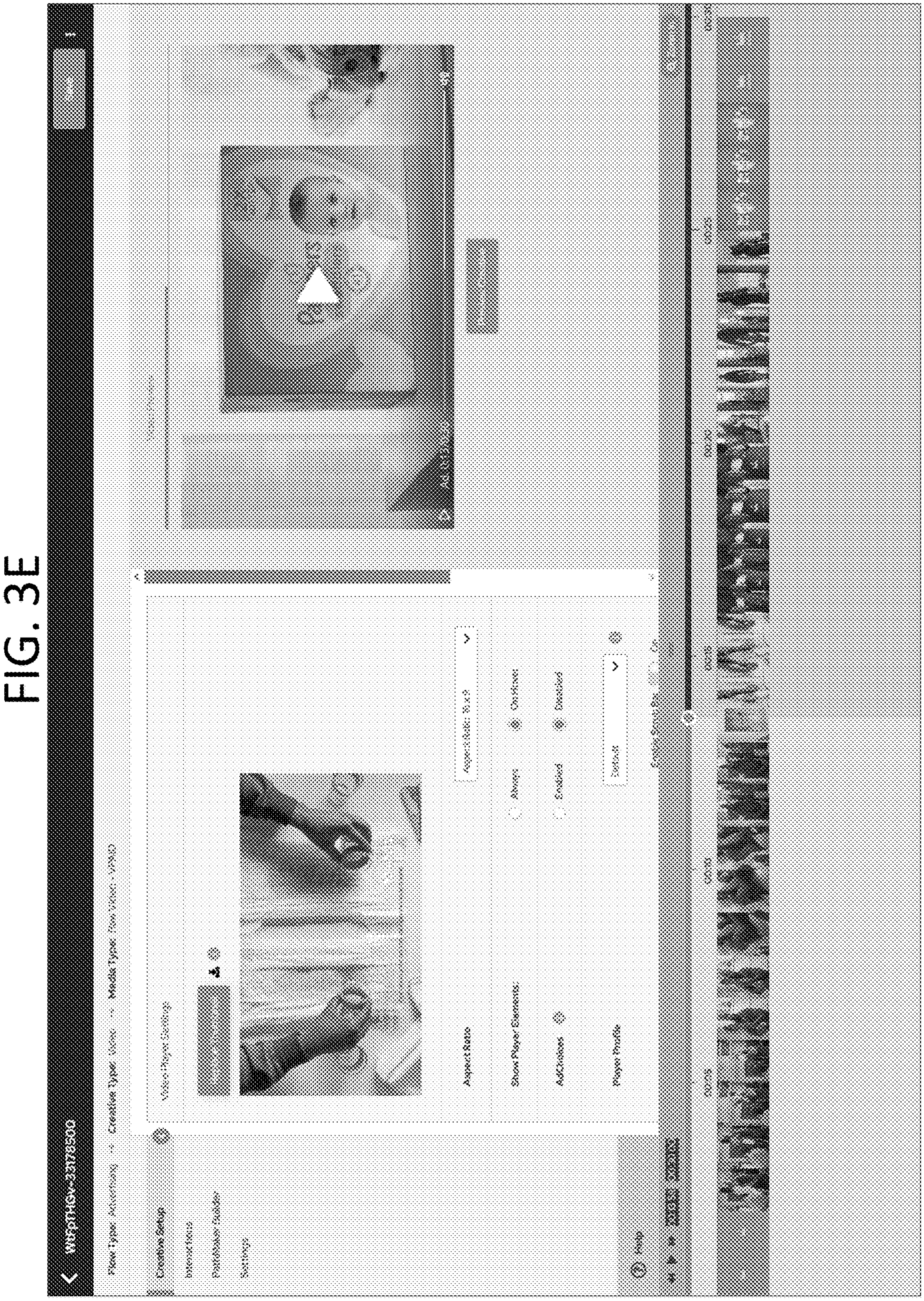
Figure 3F:
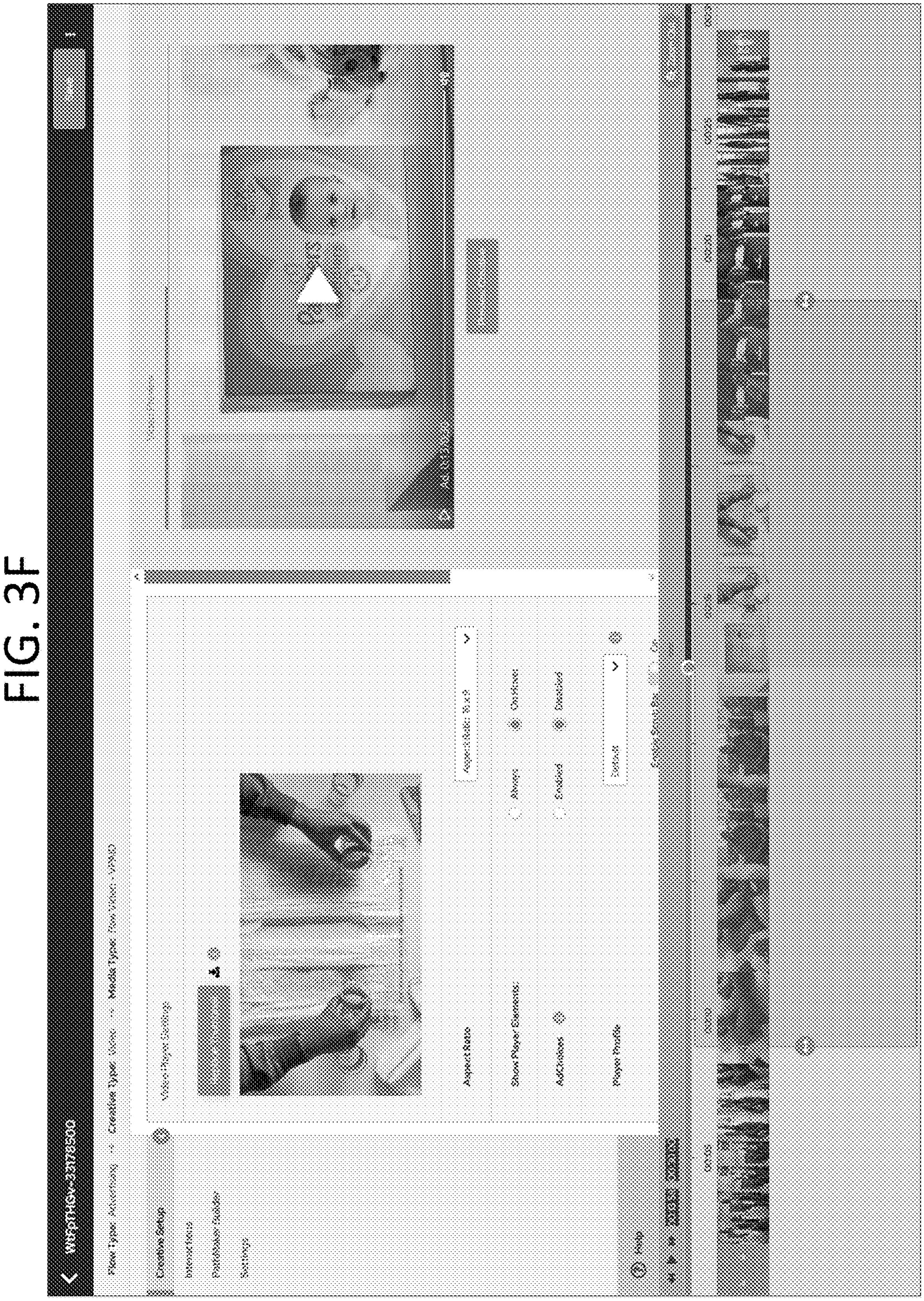

FIG. 3E shows, on the bottom portion of the page, a video timeline of the video segment along with 1 second frame captures for each second of the 30 second duration of the uploaded video. As the video is played back in the video player, an elapsed time will display on a user-controllable scrub bar to show the current position within the video preview playback. Below the frame captures is an area where the timing and/or durations of various overlays can be displayed, as will be discussed below. FIG. 3F shows the video timeline and scrub bar when a "zoom in" button, shown on the lower right of FIG. 3E, is selected to zoom in on a selected portion of the video timeline. Grab handles on the left and right of a highlighted section allow the design-user to increase or decrease the amount of zoom on a selected portion of the timeline.

Figure 3G:
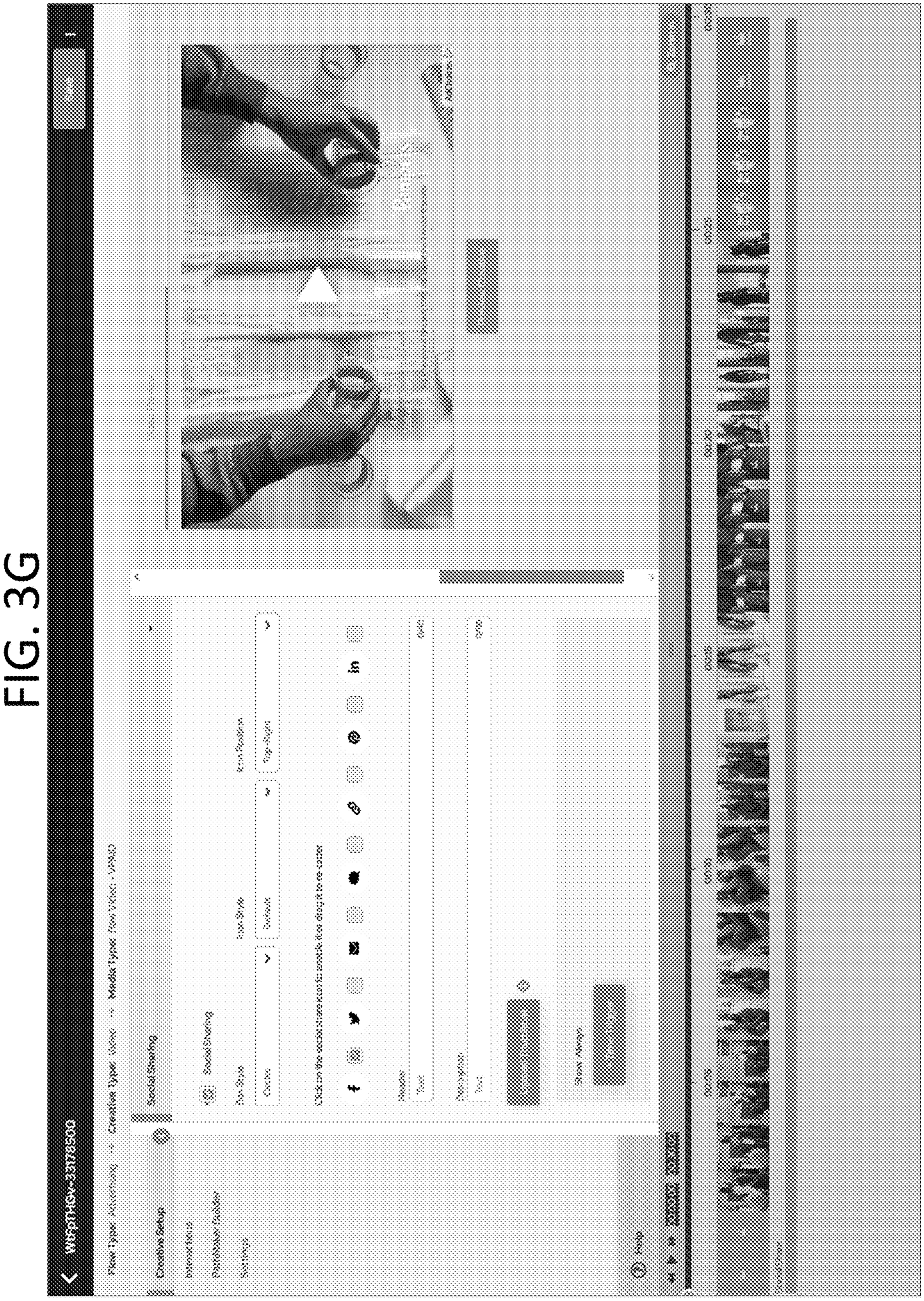

FIG. 3G illustrates, as the design-user scrolls fully down using the scroll bar in the center-left section of the page, an option, expanded by a user-click, to add a "Social Sharing" overlay over the video. This overlay will display one or more selectable social sharing icons at a selected location overlaying the video. By default, this overlay is displayed during the complete duration of the video segment, and so a time bar titled "Social Share" appears below the frame captures and timeline to show that the overlay extends from the start all the way through the end of the video. The controls for the "Social Sharing" option also include a configurable time trigger indicating when, during the video's replay, the overlay will be presented. By selecting this "+Time Trigger" option, the user can configure the overlay to be displayed only during one or more defined time periods during playback of the video as will be discussed in greater detail below.

Figure 3H:
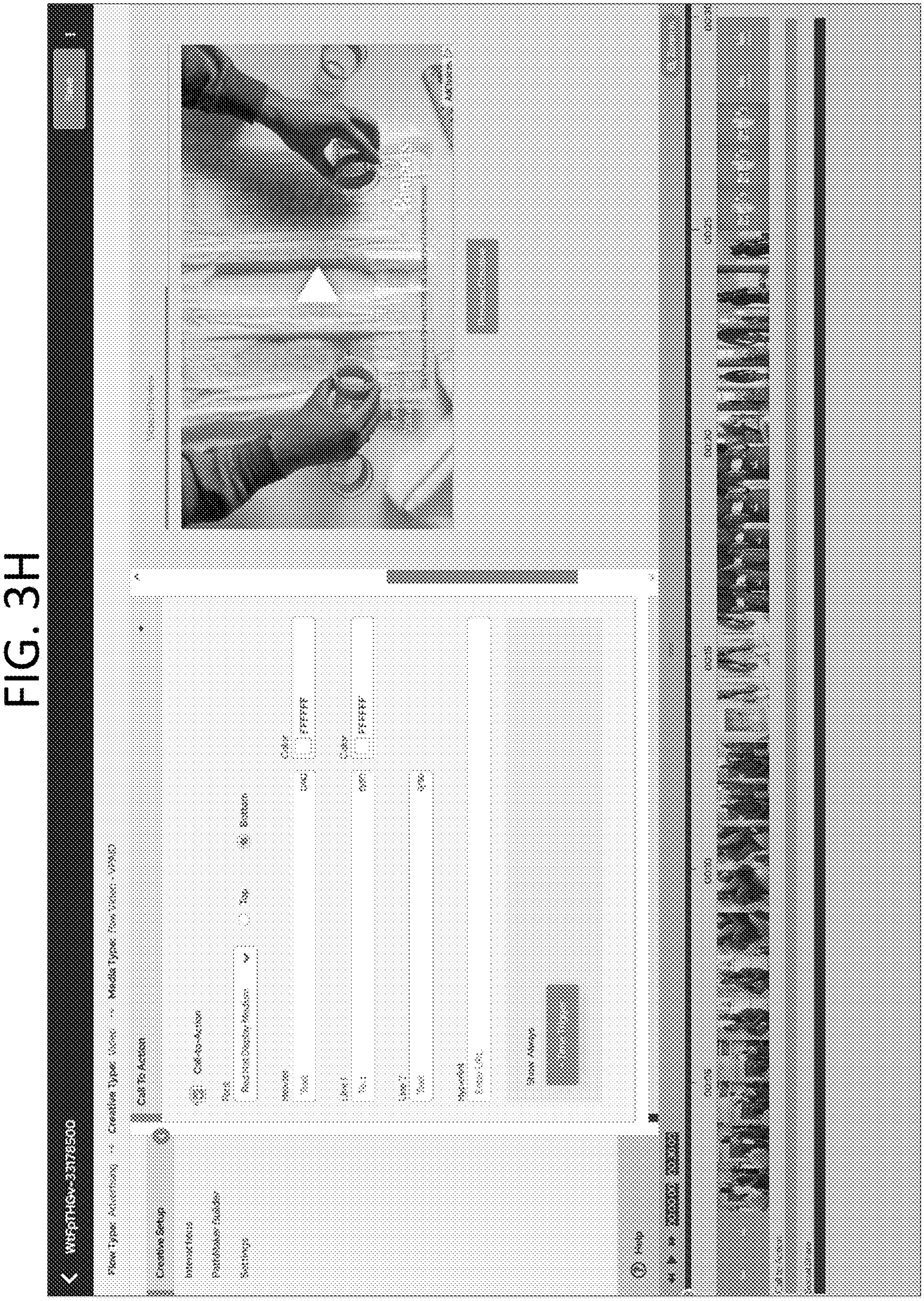
Figure 3I:
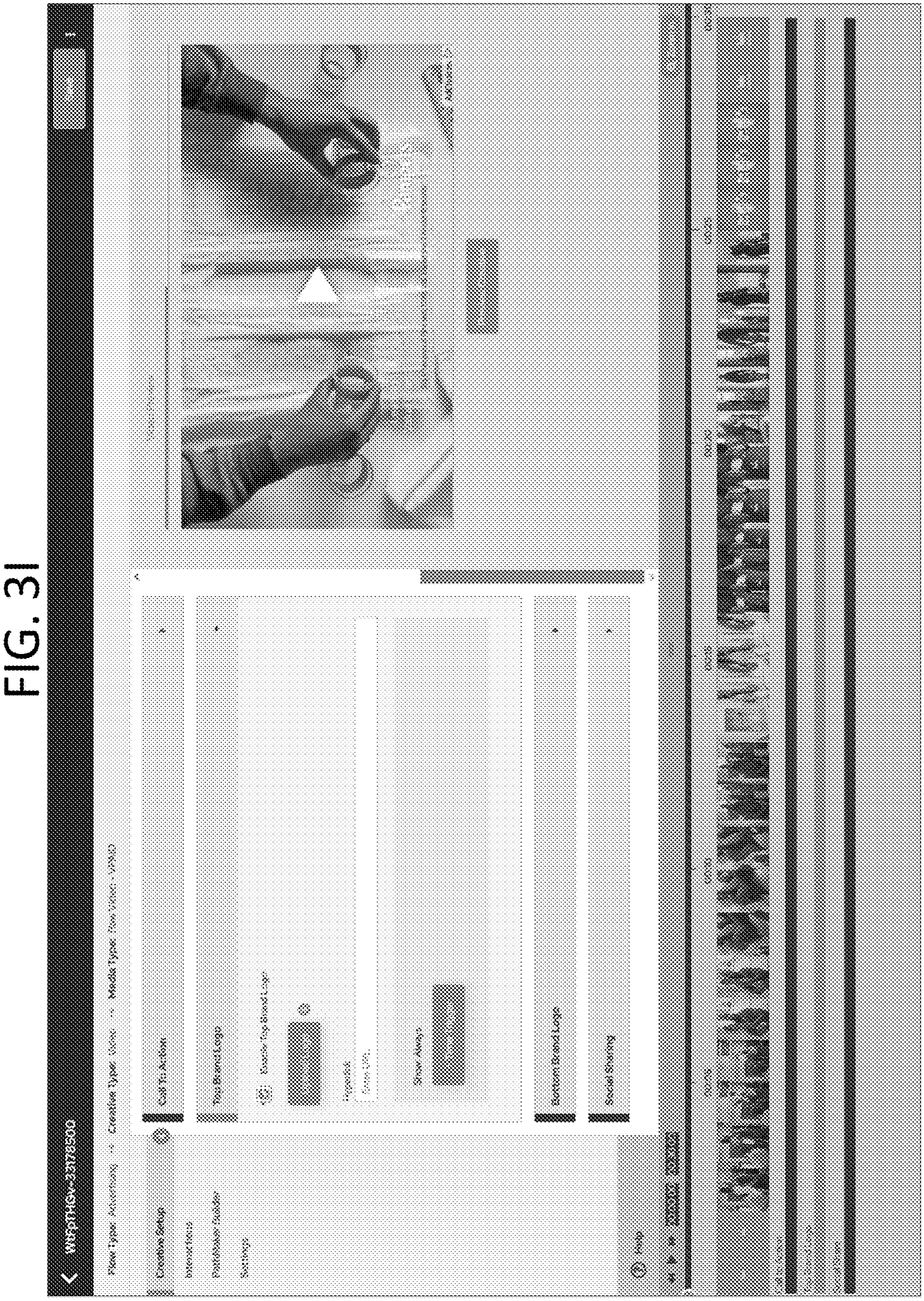
Figure 3J:
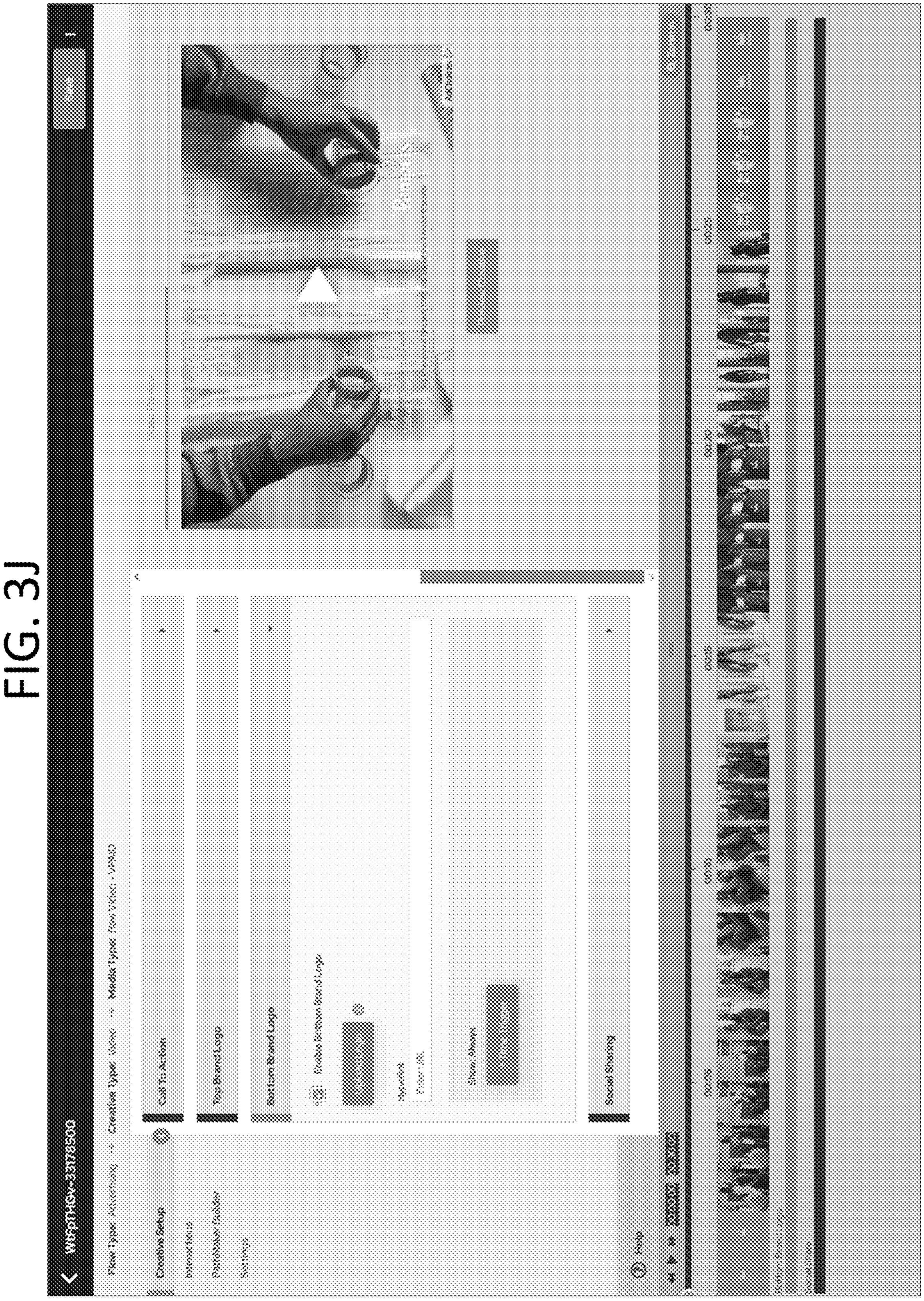

FIG. 3H illustrates an expanded option to add a text "Call-to-Action" overlay over the video. This overlay will display entered text as a hyperlink option within the video, and its display timing can also be configured. FIG. 3I illustrates an expanded option to add a "Top Brand Logo" overlay over the video. This overlay will display a selected logo as a hyperlink option at the top of the video. FIG. 3J illustrates, as the design-user scrolls further down using the scroll bar in the center of the page, an expanded option to add a "Bottom Brand Logo" overlay over the video. This overlay will display a selected logo as a hyperlink option at the bottom of the video.

Figure 4A:
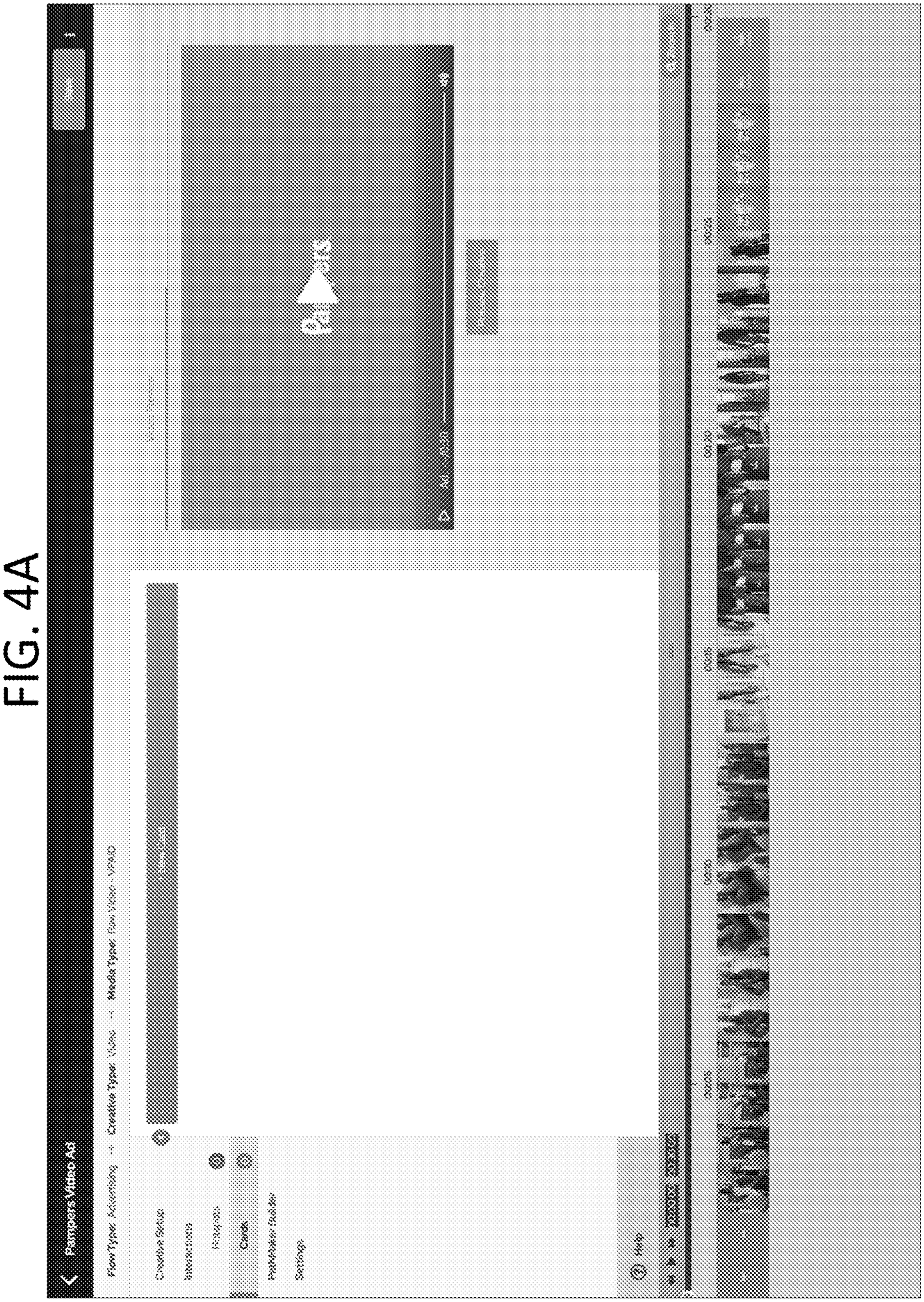

FIG. 4A illustrates a page shown when the design-user selects the "Cards" sub-option under the "Interactions" option in a frame on the left side of the design interface. The "Interactions" option allows a user to create interactive overlays, some of which can be linked to allow an end-user viewing the presentation to follow various paths between linked overlays based on the end-user's selections or actions within the overlays. In the illustrated page, all of the previously entered overlays, such as the "Social Sharing" overlay, have been deleted and so no longer show up on the video timeline. The "Card" sub-option creates interactive card overlays that can be configured to slide from a video screen edge to move over the video starting from the top, bottom, left, or right of the video display screen when being displayed to an end-user. The design-user can select the "+New Card" option to create a new interactive card overlay. In additional embodiments, other options for presenting cards to a user can be provided, such as a fade in or instant appearance, in addition to sliding the card in from an edge of the screen.

Figure 4B:
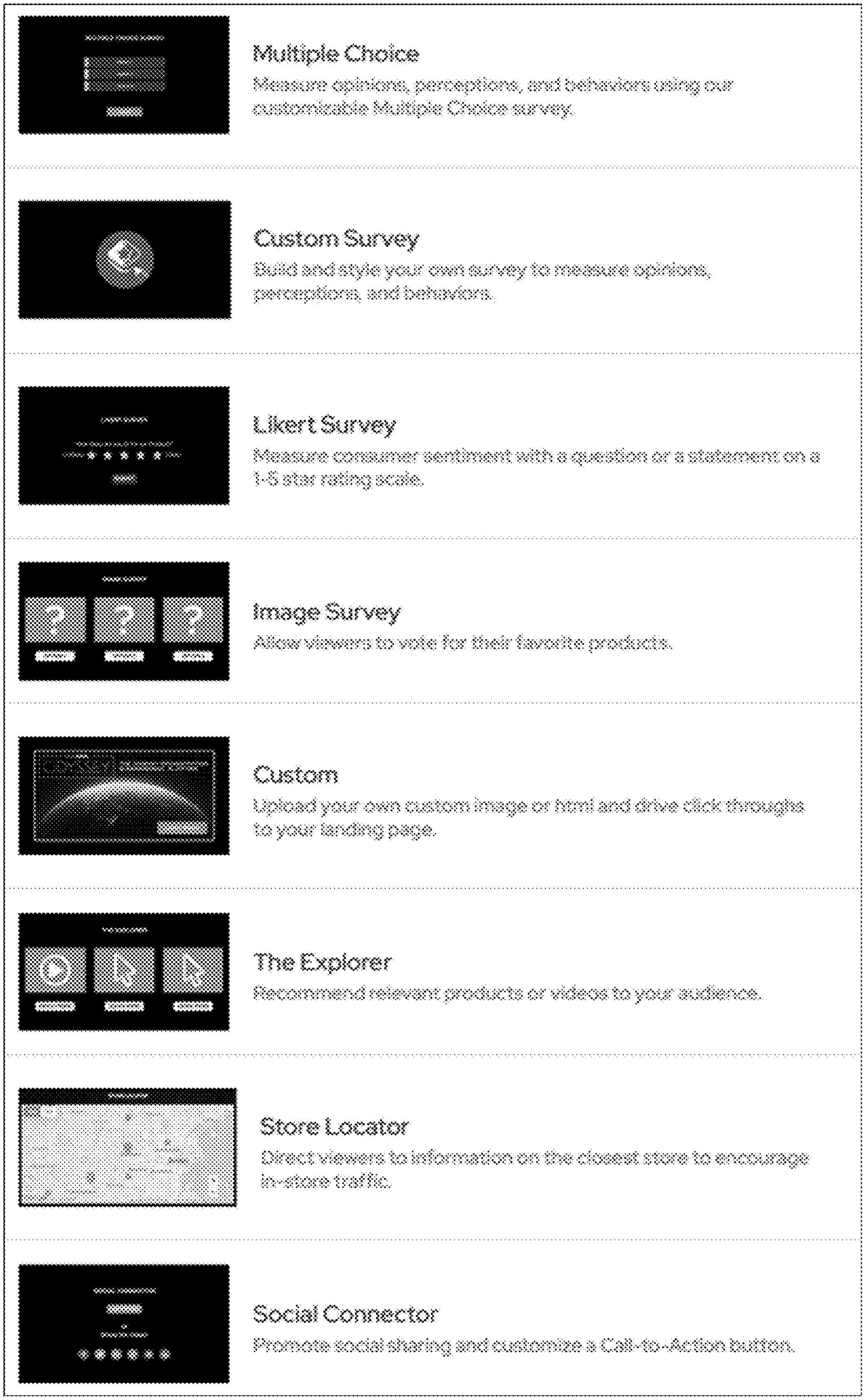

FIG. 4B illustrates thumbnail images of various interactive card overlay options, which can include for example: Multiple Choice (described as "Measure opinions, perceptions, and behaviors using our customizable Multiple Choice survey."), Custom Survey (described as "Build and style your own survey to measure opinions, perceptions and behaviors"), Likert Survey (described as "Measure consumer sentiment with a question or a statement on a 1-5 star rating scale"), Image Survey (described as "Allow viewers to vote for their favorite products"), Custom (described as "Upload your own custom image or html and drive click throughs to your landing page"), The Explorer (described as "Recommend relevant products or videos to your audience"), Store Locator (described as "Direct viewers to information on the closest store to encourage in-store traffic"), and Social Connector (described as "Promote social sharing and customize a Call-to-Action button").

Figure 4C:
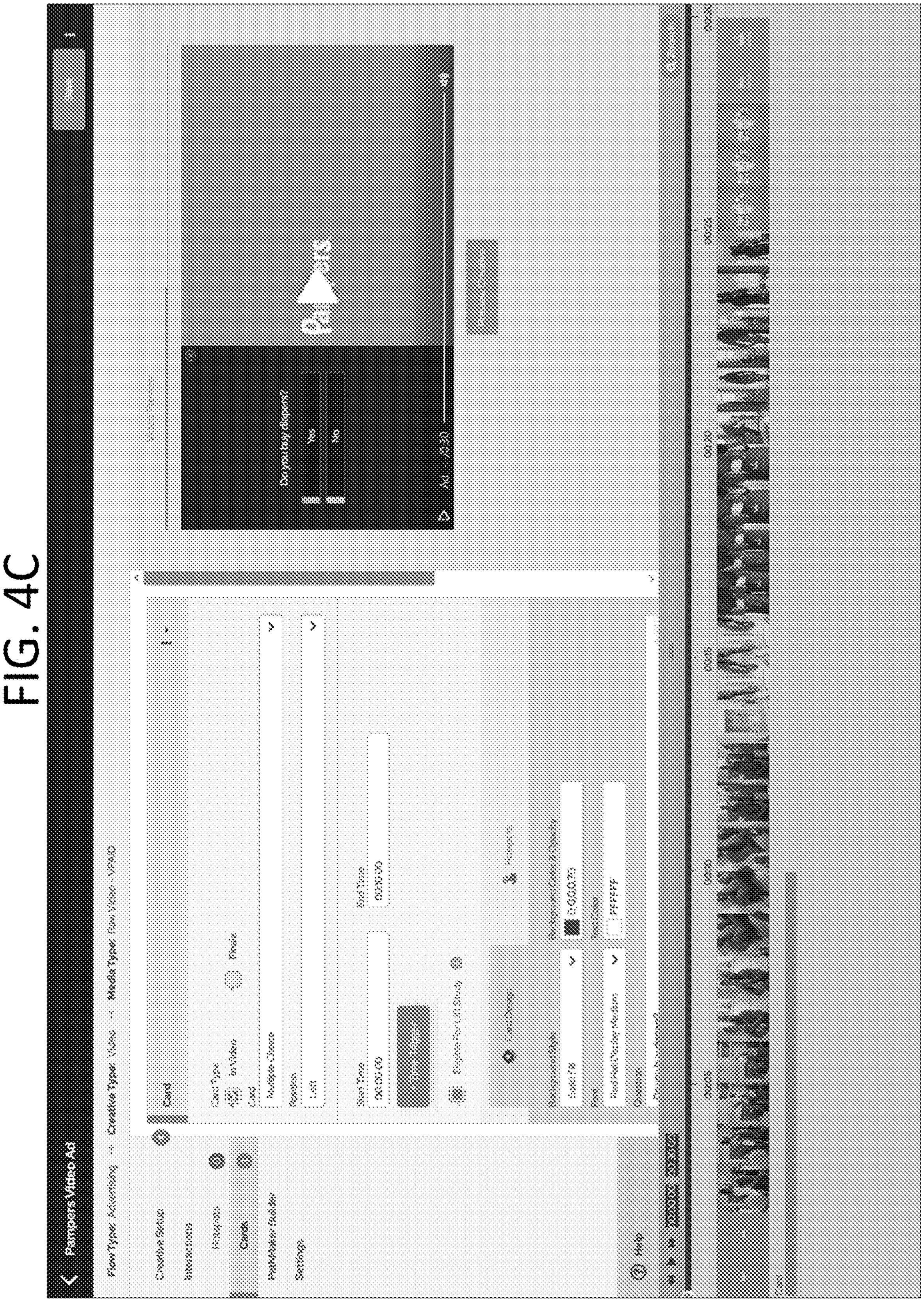

FIG. 4C illustrates a page shown after the design-user elects to create a new interactive card overlay of the "Multiple Choice" type. The user can select from various types of available types of interactive card overlays from a dropdown menu, which shows the options illustrated in FIG. 4B. Two checkboxes allow the design-user to select whether the card overlay will be shown "in video" which means between one or more specified start and end times, and/or as a "finale", in which case the card is shown to the end-user upon completion of presentation of the video segment overlaying the still image thumbnail, as specified in FIG. 3B above. In the illustrated example, the user has selected to have the card shown "in video" between the time of 0 and 10 seconds, which is also reflected by a bar representing the card overlay extending between 0 and 10 seconds in the timeline in the bottom portion of the page.

Figure 4D:
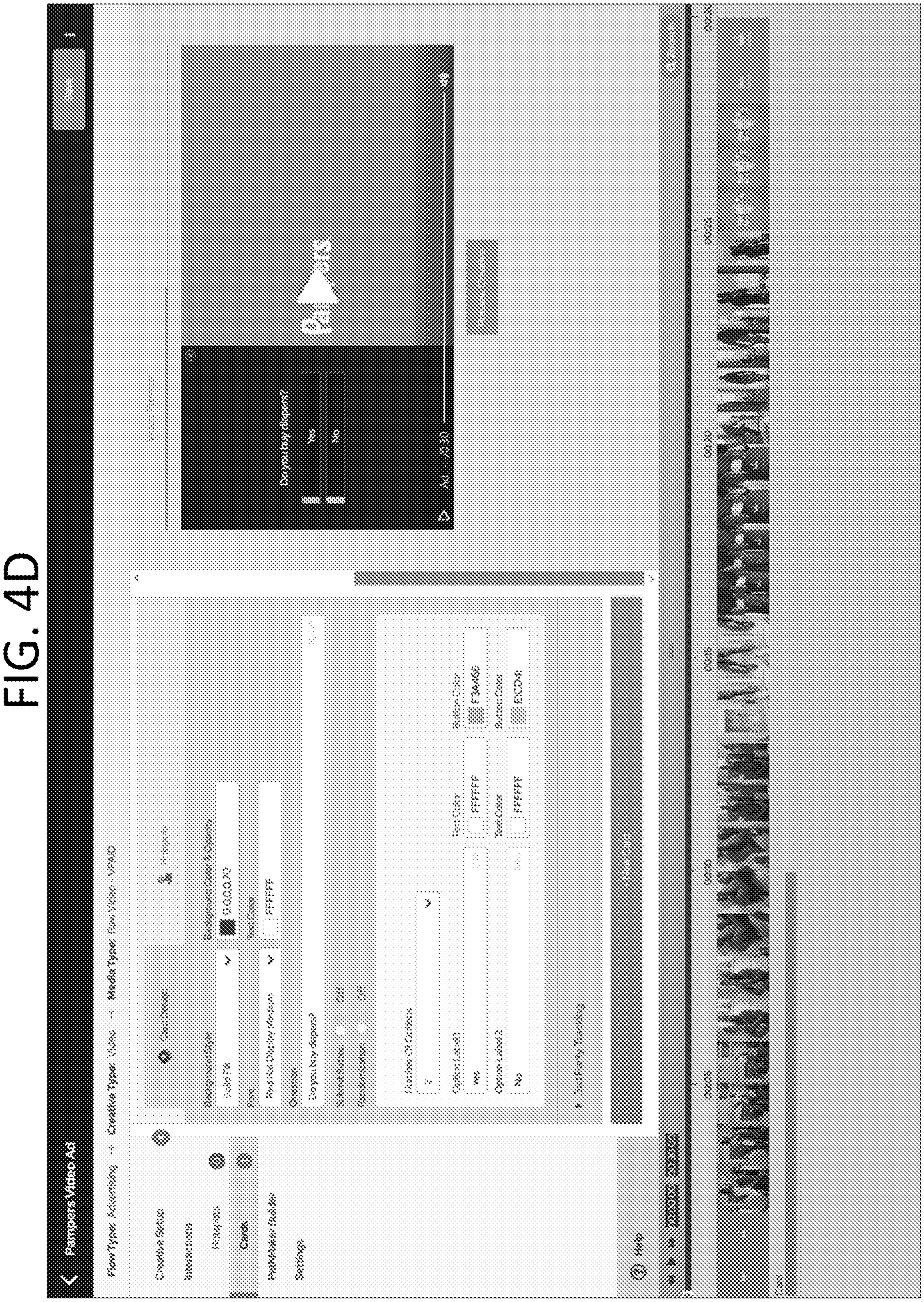
Figure 4E:
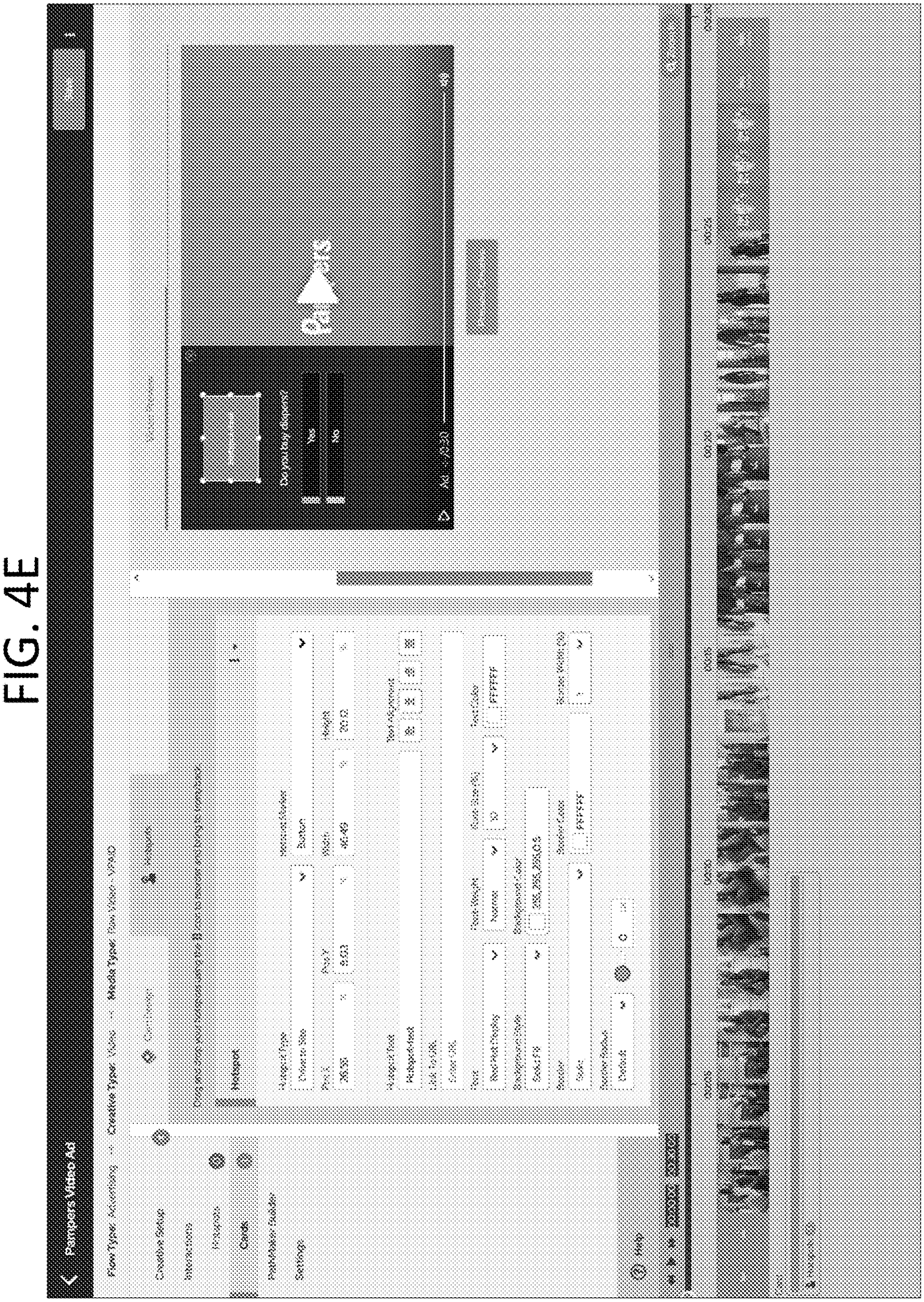

FIG. 4D shows the design page with additional options for the design user to enter a specification of the "Multiple Choice" card in a "Card Design" section upon scrolling down the center scroll bar. In the illustrated page, the design-user had entered the question text, "Do you buy diapers?", as well as two end-user selectable response options of "Yes" and "No", which are also reflected in the card in the video player portion of the page to the right. FIG. 4E shows an additional tab of the "Multiple Choice" card that allows a selectable hotspot to be specified and added to the card. The hotspot as specified is also shown in the video player portion of the page to the right as it would be displayed during playback. Note that the hotspot shown in FIG. 4E is not retained as the present example description progresses forward.

Figure 4F:
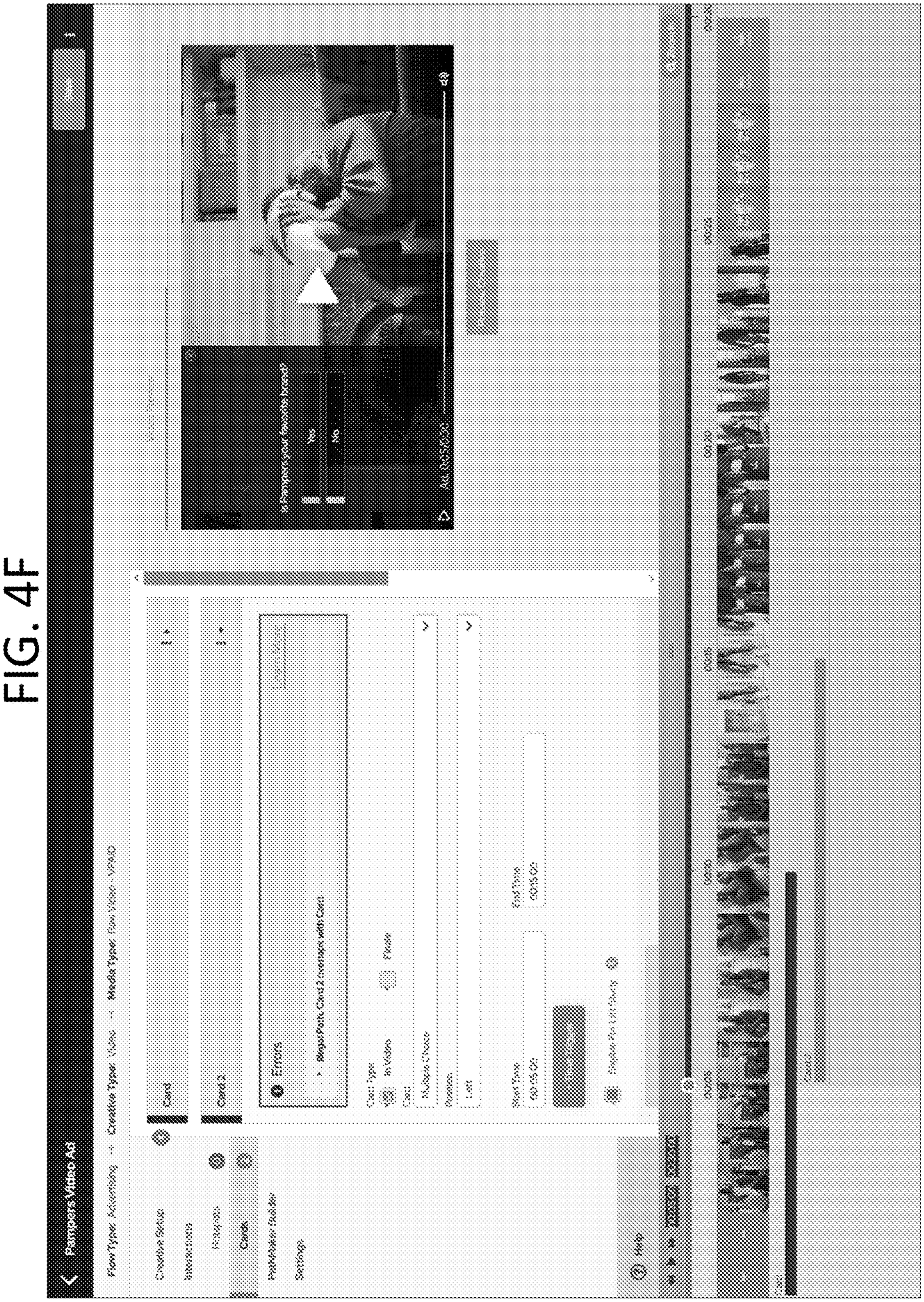
Figure 4G:
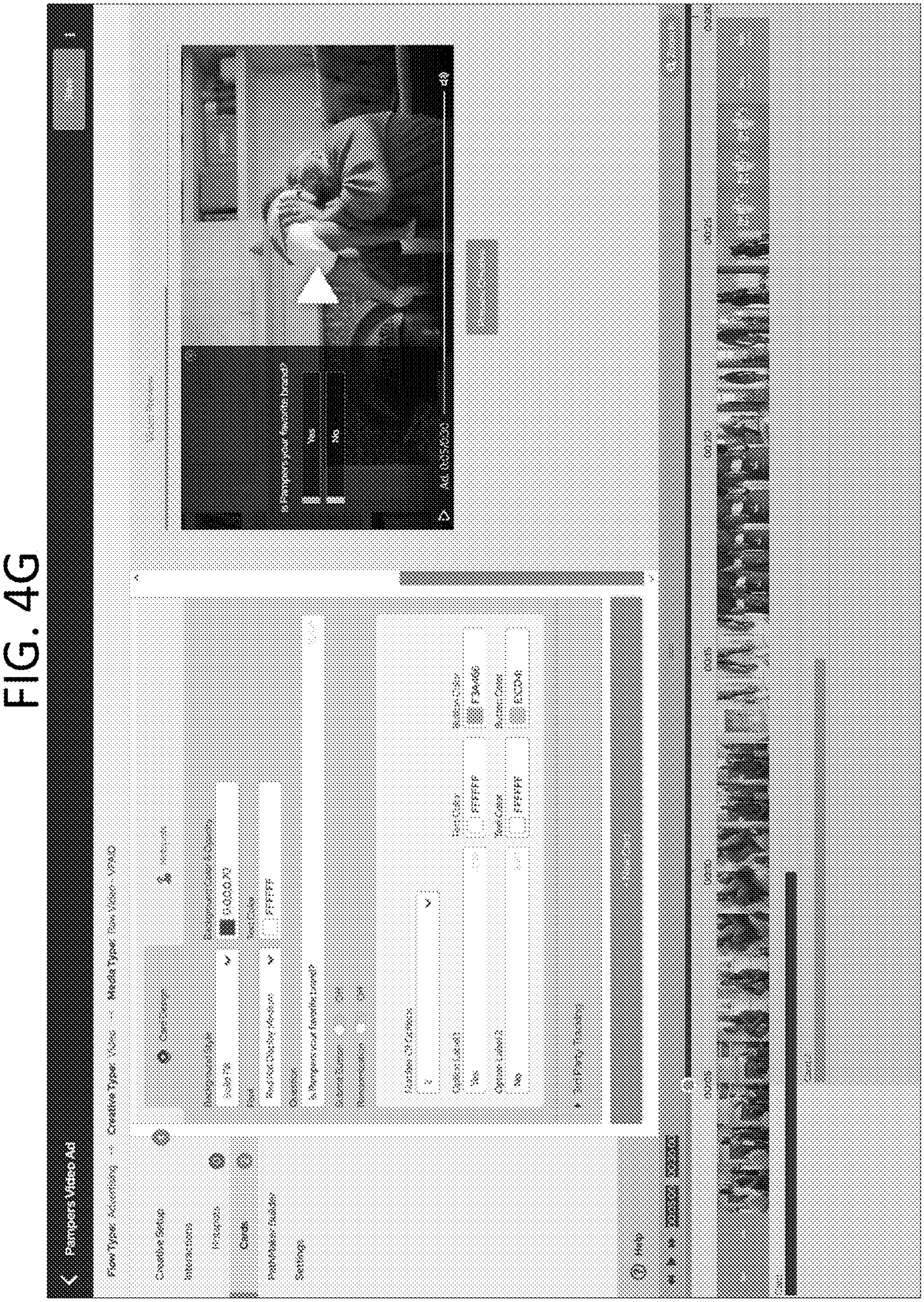

FIGS. 4F and 4G illustrate two scrolling positions of a page shown after the design-user elects to create a second new interactive card overlay of the "Multiple Choice" type. In the illustrated page, the design-user had entered the question text, "Is Pampers your favorite brand?", as well as two end-user selectable response options of "Yes" and "No", which are also shown in an overlay of the video to the right in the video player portion of the page. The second new card is shown with the name "Card 2" whereas the first new card described above with reference to FIGS. 4C-D is shown with the name "Card".

Referring to FIG. 4F, the user has selected to have the card shown "in video" between the time of 5 and 15 seconds, which is also reflected by showing a bar representing the card extending between 5 and 15 seconds in the timeline in the bottom portion of the page. It should be noted that the page in FIG. 4F also shows an error raised by the system, since the first multiple choice card of FIG. 4C overlaps during playback seconds 5 through 10 with the second card. The system can be configured to maintain and/or execute a set of one or more warning rules to determine whether cards that have been specified by a design user overlap in position, time, and/or both. In this case the two cards overlap in both position and time, and so the system has raised an error since the overlays would otherwise overlap during playback.

Figure 5A:
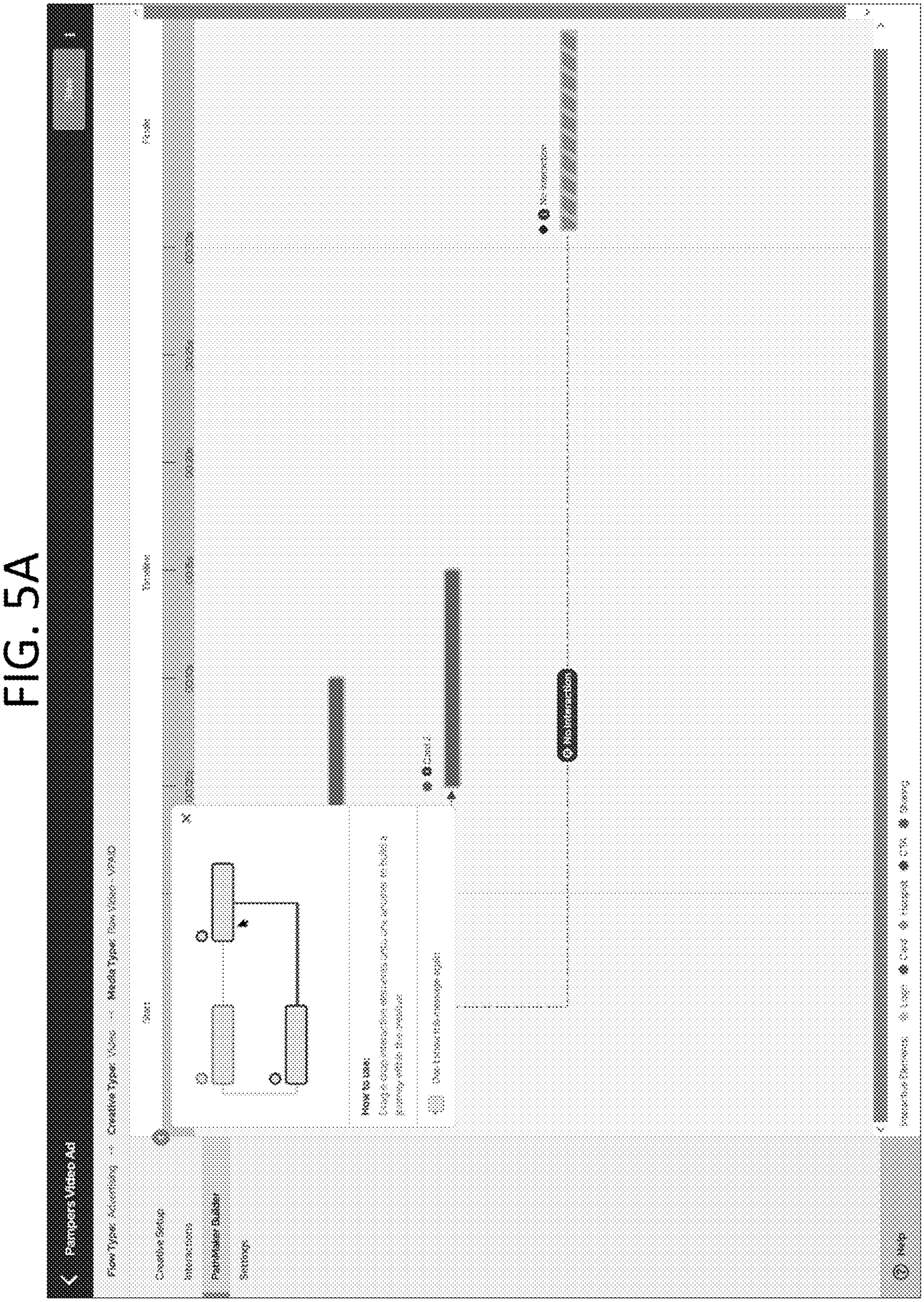
Figure 5B:
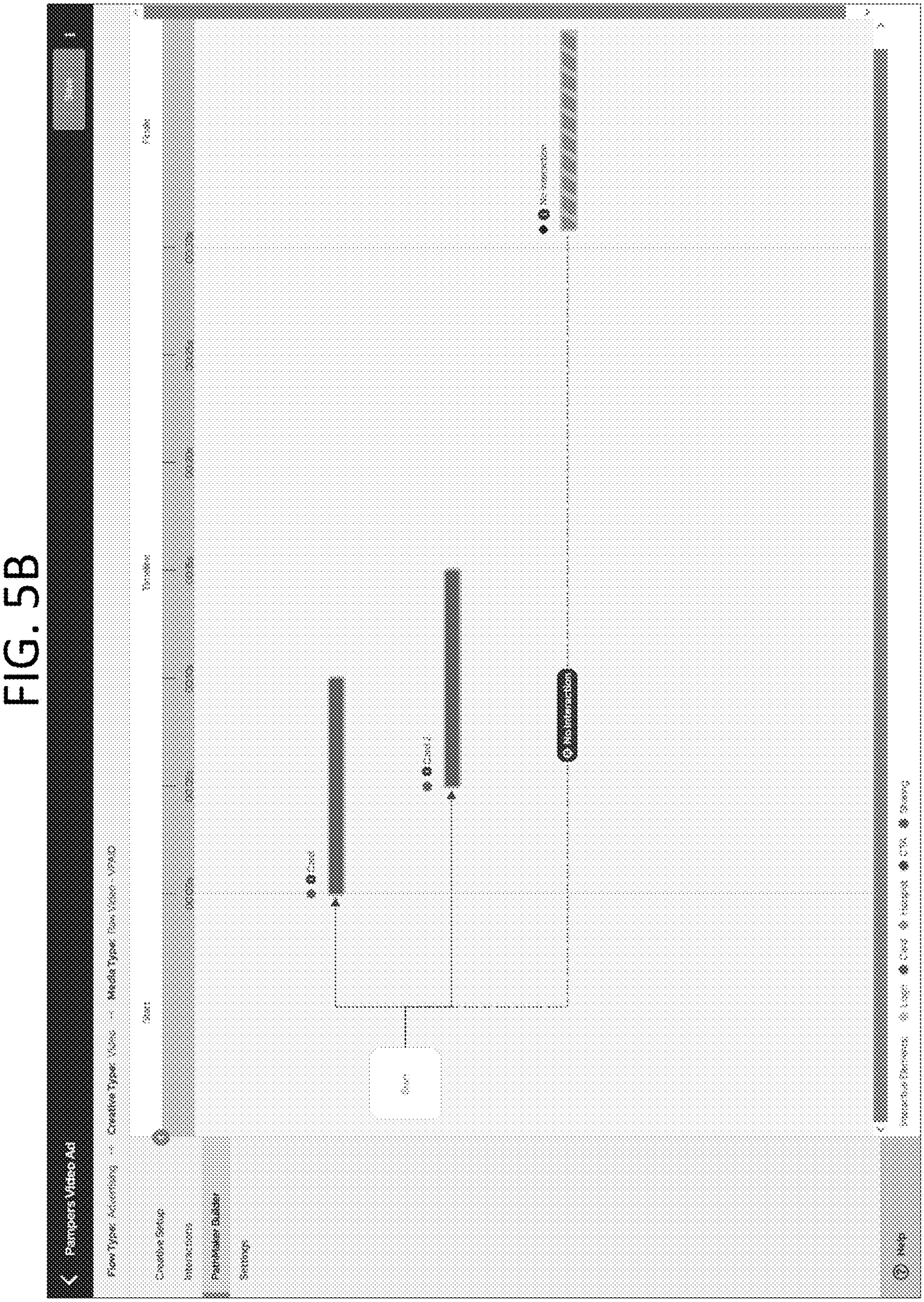

FIG. 5A illustrates a "Pathmaker Builder" section of the design interface that enables the design-user to link source overlays to target overlays. FIG. 5A shows a "How to use" dialog box that tells the design-user "Drag & drop interactive elements (overlays) onto one another to build a journey within the creative." FIG. 5B shows a bar icon representing each of Card and Card 2 in a schematic representation along a timeline for the video segment. The schematic representation shows a "Start" icon representing a start of the video segment that then connects by visual links to each of Card and Card2. Since both Card and Card2 overlap in time and location, the schematic shows an exclamation point above each card indicating an error condition. Hovering over either exclamation point causes the text of the error shown in FIG. 4F to pop up here as well.

Overlays that are connected to the video start icon in the "Pathmaker Builder" each initiate a path that an end-user can take through linked overlays. FIG. 5B also shows a visual link connecting the "Start" icon to an empty or blank "No Interaction" icon, which indicates that if the end-user performs no interactions, no card will be shown to the user upon completion of the video segment.

Figure 5C:
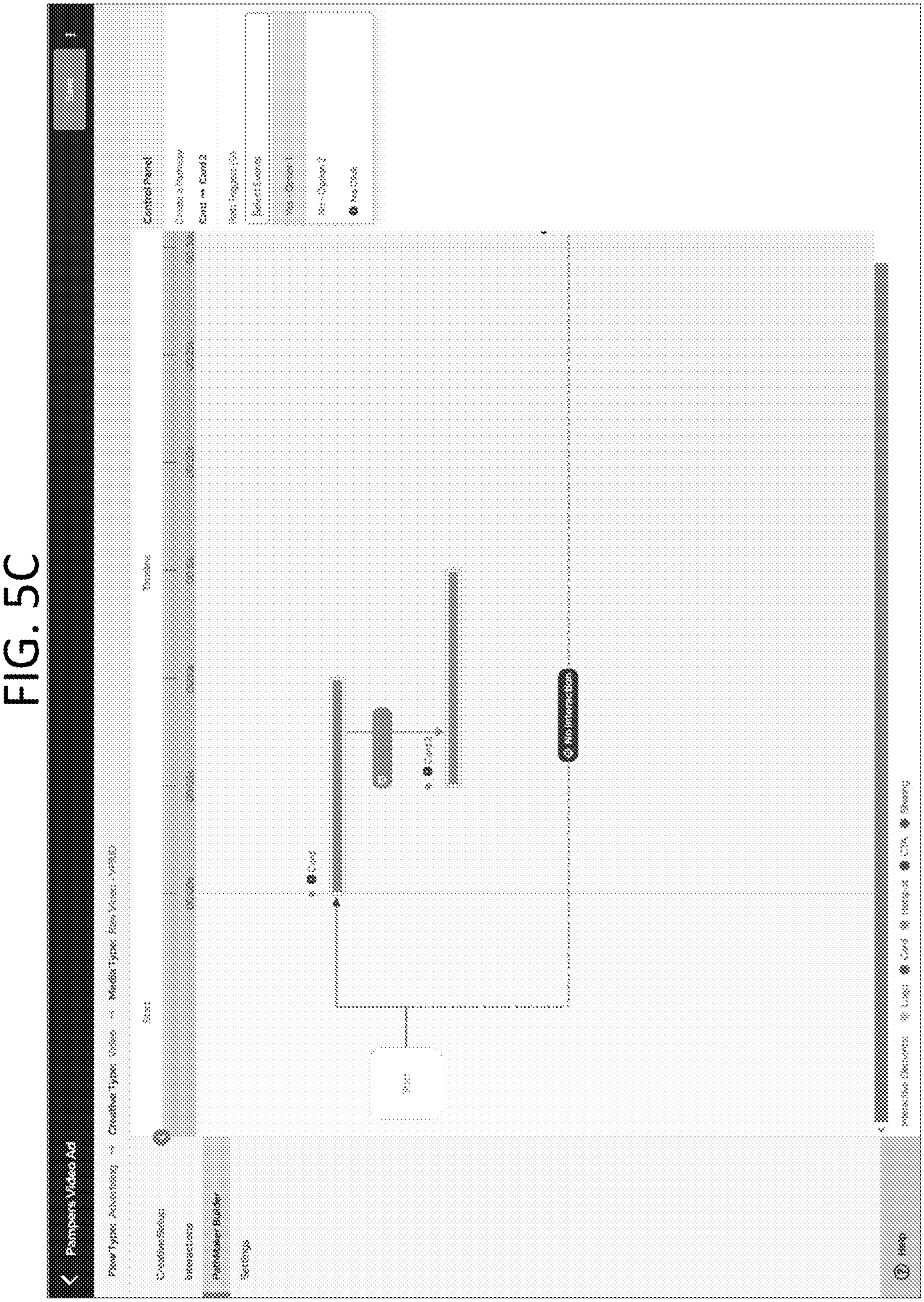
Figure 5D:
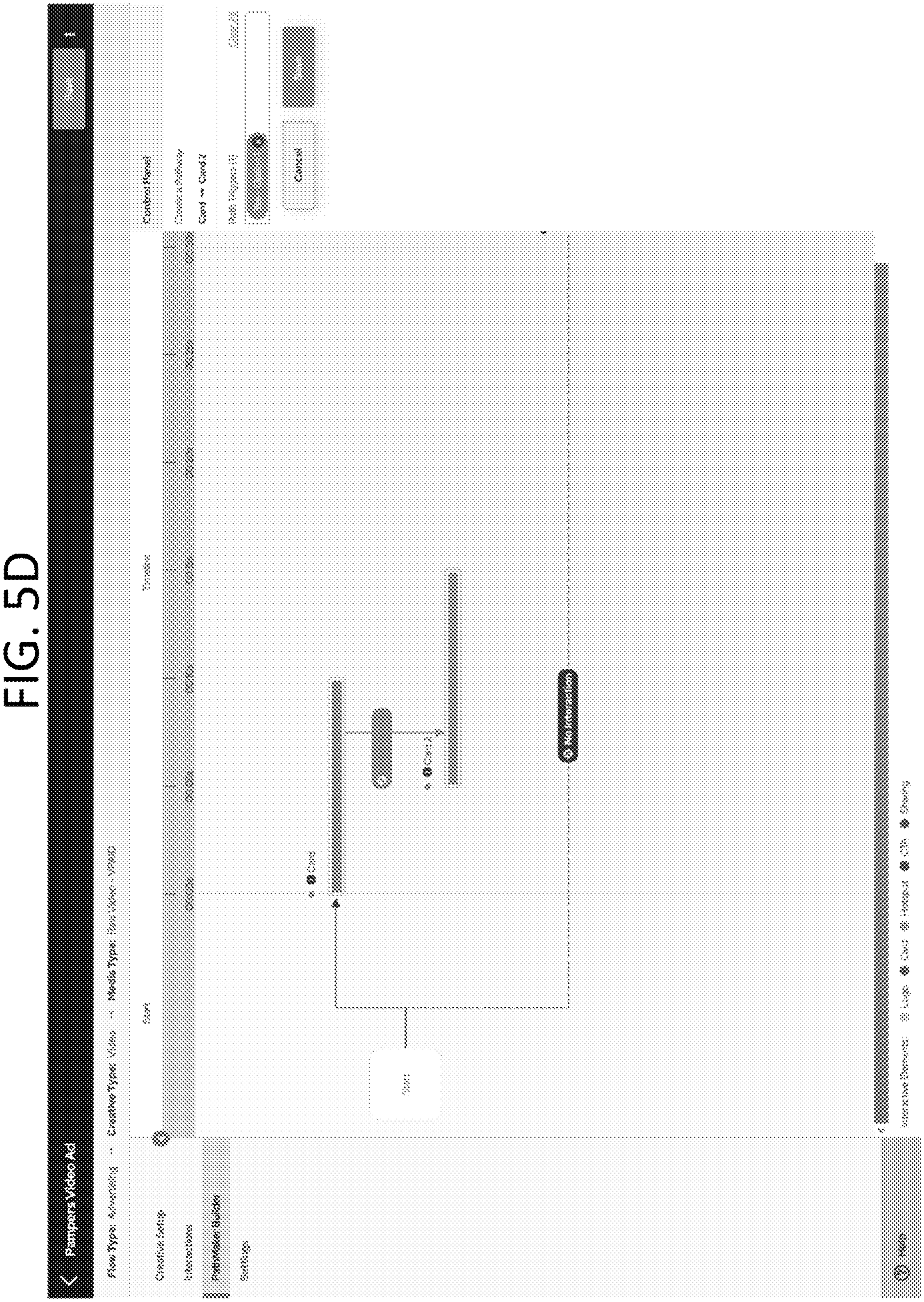
Figure 5E:
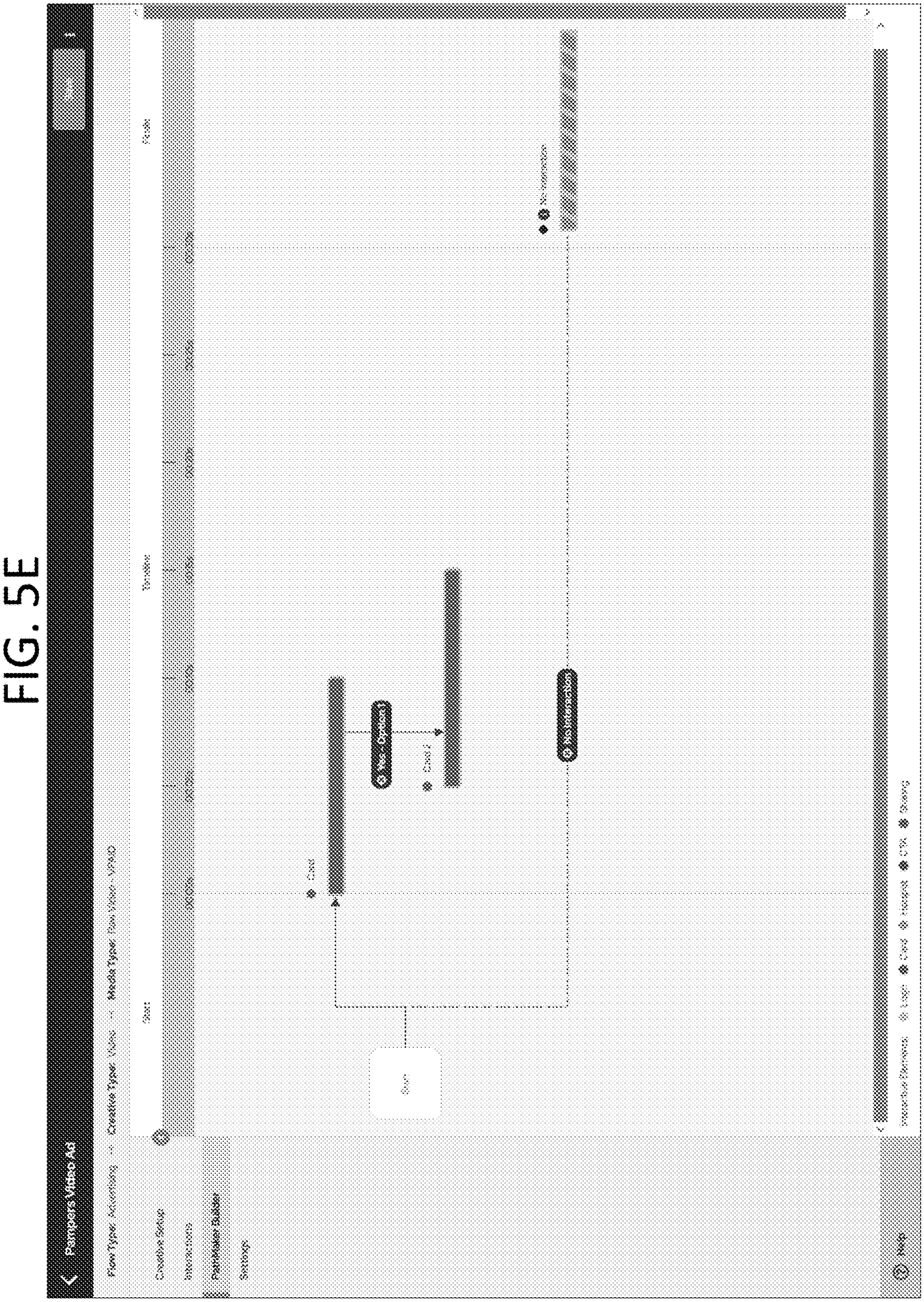

In FIG. 5C, the design-user has dragged the "Card 2" icon, representing a target interactive overly, on top of the "Card" icon, representing a source interactive overly. This user action in the design interface creates a link from the source to the target and brings up a control panel on the right of the screen that allows the design-user to configure the trigger(s) from the source to the target. The available triggers show up in a dropdown and in this case are "Yes—Option1", "No—Option2", and "No Click". In FIG. 5D, in the right hand side control panel, the user has selected the "Yes—Option 1" as an end-user response to the "Card" interactive overlay. In FIG. 5E, the schematic now shows the "Yes—Option 1" selection over the link leading from "Card" to "Card 2". Through this configuration, the "Card" is shown to the end-user between 0 and 10 seconds during playback, and upon end-user selection of Option 1, the packaged video segment will show the "Card 2" interactive overlay between 5 and 15 seconds, soliciting a second response from the end-user.

Figure 6A:
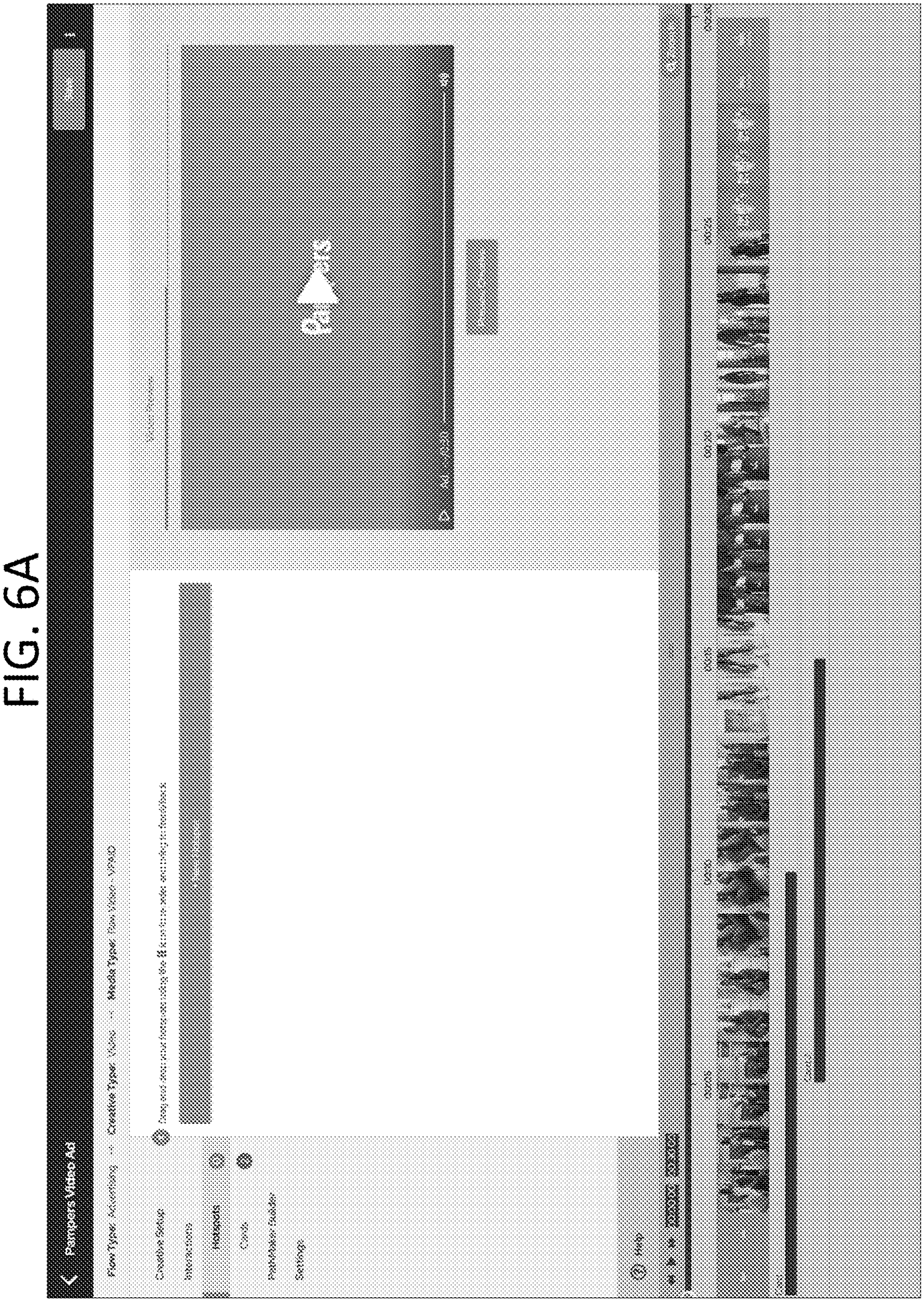

FIG. 6A illustrates a page shown when the design-user selects the "Hotspots" sub-option under the "Interactions" option in a frame on the left side of the design interface. The "Hotspots" sub-option creates overlays that appear in the video at selected locations rather than sliding in from an edge of the screen as with the card overlays discussed with reference to FIGS. 4A-G above. Either the cards or the hotspots can appear at predetermined video playback times and/or in response to predetermined end-user paths between overlays configured through the "Pathmaker Builder".

Figure 6B:

FIG. 6B illustrates a page shown as the design-user has begun to configure the hotspot interactive overlay. The page shows that the hotspot will be in the form of a button displaying "Take our survey!" to be displayed between 10 and 20 seconds. The video preview window on the right shows how the hotspot will look to the end-user, with the addition of some resizing handles on the button to facilitate modification by the design-user. The "Hotspot Type" has been chosen as "Card" which causes the video playback to pause upon selection, and the user will be shown one of the options selected and configured by the design user from those in FIG. 4B. Another selectable "Hotspot Type" available in a dropdown for selection is "Drive to site", which allows the design-user to specify a URL to which the end-user will be immediately taken upon selection of the hotspot link.

Figure 6C:
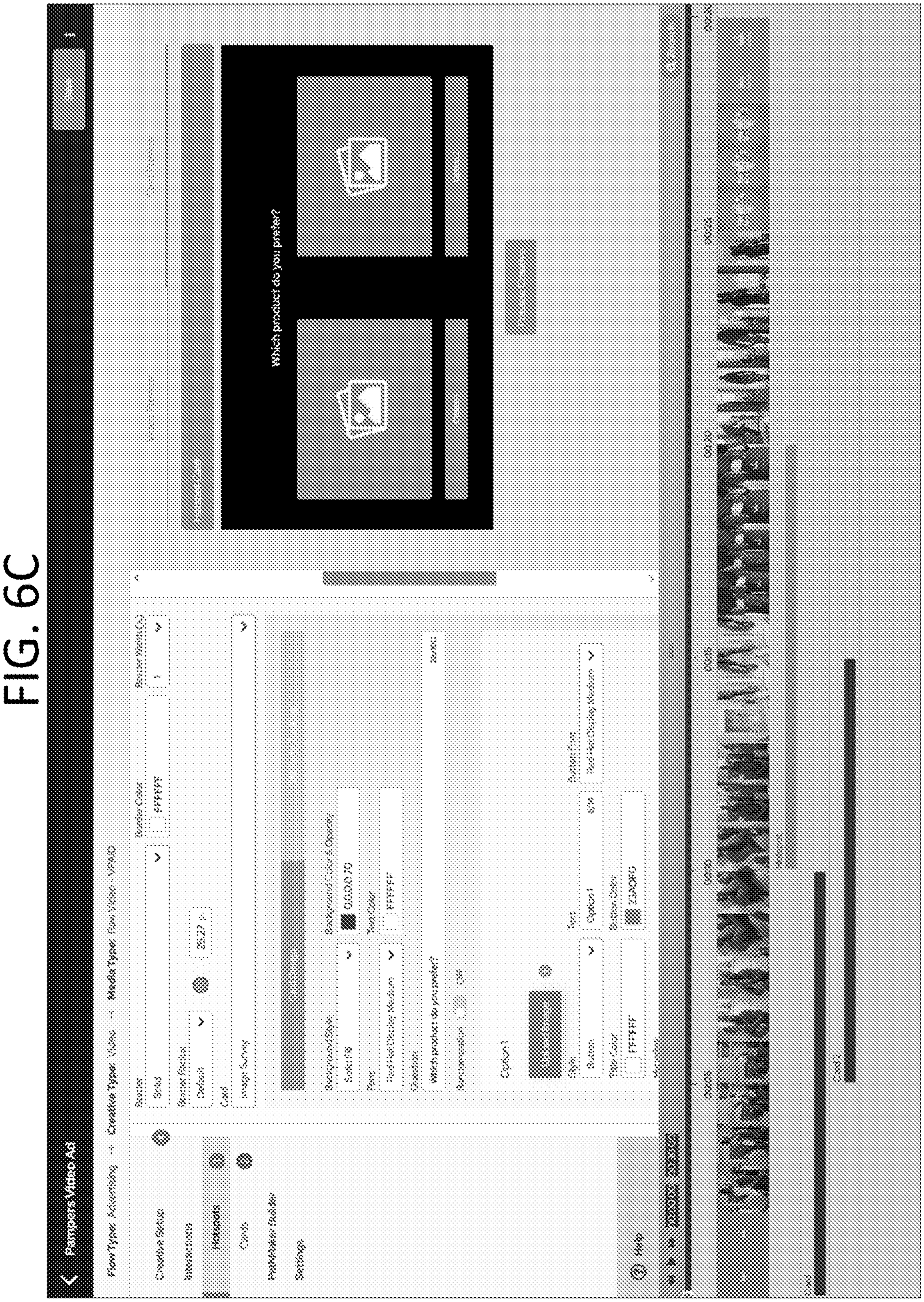
Figure 6D:
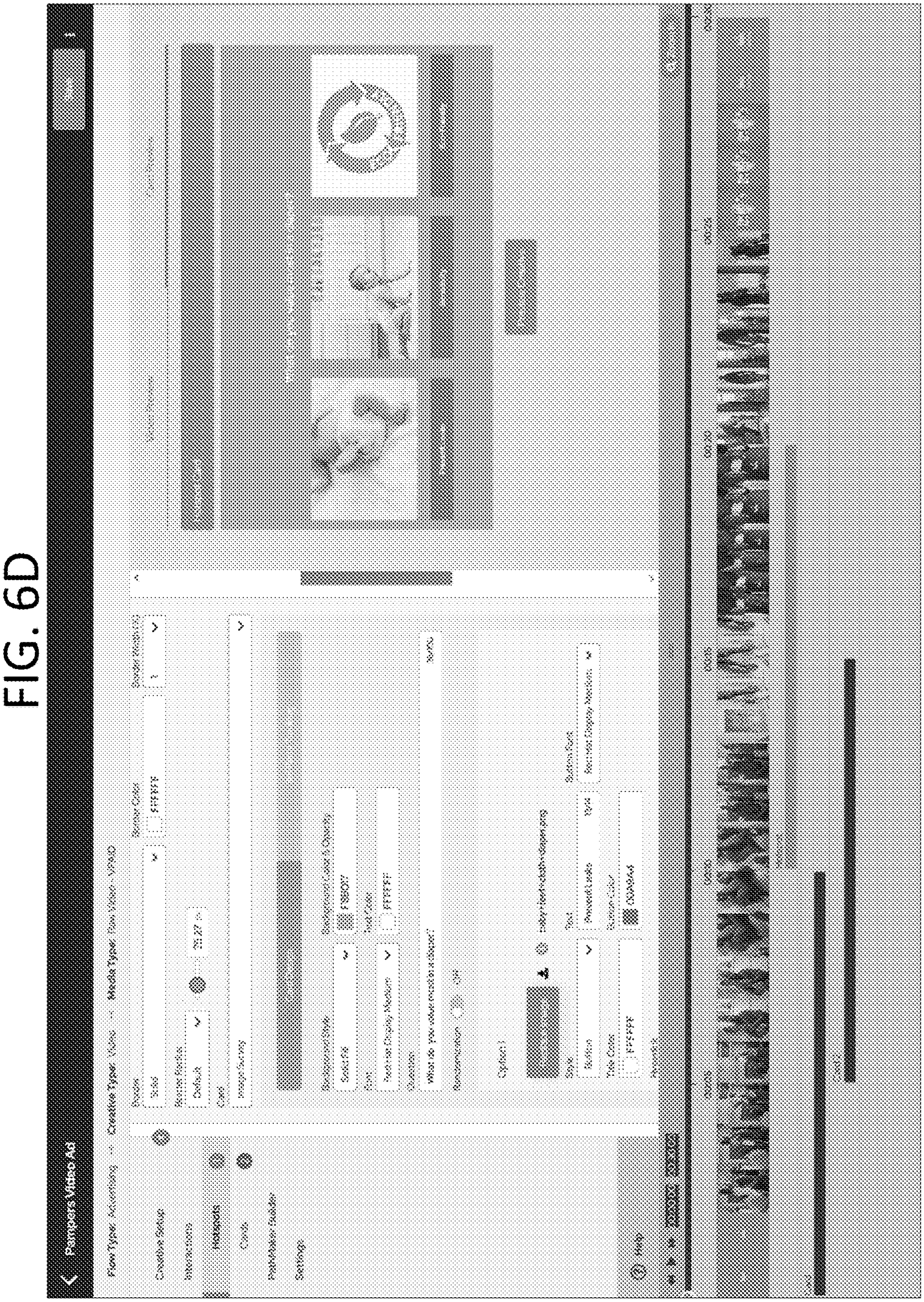
Figure 6E:
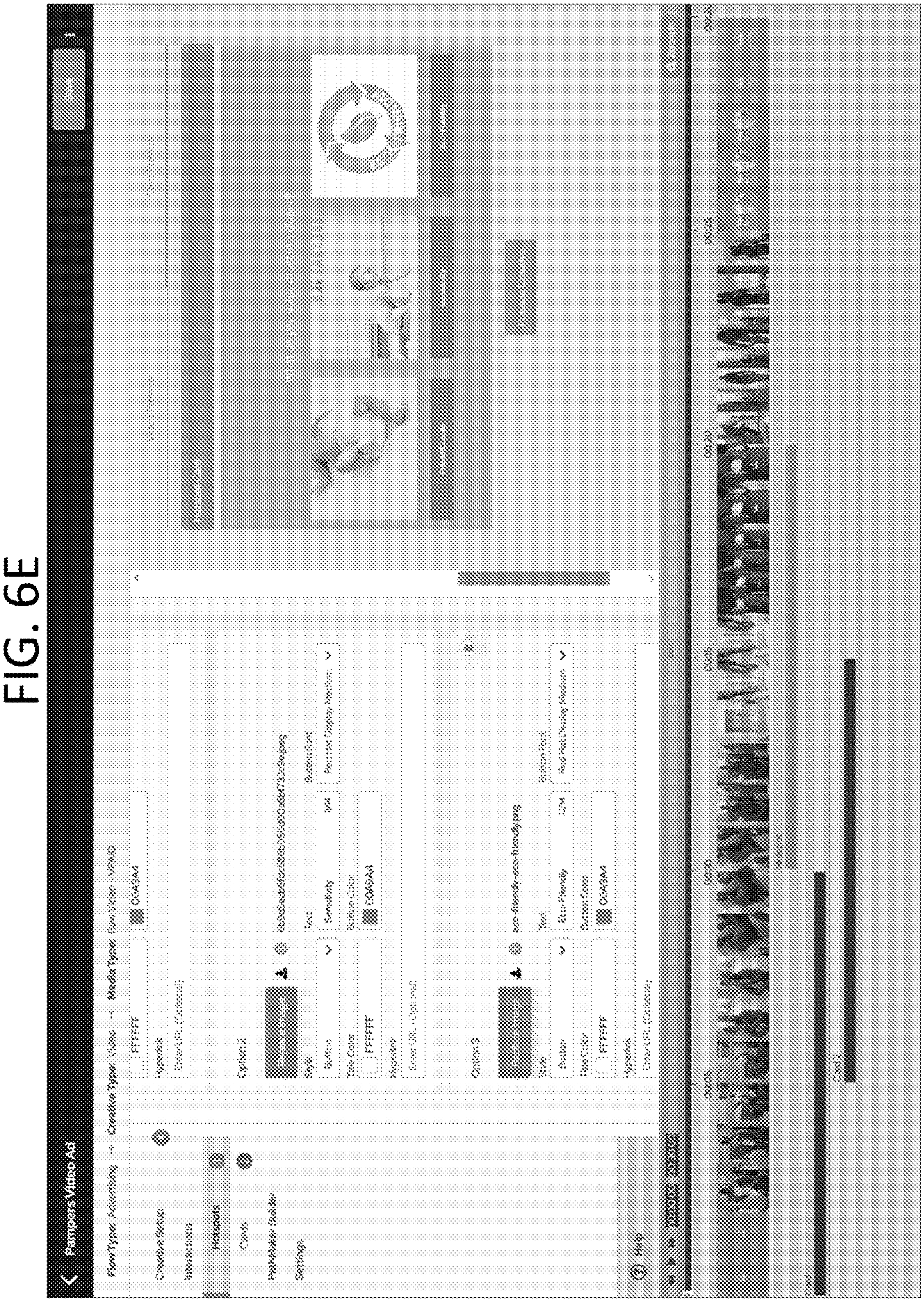

FIG. 6C shows the same page as FIG. 6B, but with the left center frame scrolled further down to show the specification of a card overlay to appear in place of the paused video playback upon selection of the hotspot. FIG. 6D and FIG. 6E show the design-user's specification of an image survey that asks the end-user "What do you value most in a diaper?". The card, as specified and designed by the design user, can be previewed in a "Card Preview" window that replaces the "Video Preview" window during the card design specification process.

Figure 7A:
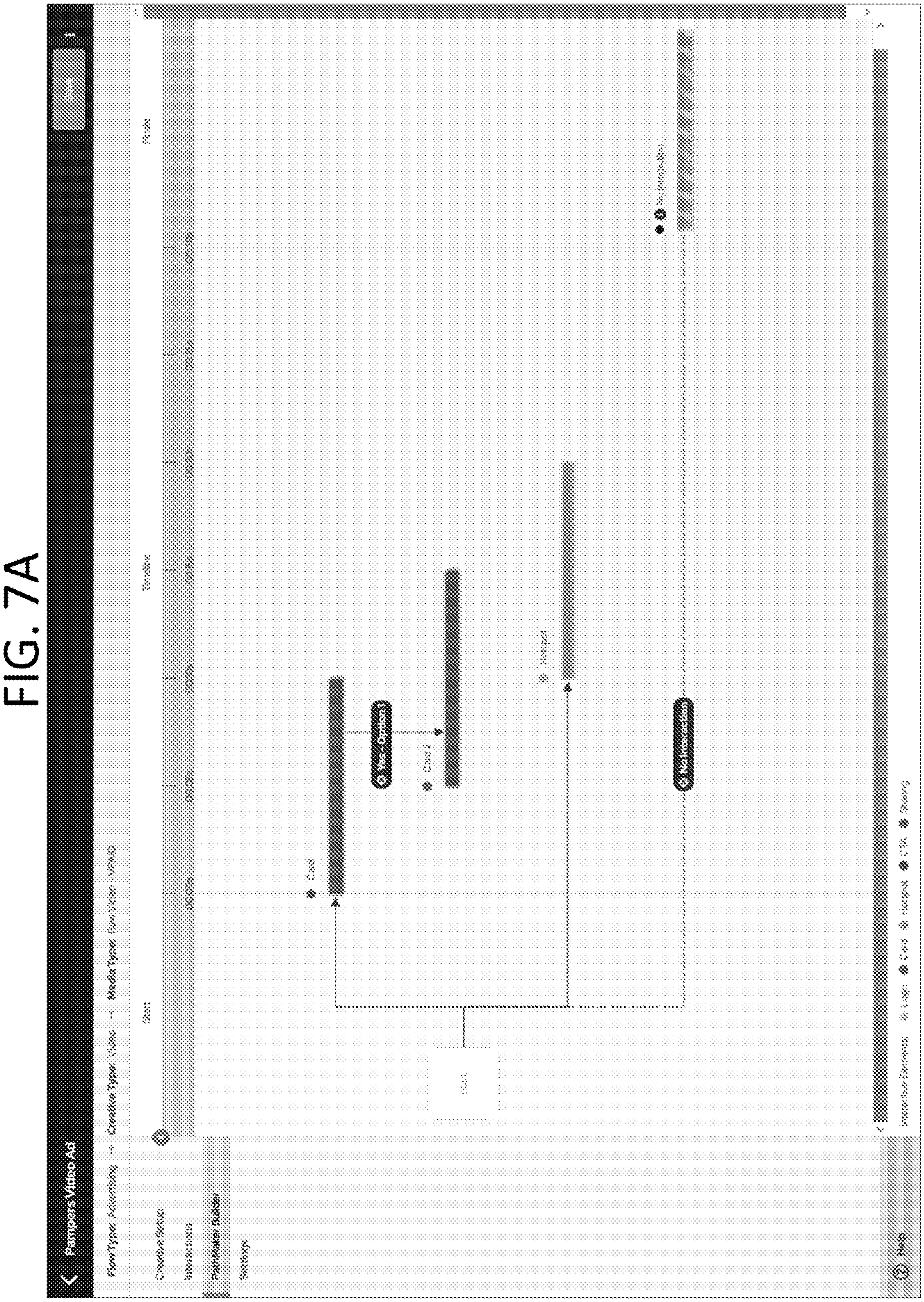
Figure 7B:
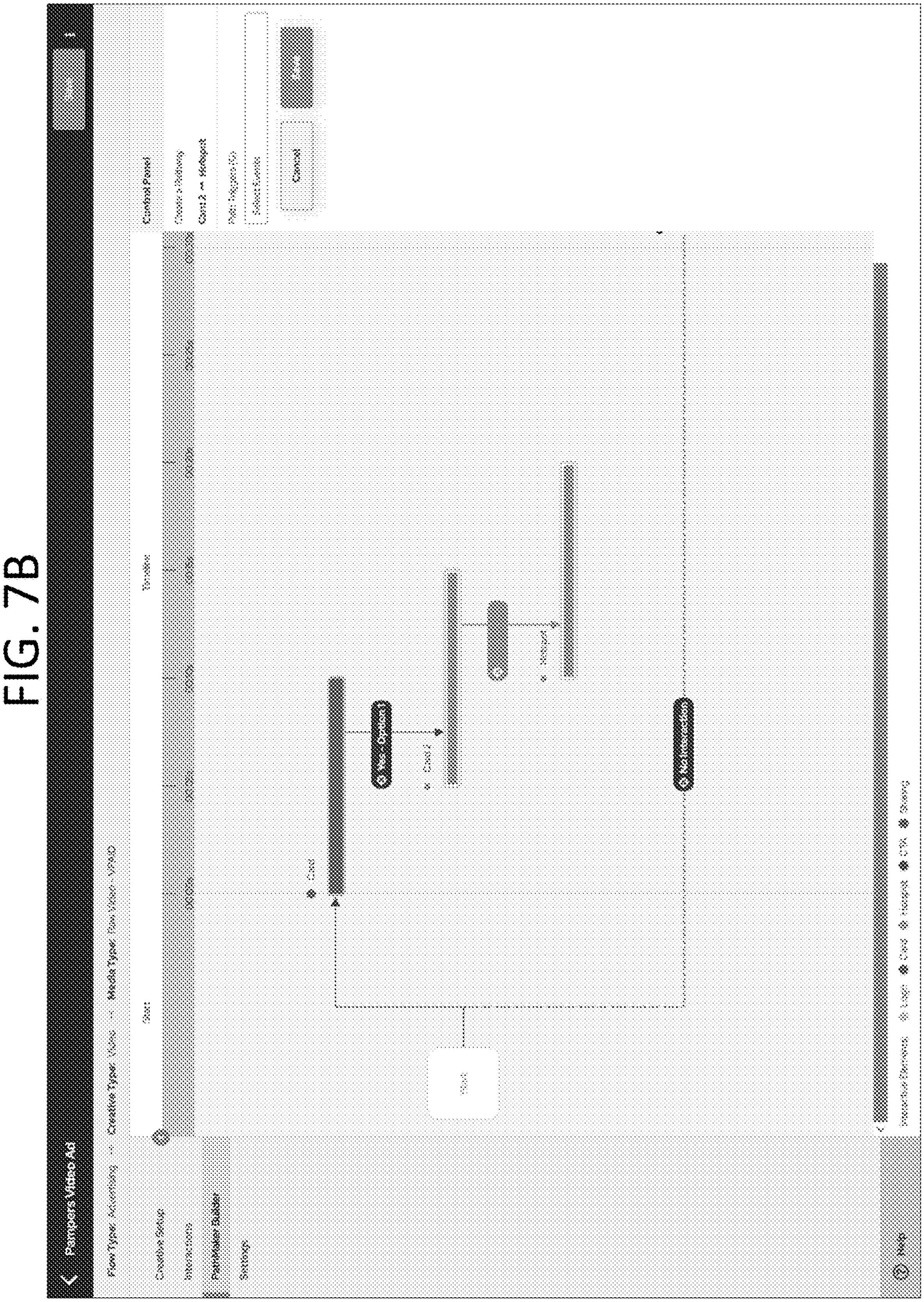
Figure 7C:
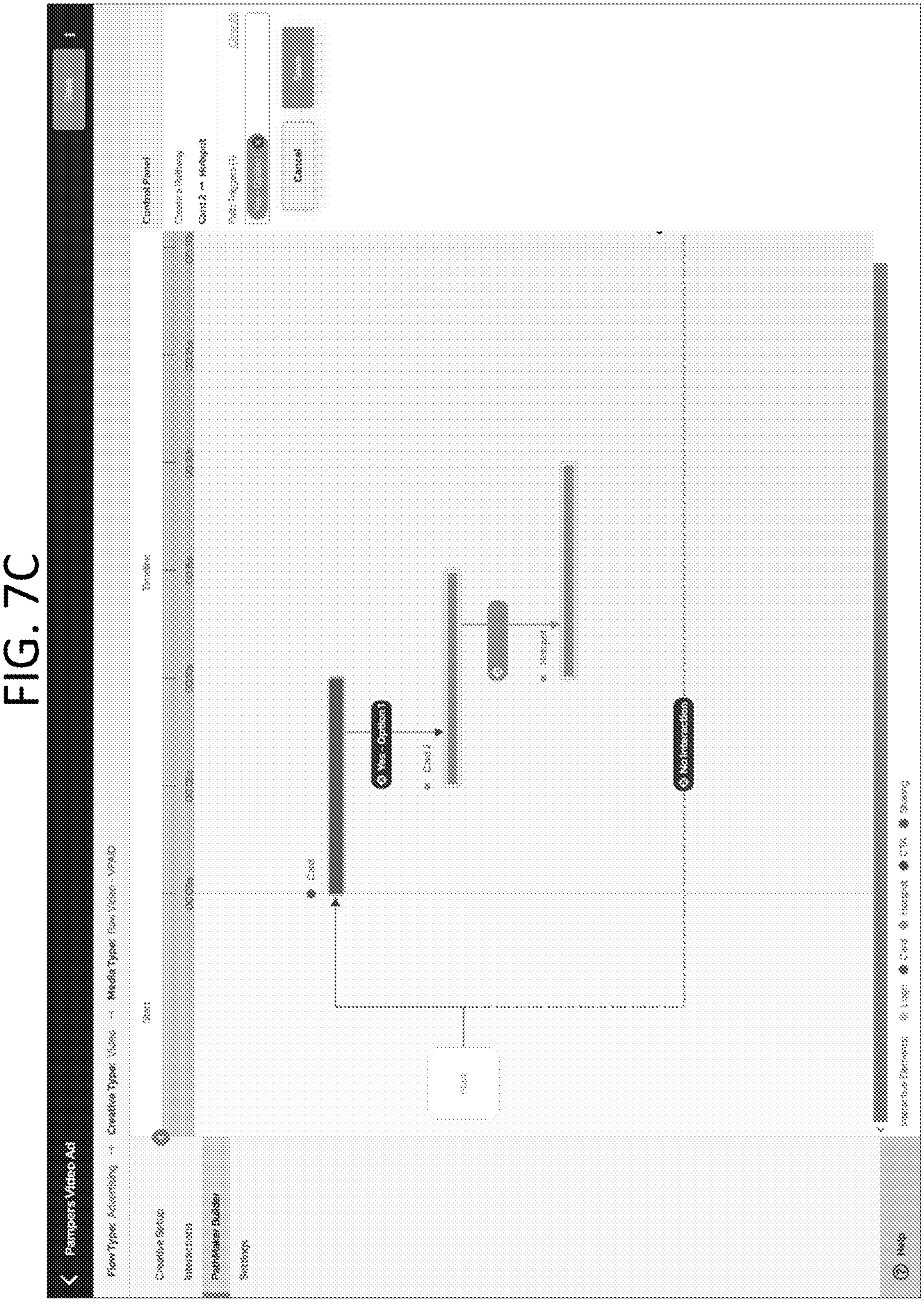
Figure 7D:
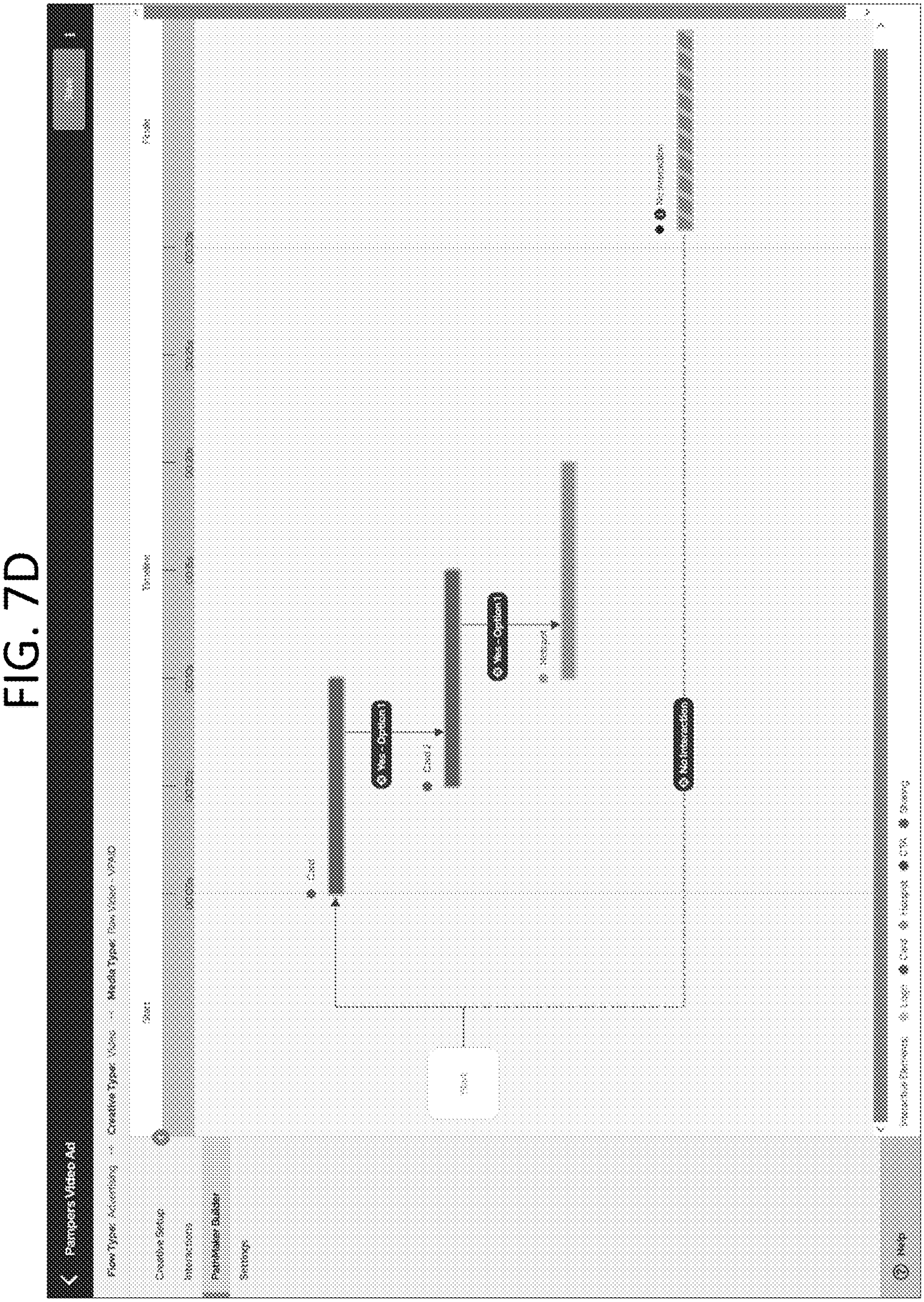

FIG. 7A shows the "Pathmaker Builder" timeline schematic again, this time with the addition of the hotspot created in FIGS. 6A-E. In FIG. 7B, the design-user has dragged the "Hotspot" icon, representing a target overlay, over to the "Card 2" icon, as a source overlay, to establish a link from the source to the target. This in turn brings up another control panel on the right through which, in FIG. 7C, the user connects the "Yes—Option 1" response to the question "Is Pampers your favorite brand?" to the "Take our survey!" hotspot. FIG. 7D shows the timeline schematic once this source-target connection has been established for the selected option of "Card 2". In this configuration, an end-user would need to select "Yes" in response to "Do you buy diapers?" and "Yes" in response to "Is Pampers your favorite brand?" before being shown the hotspot option for "Take our survey!".

Figure 8A:
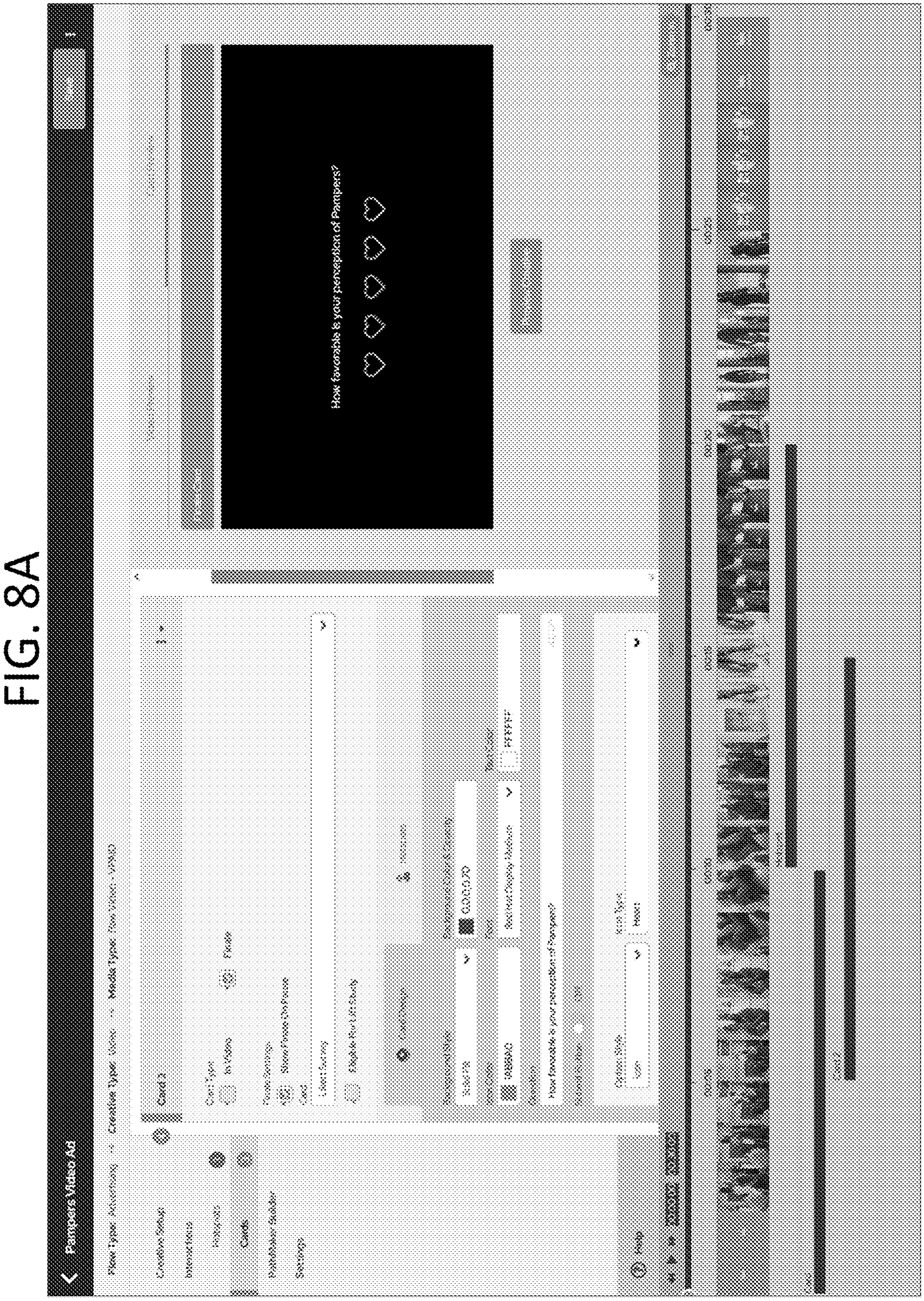
Figure 8B:
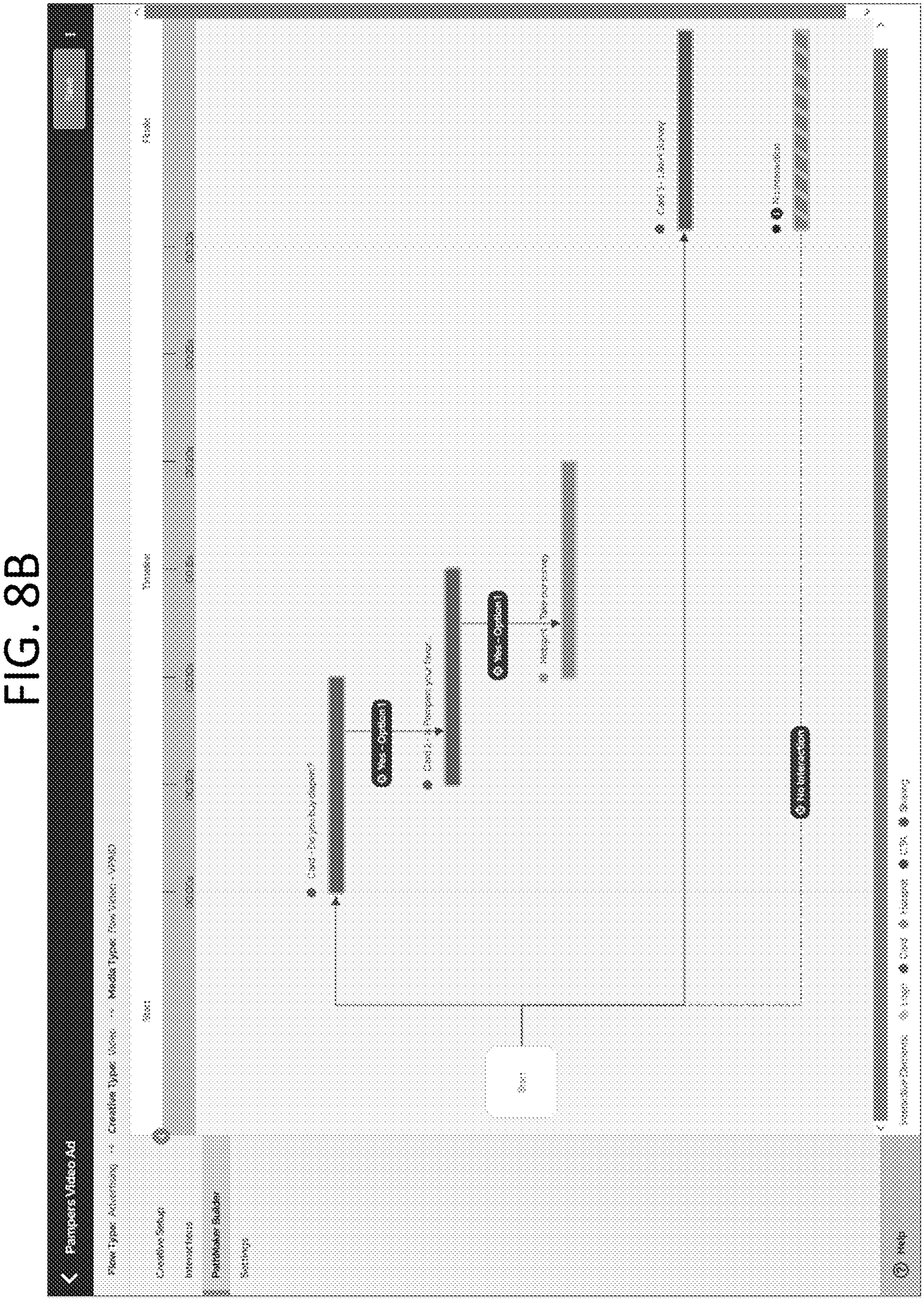

FIG. 8A illustrates a page showing the creation of an additional card overlay, "Card 3", that displays a Likert survey to the end-user. In this case, the "Finale" option is selected to show the card upon completion of display of the video segment, overlaying the still image thumbnail, as specified in FIG. 3B above. FIG. 8B shows the "Pathmaker Builder" timeline schematic again, this time with the addition of the "Card 3" created in FIG. 8A. In addition, in FIG. 8B, the cards and hotspot have been renamed (through options in their respective specification windows) to add descriptions their functions to make them easier to identify.

Figure 8C:
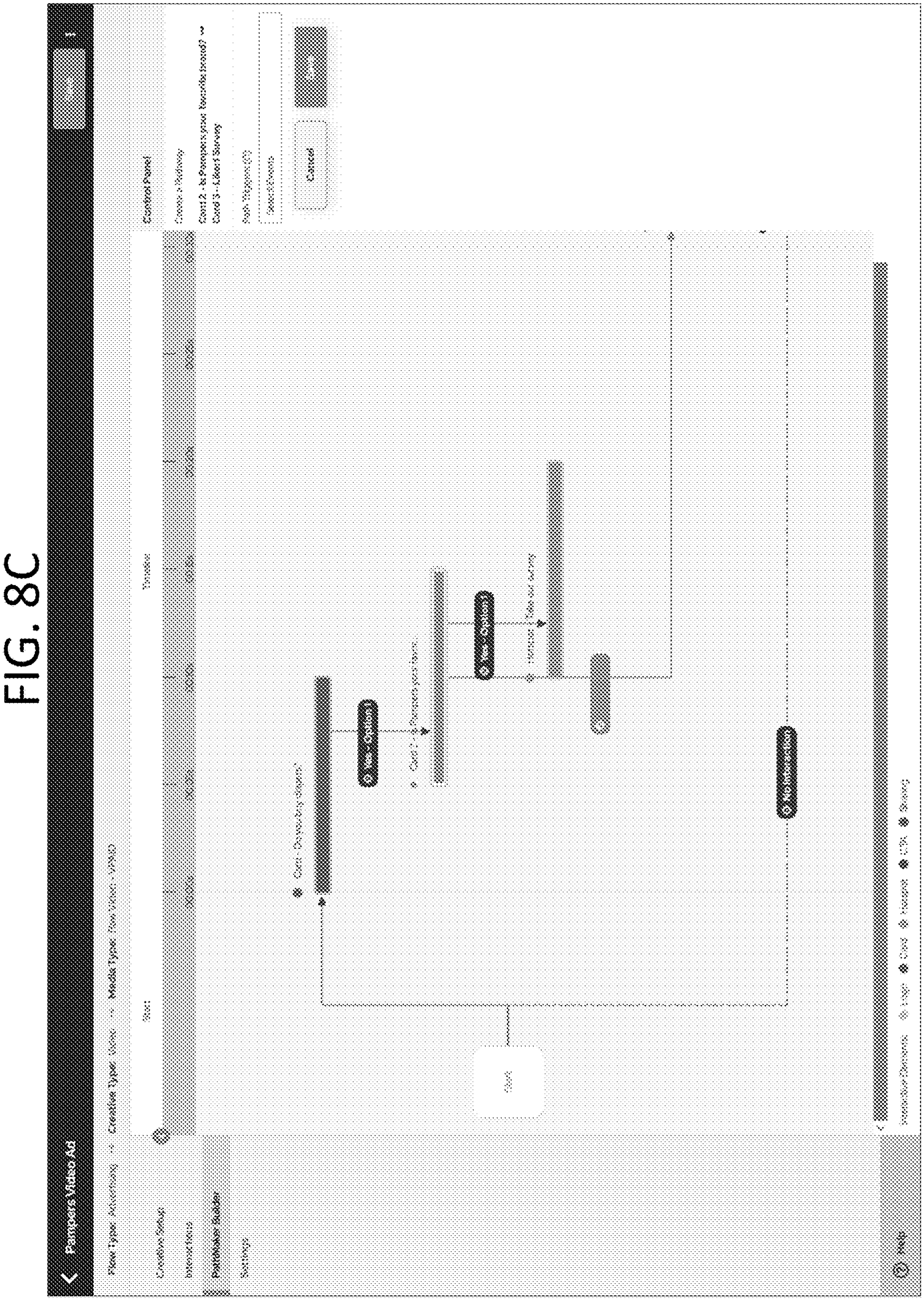
Figure 8D:
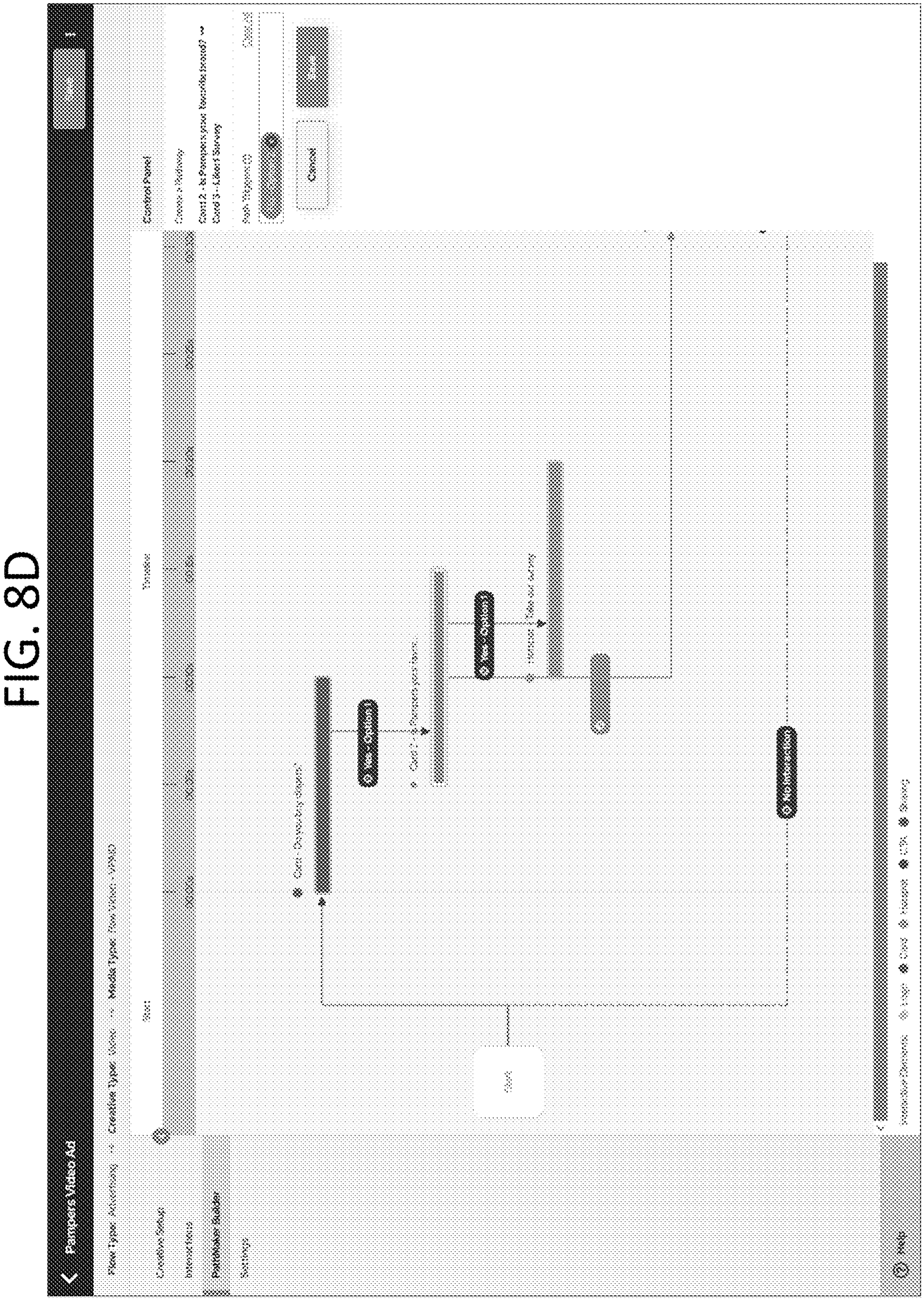
Figure 8E:
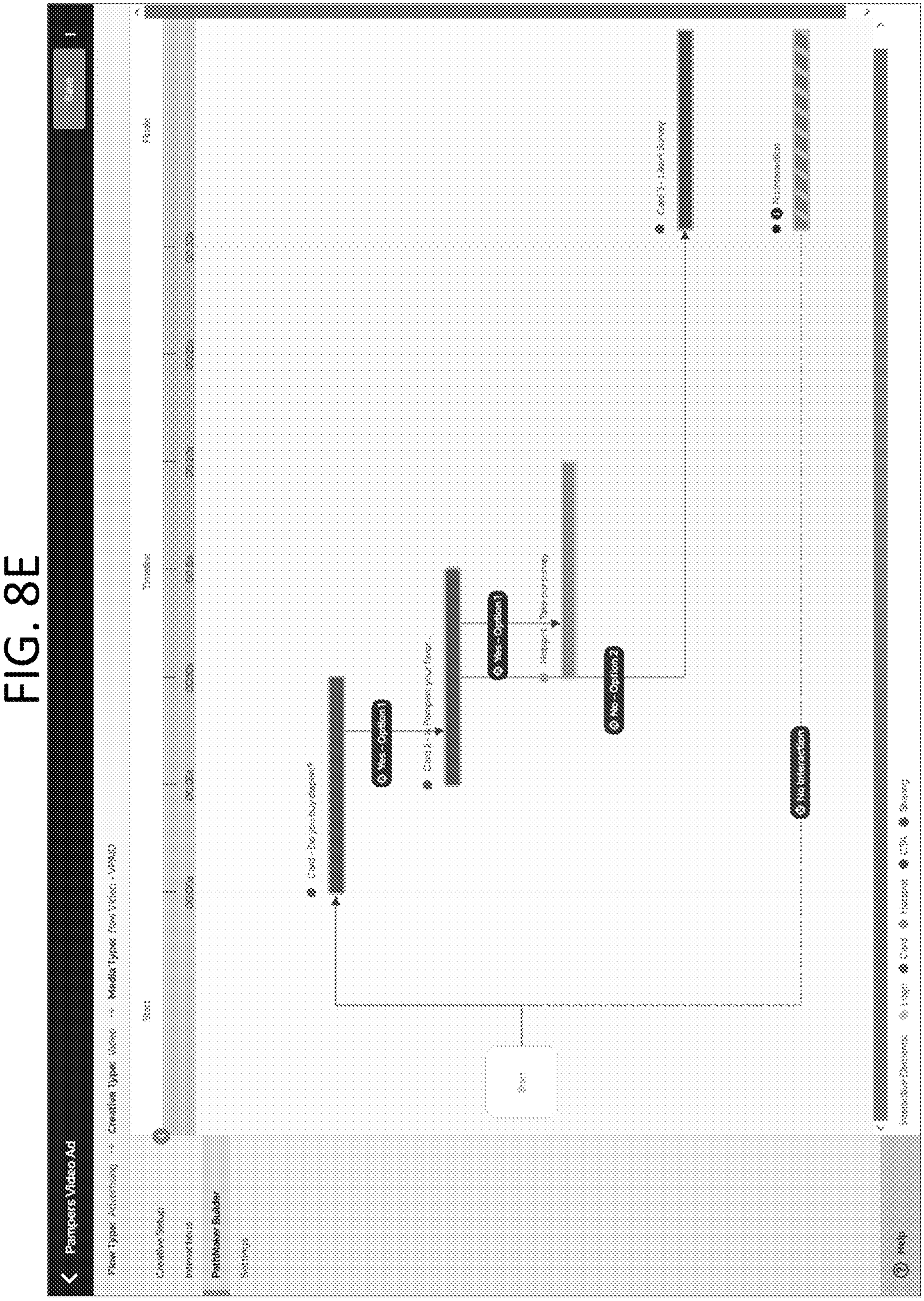

In FIG. 8C, the design-user has dragged the "Card 3" icon, representing a target overlay, over to the "Card 2" icon, as a source overlay, to establish a link from the source to the target. This in turn brings up another control panel on the right through which, in FIG. 8D, the user connects the "No—Option 2" response to the question "Is Pampers your favorite brand?" to the "Card 3—Likert Survey" interactive overlay. FIG. 8E shows the timeline schematic once this source-target connection has been established for the selected option of "Card 3". In this configuration, an end-user would need to select "Yes" in response to "Do you buy diapers?" and "No" in response to "Is Pampers your favorite brand?" before being shown the "Card 3—Likert Survey" at the end of the video segment.

Figure 8F:
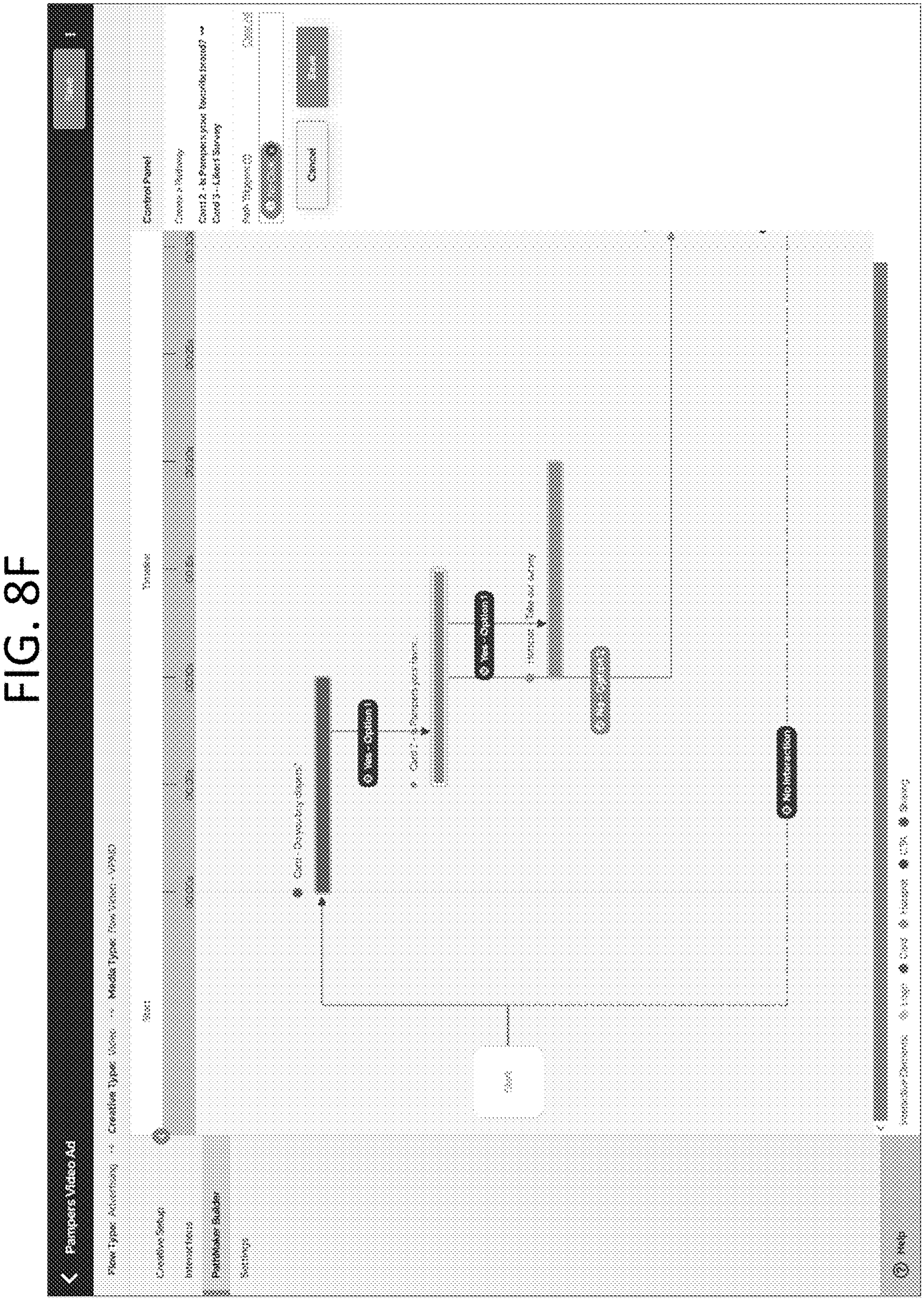
Figure 8G:
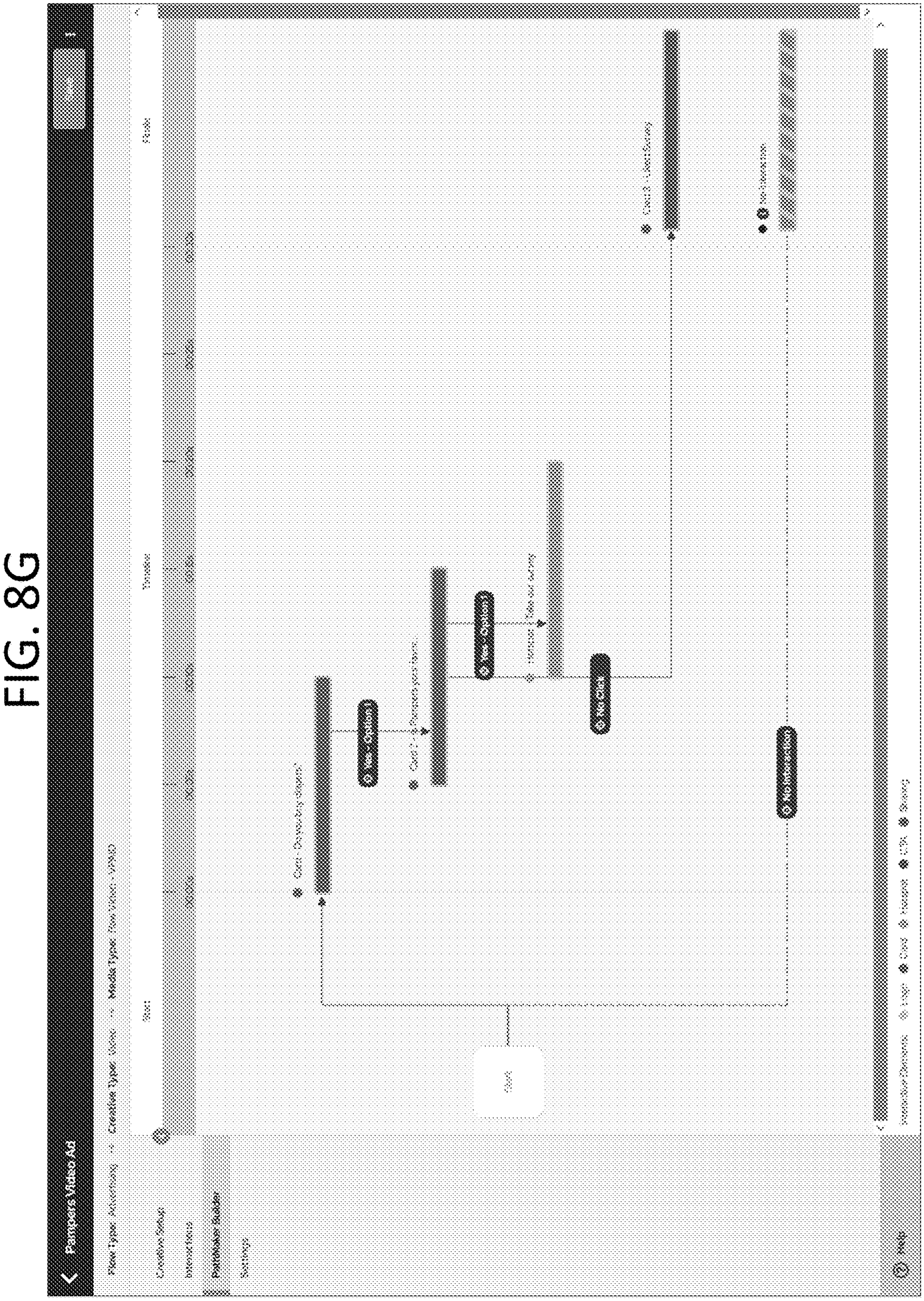

FIG. 8F shows an alternative scenario where the design-user specifies a "No Click" response by the end-user to the question "Is Pampers your favorite brand?" in order to trigger the "Card 3—Likert Survey" interactive overlay to be displayed upon completion of the video segment. FIG. 8G shows the timeline schematic once this alternative source-target connection has been established for the selected option of "Card 3". In this configuration, an end-user would need to select "Yes" in response to "Do you buy diapers?" and fail to provide a response to "Is Pampers your favorite brand?" before being shown the "Card 3—Likert Survey" at the end of the video segment.

Figure 9A:
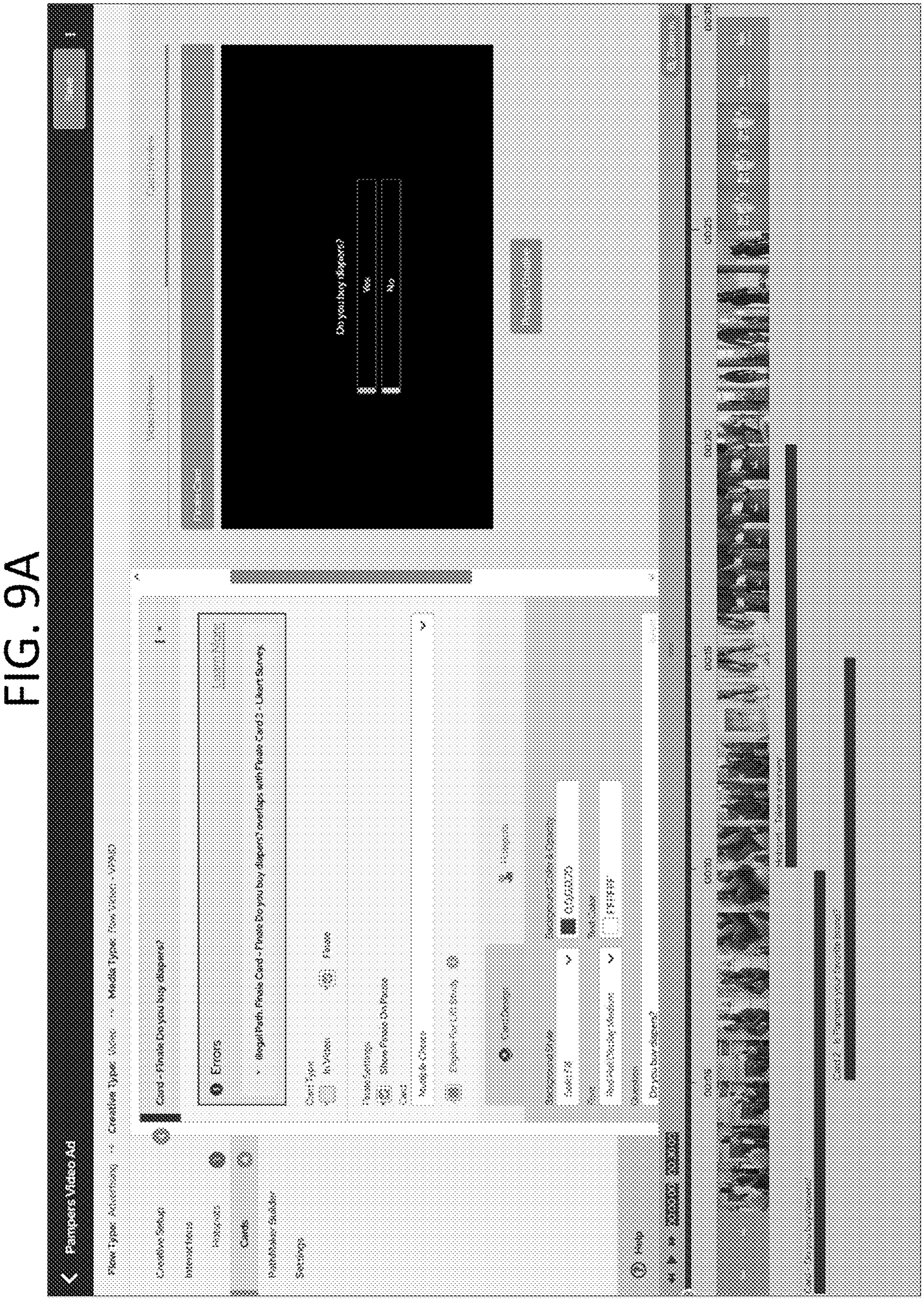
Figure 9B:
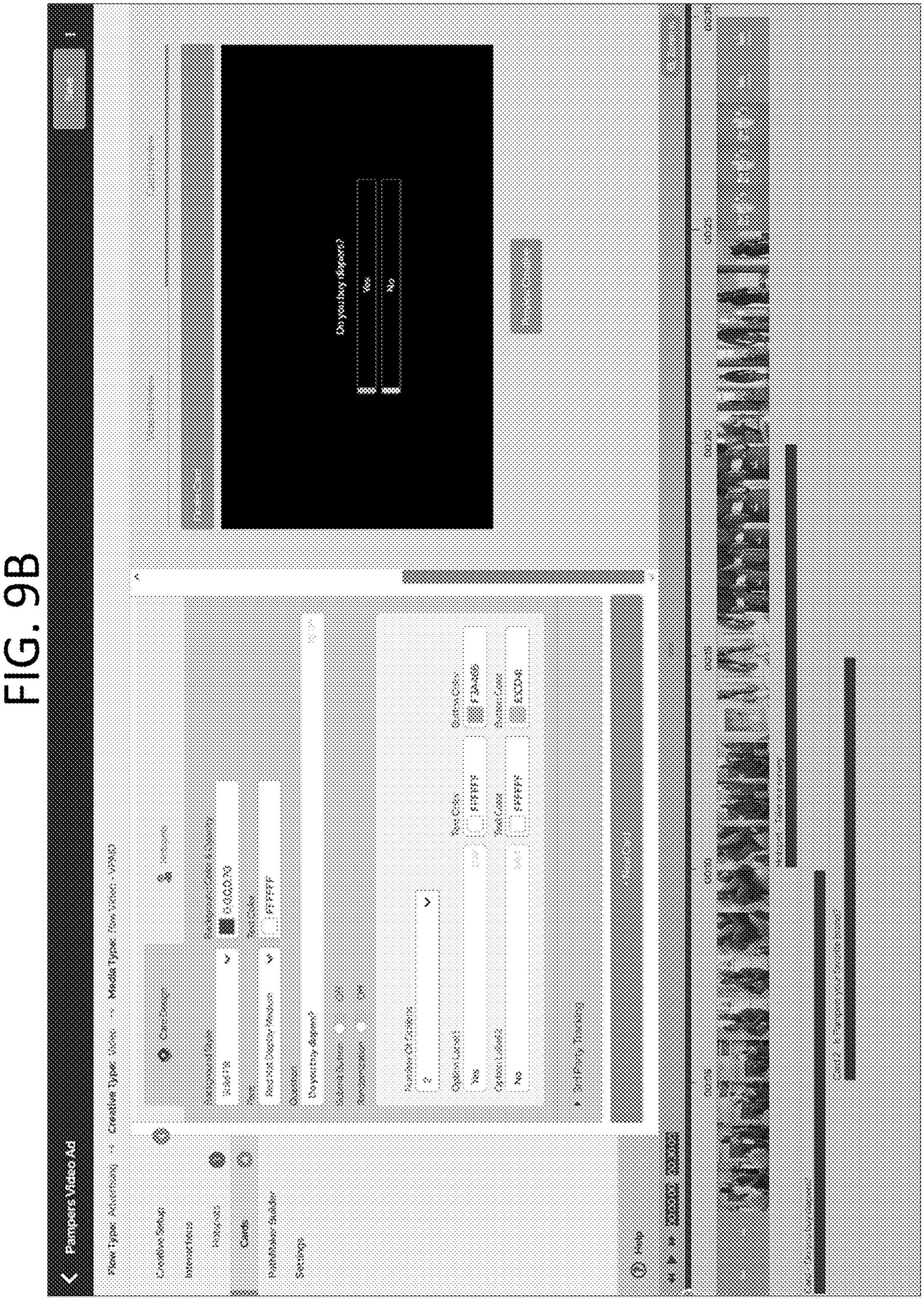

FIG. 9A and FIG. 9B illustrate a page showing creation of an additional card, "Card—Finale Do you buy diapers?". This new card's specification is substantially the same as for the original "Card—Do you buy diapers?" created in FIGS. 4C-G, except in this case, the "Finale" option is selected to show the card upon completion of display of the video segment. As configured, the card will show upon completion of the video segment, but this will conflict with the path described above with respect to FIG. 8E and the Finale "Card 3—Likert Survey". As indicated in FIG. 9A, the system identifies this conflict based on its warning rules and flags it for the end user.

In accordance with one embodiment, a set of warning rules defining disallowed combinations of overlays includes the following warning rules: overlays cannot overlap on screen; two or more card overlays cannot be displayed simultaneously; two or more finale cards cannot be displayed simultaneously (but multiple finale cards can be mapped to different paths to avoid simultaneity); and top logo, bottom logo, call-to-action, and social sharing overlays cannot overlap in time and space (but such elements can overlap in time if they are displayed in different locations and/or are mapped to separate paths).

Figure 9C:
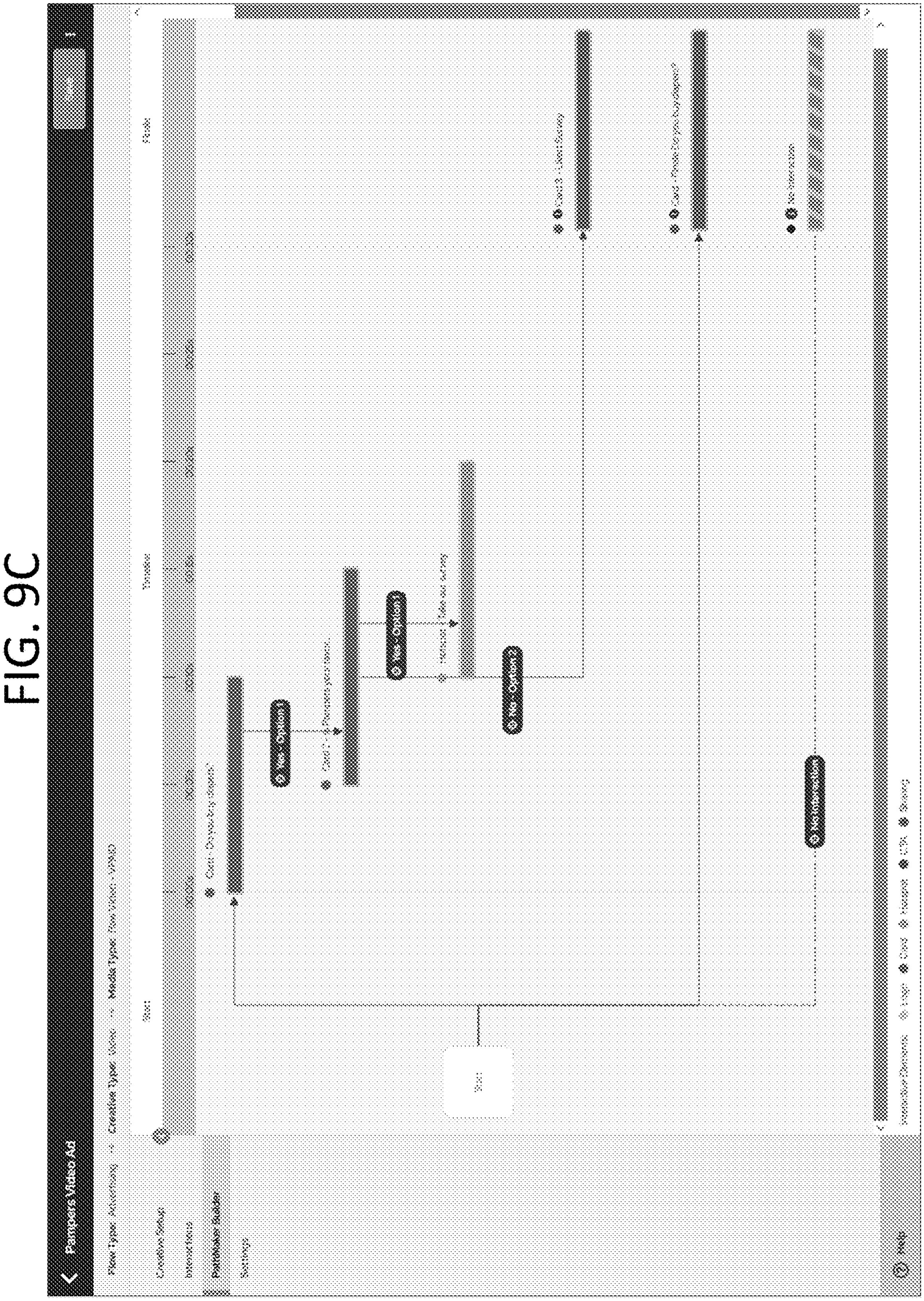
Figure 9D:
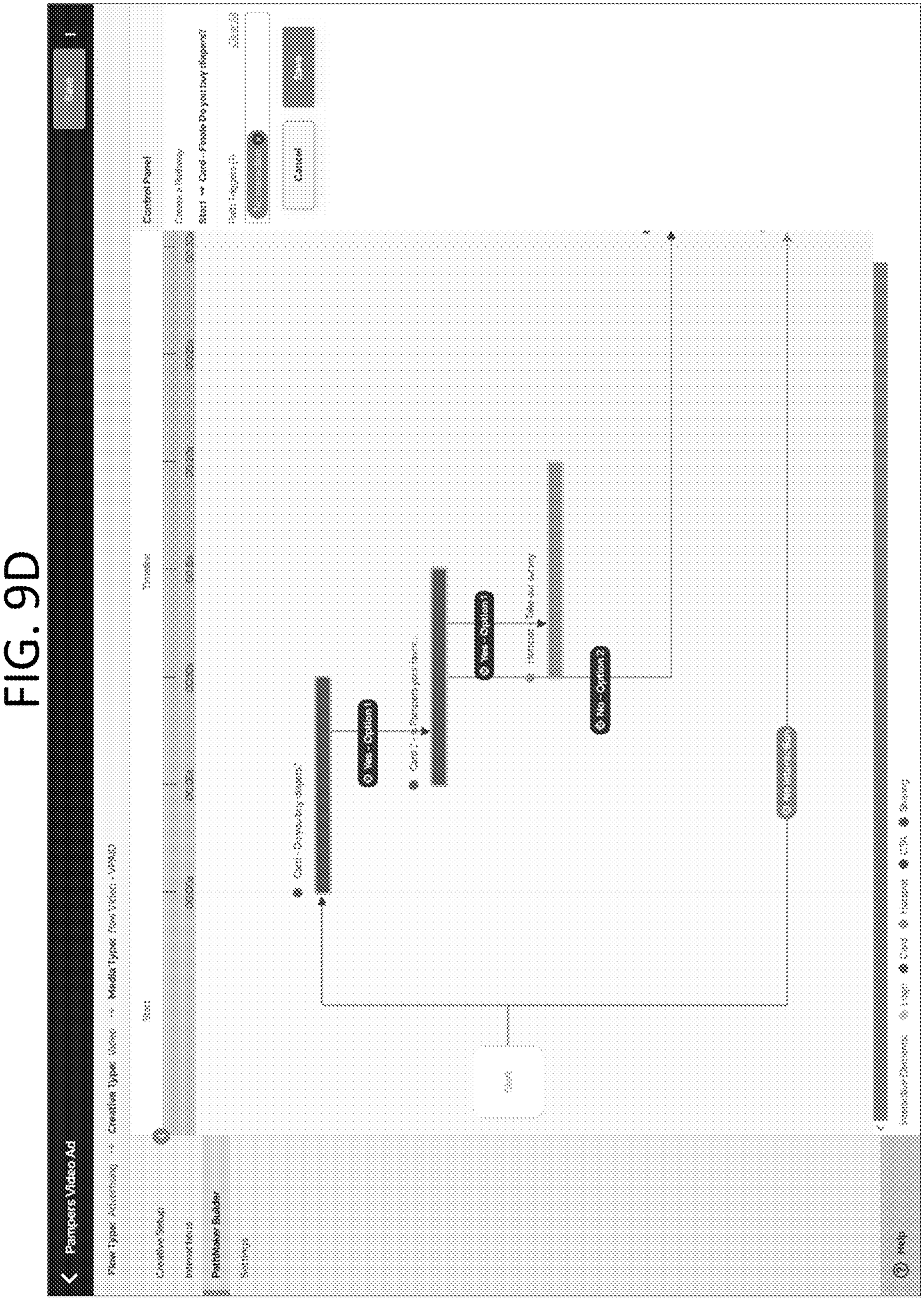
Figure 9E:
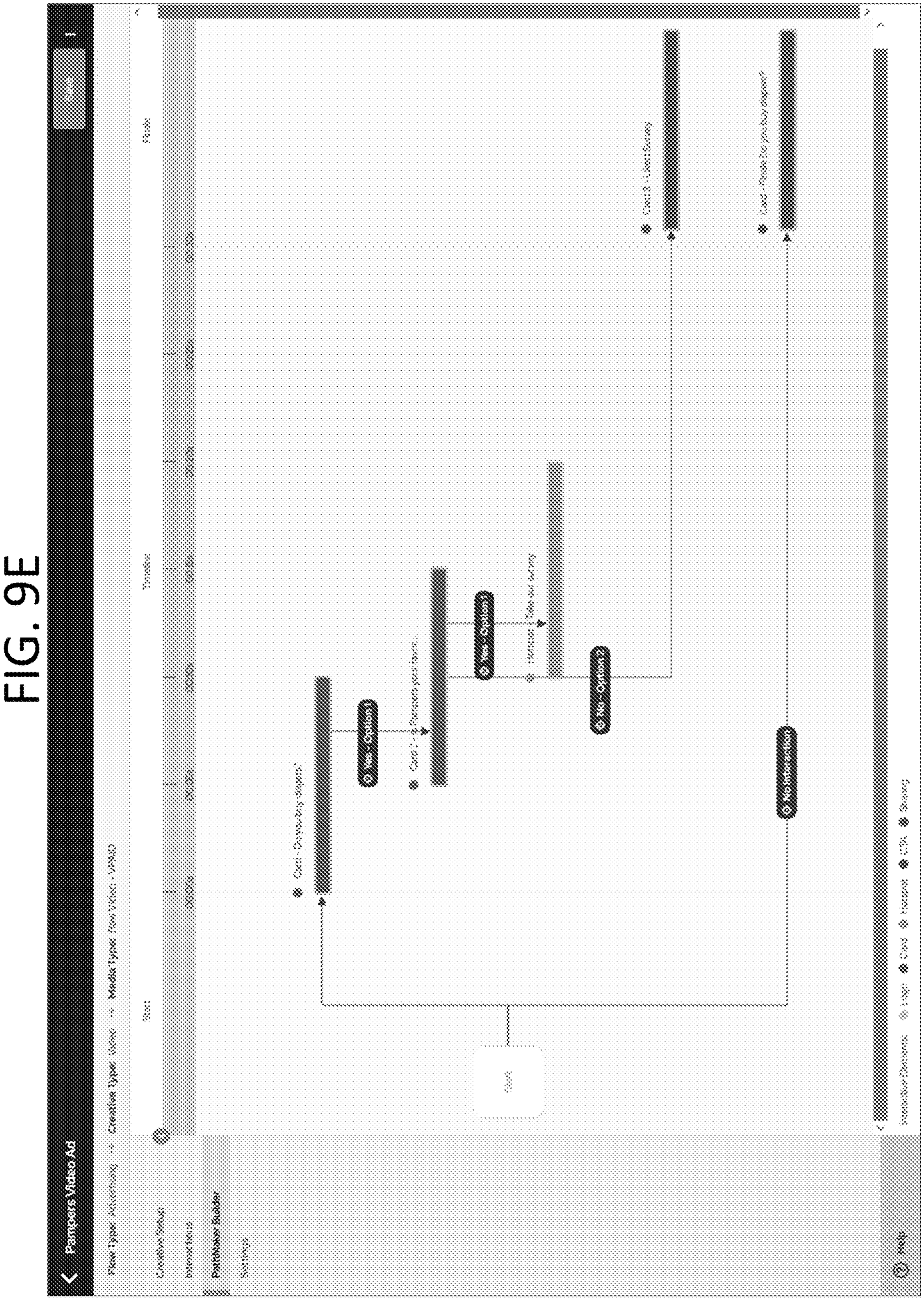

FIG. 9C shows the "Pathmaker Builder" timeline schematic again, this time with the addition of the "Card—Finale Do you buy diapers?" created in FIGS. 9A-B. In FIG. 9D, the design-user has dragged the "Card—Finale Do you buy diapers?" icon, representing a target overlay, over to the "No interaction" icon, to indicate that the target overlay will be shown at the end of presentation of the video segment if the end-user does not interact with any of the interactive overlays. This in turn brings up another control panel on the right that automatically connects the "No interaction" path to the "Card—Finale Do you buy diapers?" finale card. FIG. 9E shows the timeline schematic once this source-target connection has been established for the "No interaction" path. In this configuration, an end-user who does not interact with any interactive overlays will be shown the "Do you buy diapers?" survey.

In addition to interactive overlays, the design interface can also be configured to support non-interactive overlays, such as an overlay that merely displays information and is not configured to receive any end-user input (e.g. by clicking on a hotspot, link, or question response). Overlays can be interactive or non-interactive, and in the case of a non-interactive overlay, the overlay will not be capable of being used as a trigger or source overlay for another overlay. A non-interactive overlay can, however, be configured as a target for an interactive source overlay.

Packaged Video Segment Screen Captures

FIGS. 10A-D, 11A-E, 12A-B and 13A-C illustrate screen captures of presentations of the packaged video segment created as described above to an end-user choosing four different paths.

Figure 10A:
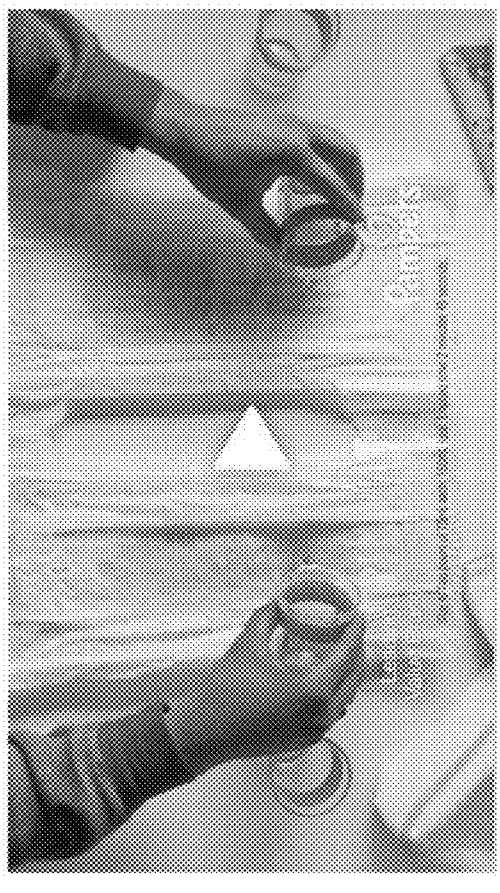
FIGS. 10A-D, 11A-E, 12A-B, and 13A-C show frame captures of various possibilities in which a packaged video segment can be presented to an end-user.
Figure 10B:
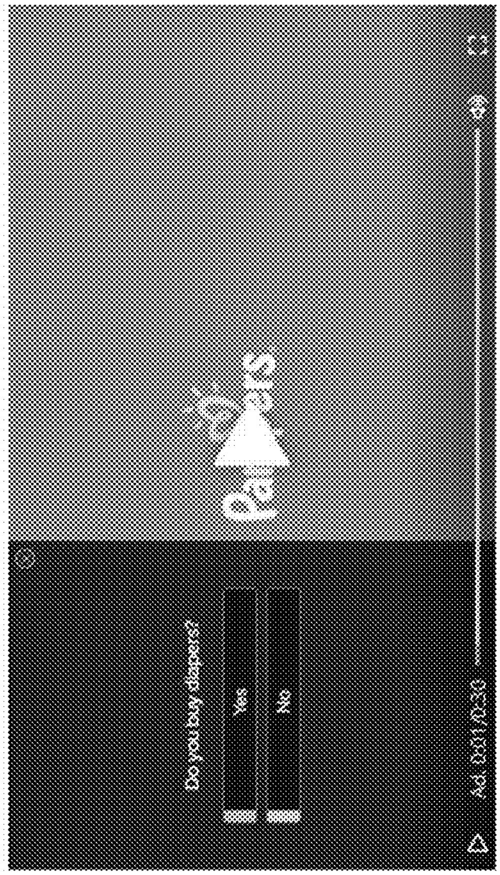
Figure 10C:
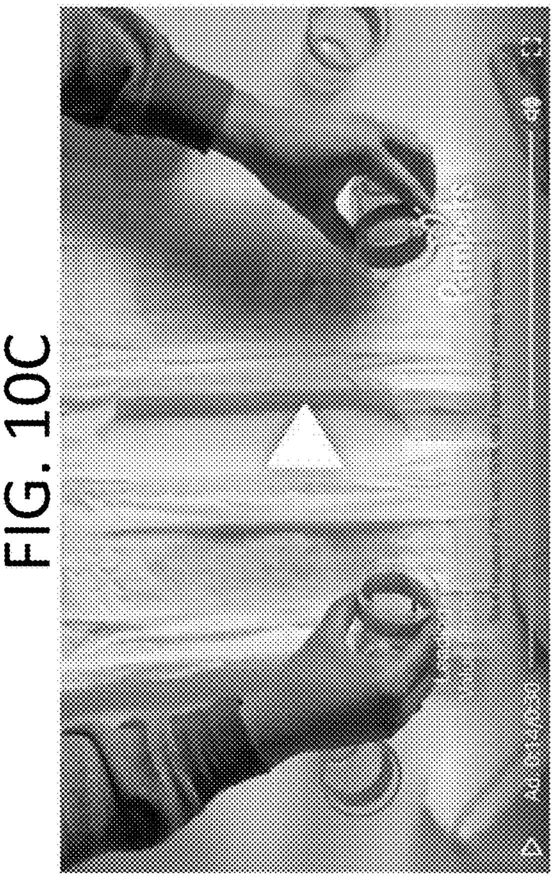
Figure 10D:
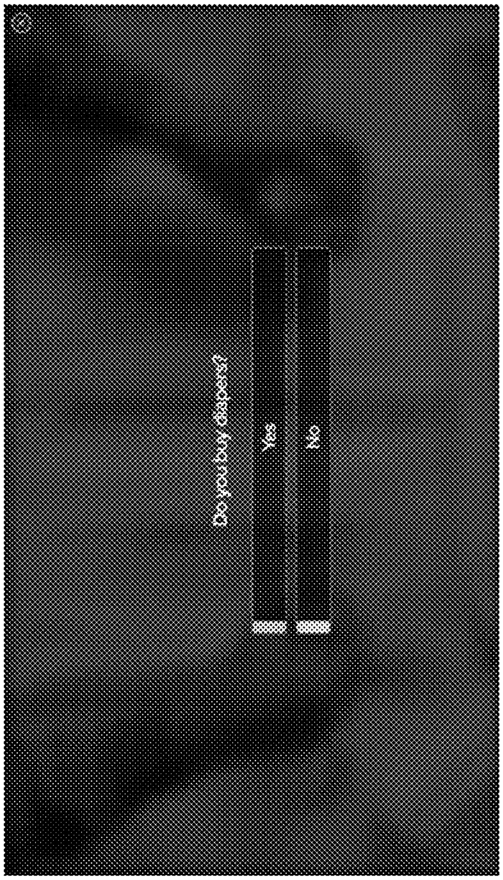
Figure 11A:
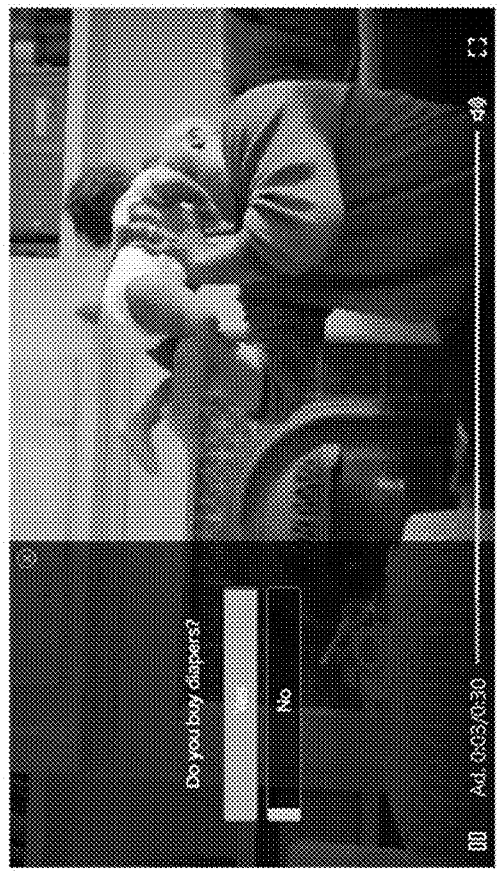
Figure 11B:
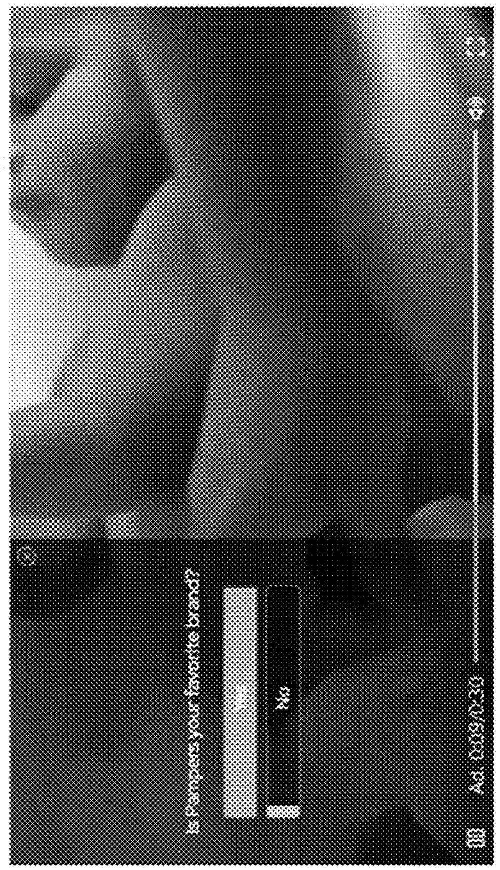
Figure 11C:
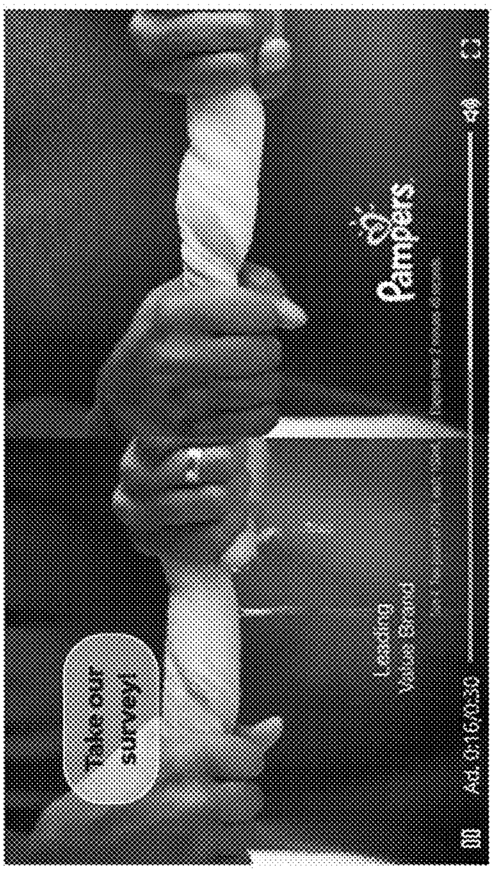
Figure 11D:
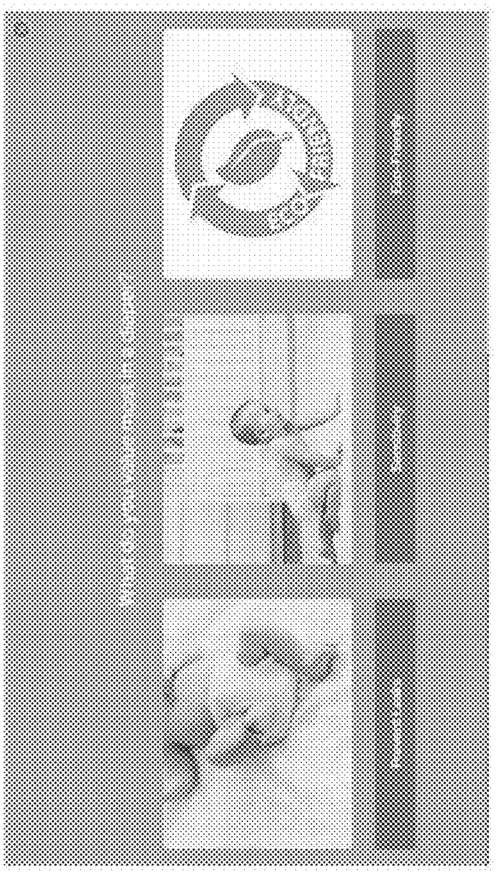
Figure 11E:

FIG. 10A shows a still image thumbnail, as specified in FIG. 3B above, to the end-user before the user selects an option to play the video. FIGS. 10B and 10C are screenshots of the paused packaged video segment during playback when the end user makes no selections in the interactive overlays. FIG. 10D shows the screen and at the end of the video segment without receiving any interactions from the user and showing a "Do you buy diapers?" "No interaction" overlay over the same still image thumbnail as was shown before video play was started.

In FIGS. 11A-E, the end-user selects "yes" to the question "Do you buy diapers?", at which point this first interactive card overlay disappears. If or once the video has passed 5 seconds (as specified in the specification of the card), the next interactive card overlay asking "Is Pampers your favorite brand?" is displayed to the user, and the user again responds "yes". The user is then presented the option, starting at 10 seconds or upon the prior response of "yes", to "Take our survey!", which the user selects/clicks. The user is then shown the survey while the video is paused. Once the user completes the survey, the video then resumes and completes.

Figure 12B:
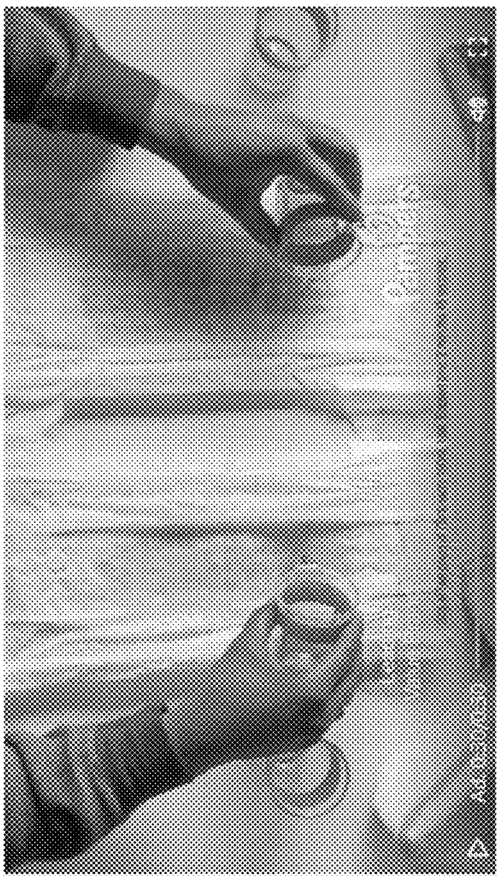
Figure 12A:
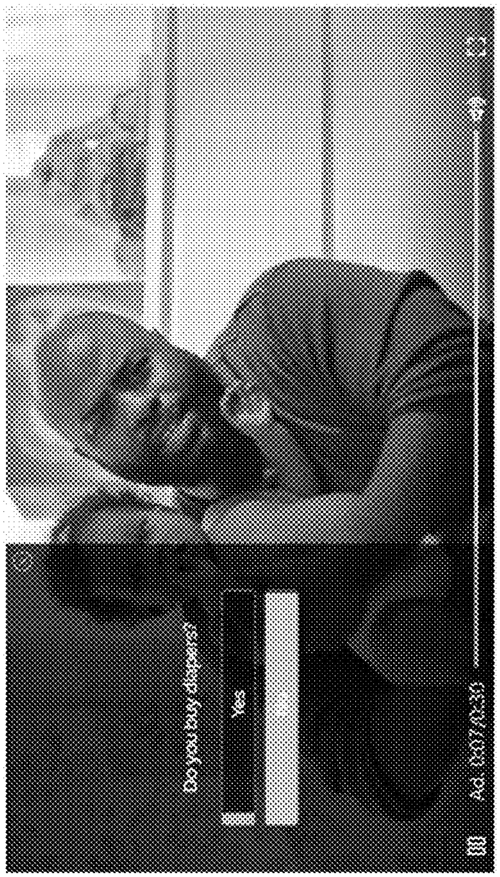

In FIGS. 12A-B, the user selects "no" to the question "Do you buy diapers?", at which time the first interactive card overlay disappears, and no further interactive overlays are presented as the video completes.

Figure 13B:
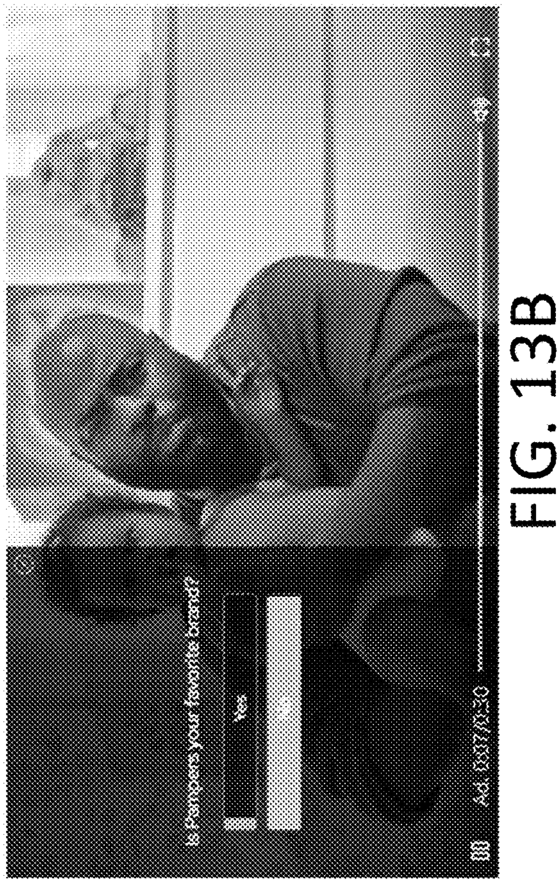
Figure 13A:
Figure 13C:
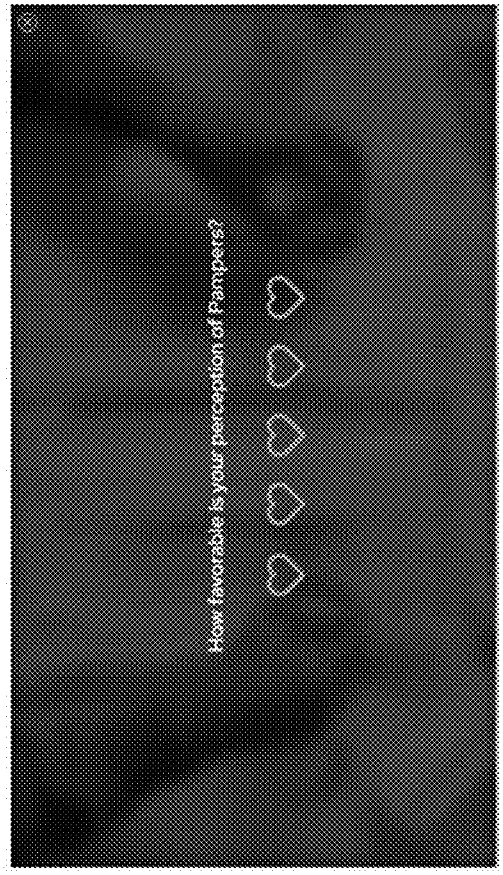

In FIGS. 13A-C, the user selects "yes" to "Do you buy diapers?" but no to "Is Pampers your favorite brand?", after which the video completes and the user is then presented a Likert survey upon completion.

Display of End-User Statistics

Figure 14A:
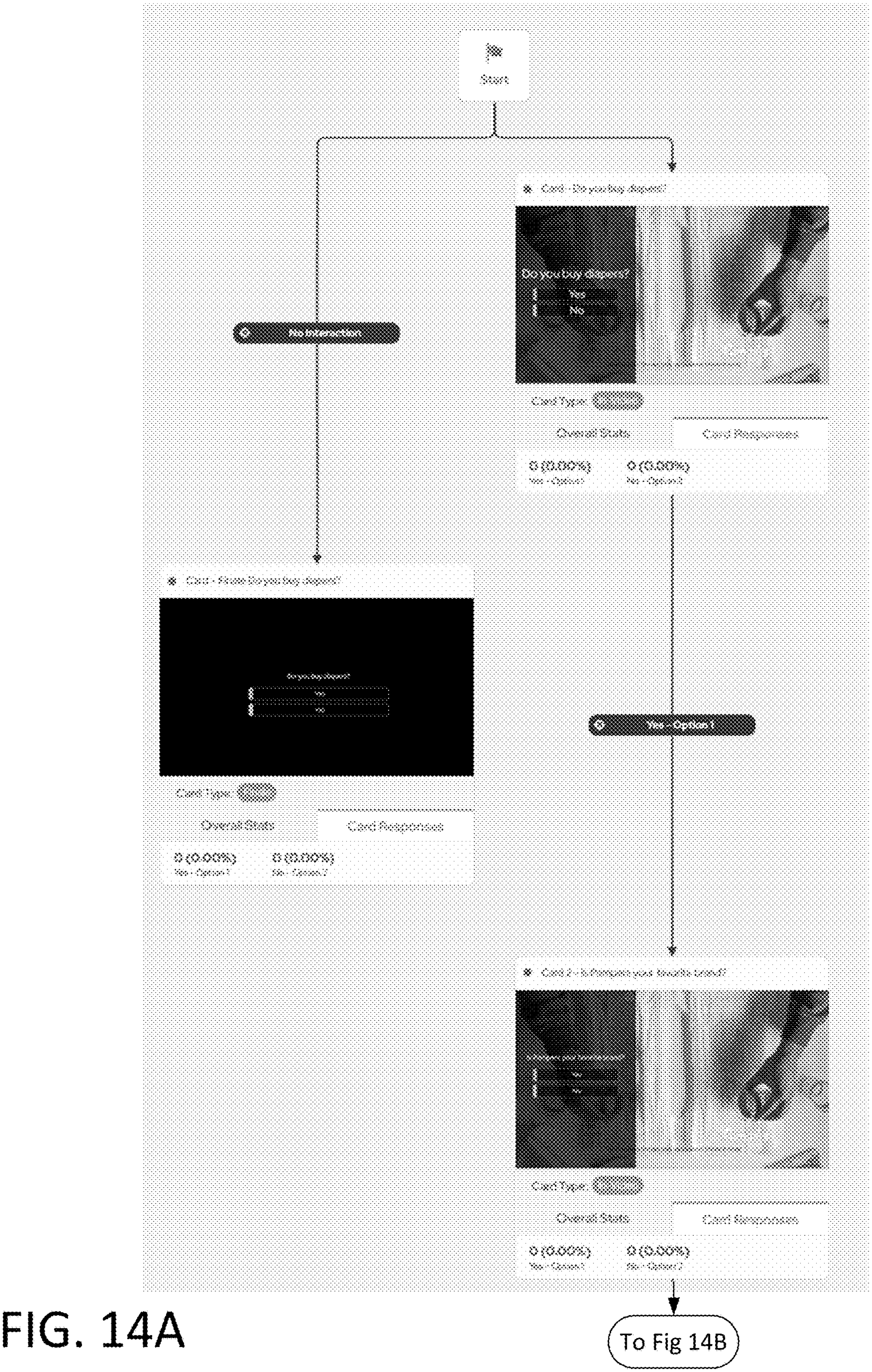
FIGS. 14A-D illustrate views of a schematic that shows statistics for collected end-user responses to interactive overlays.
Figure 14B:
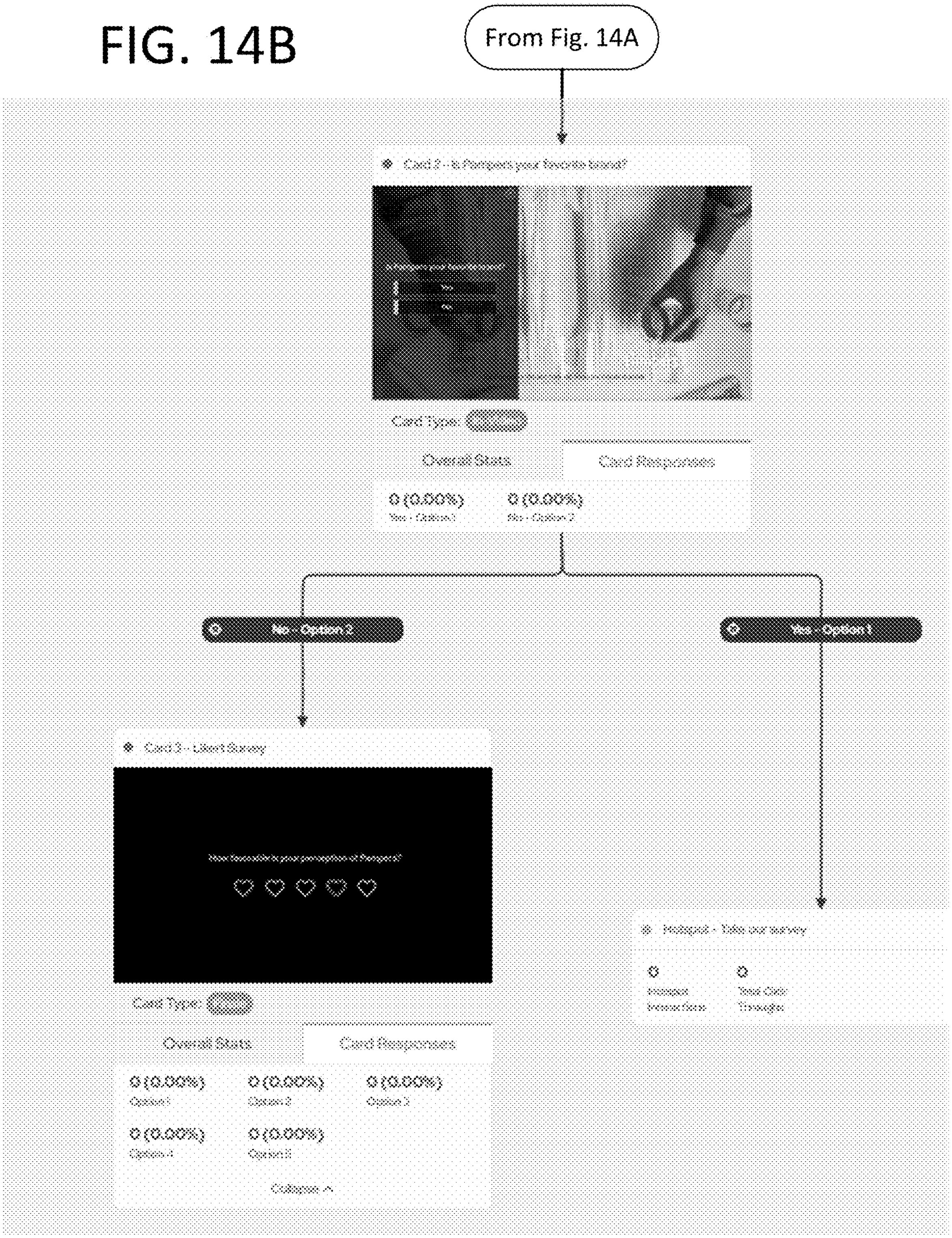
Figure 14C:
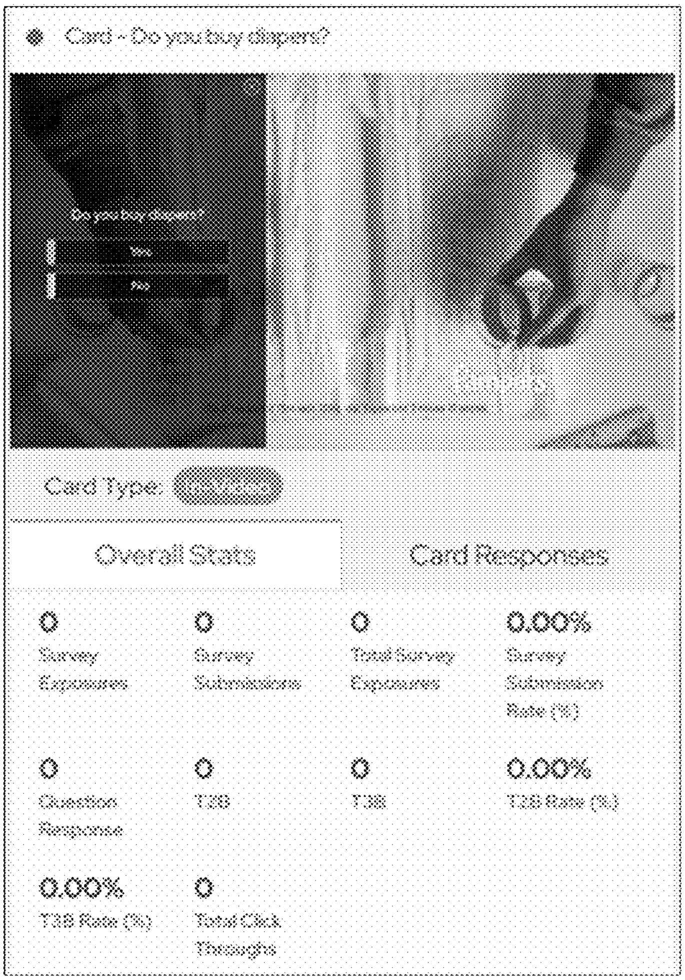
Figure 14D:

FIGS. 14A-B illustrate an additional schematic that can be displayed through the design interface and which shows statistics for collected end-user responses to the interactive overlays. The design-user can toggle between two tabs on an icon representing each overlay to show overall statistics of users viewing. FIGS. 14C-D show close-up screenshots of the two tabs for one overlay showing overall statistics as well as end-user responses.

Design User Face—Additional Embodiment

FIGS. 15A-D illustrate a "Pathmaker Builder" section of the design interface in accordance with an additional embodiment that enables the design-user to trigger target overlays based on logical combinations of conditions of one or more source overlays.

Figure 15A:
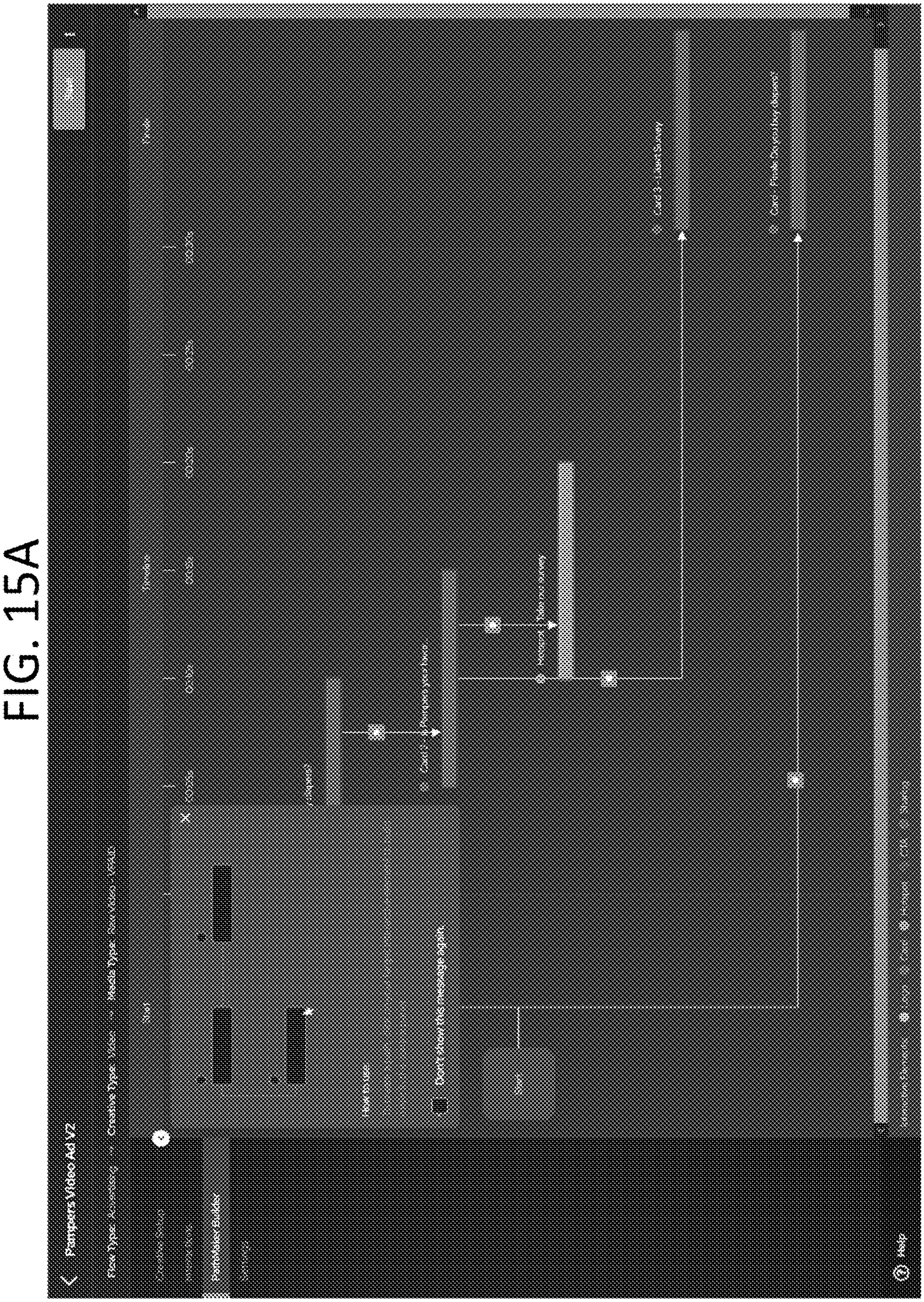
FIGS. 15A-D illustrate a section of the design interface in accordance with an additional embodiment.
Figure 15B:
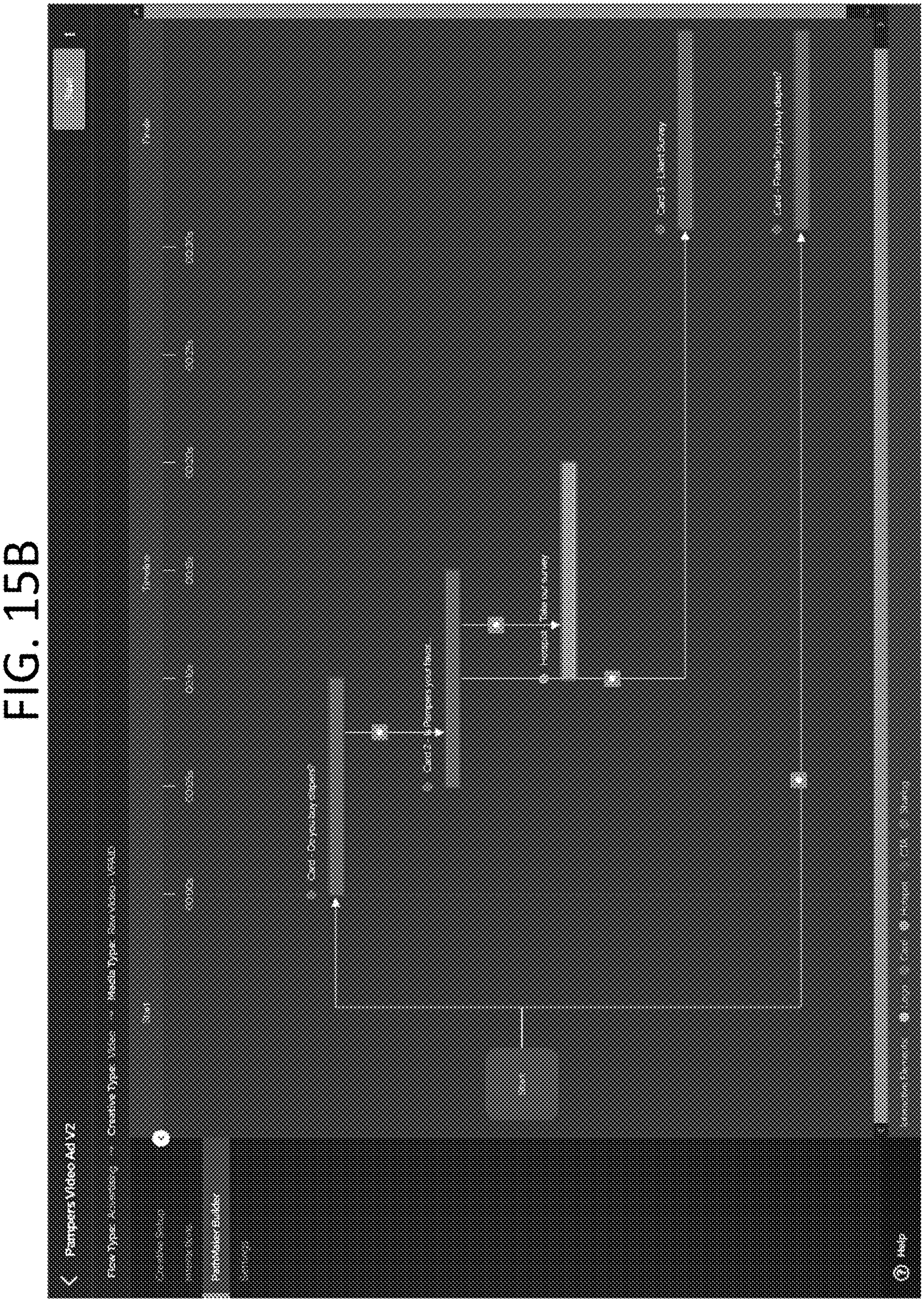

FIG. 15A continues from the example packaged video segment configuration as shown in FIG. 9D, but in accordance with the additional embodiment. FIG. 15A now shows a different "How to use" dialog box that tells the design-user "To create a path, click on your target interactive element (overlay) to build a rule in the control panel." FIG. 15B shows a bar icon representing each of the overlays Card, Card 2, Hotspot—Take our survey, Card 3 and Card-Finale in a schematic representation along a timeline for the video segment. The schematic representation shows a "Start" icon representing a start of the video segment that then connects by visual links to each of the Card and Card-Finale overlays, consistent with the state of the system in FIG. 9D.

Figure 15C:
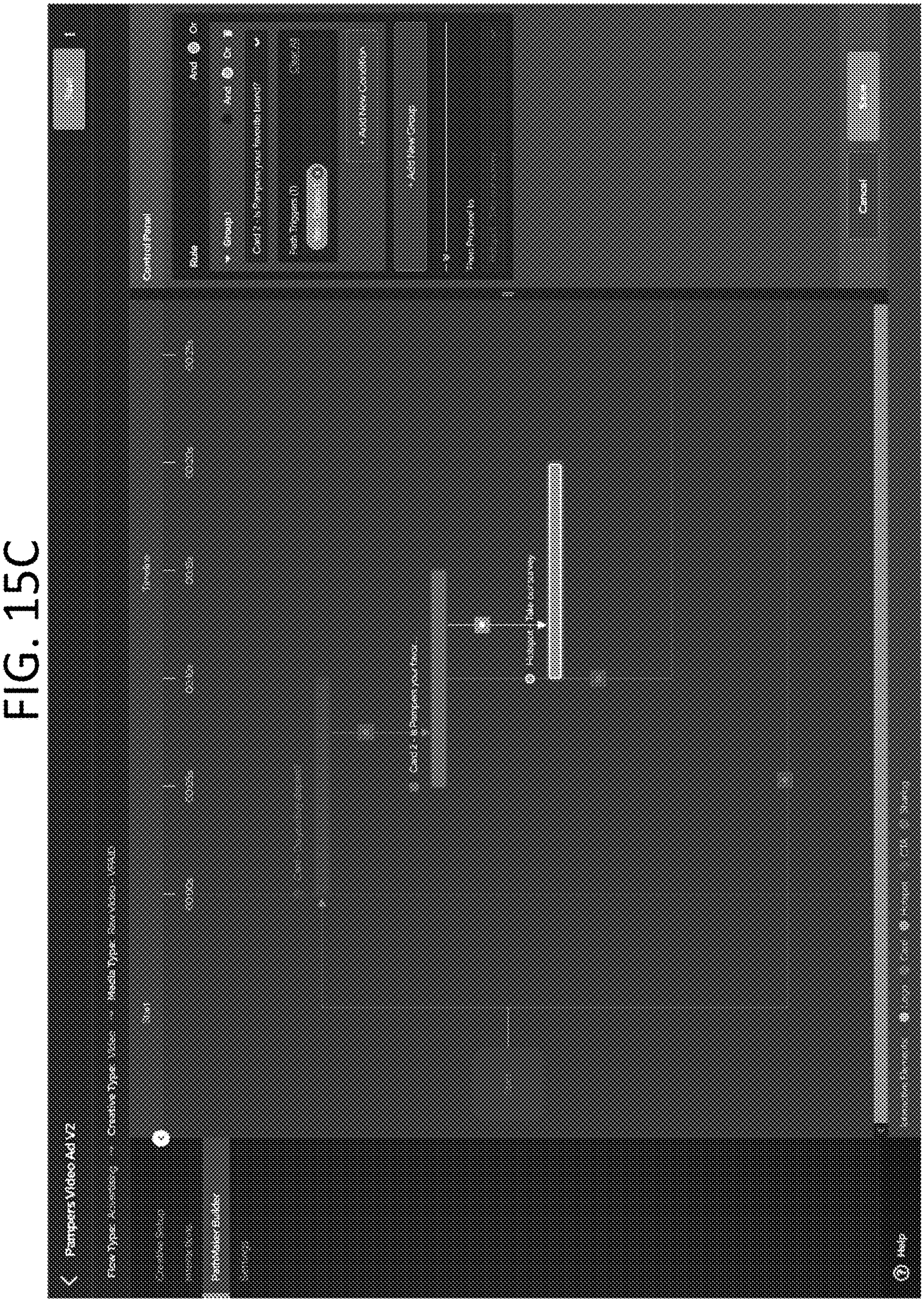

FIG. 15C shows the control panel that appears when the design-user selects the "Hotspot—Take our survey" overlay. The control panel enables the end user to define a rule, which can be a logical combination of groups of conditions, the satisfaction of which will lead to display of the "Hotspot—Take our survey" overlay.

Figure 16:
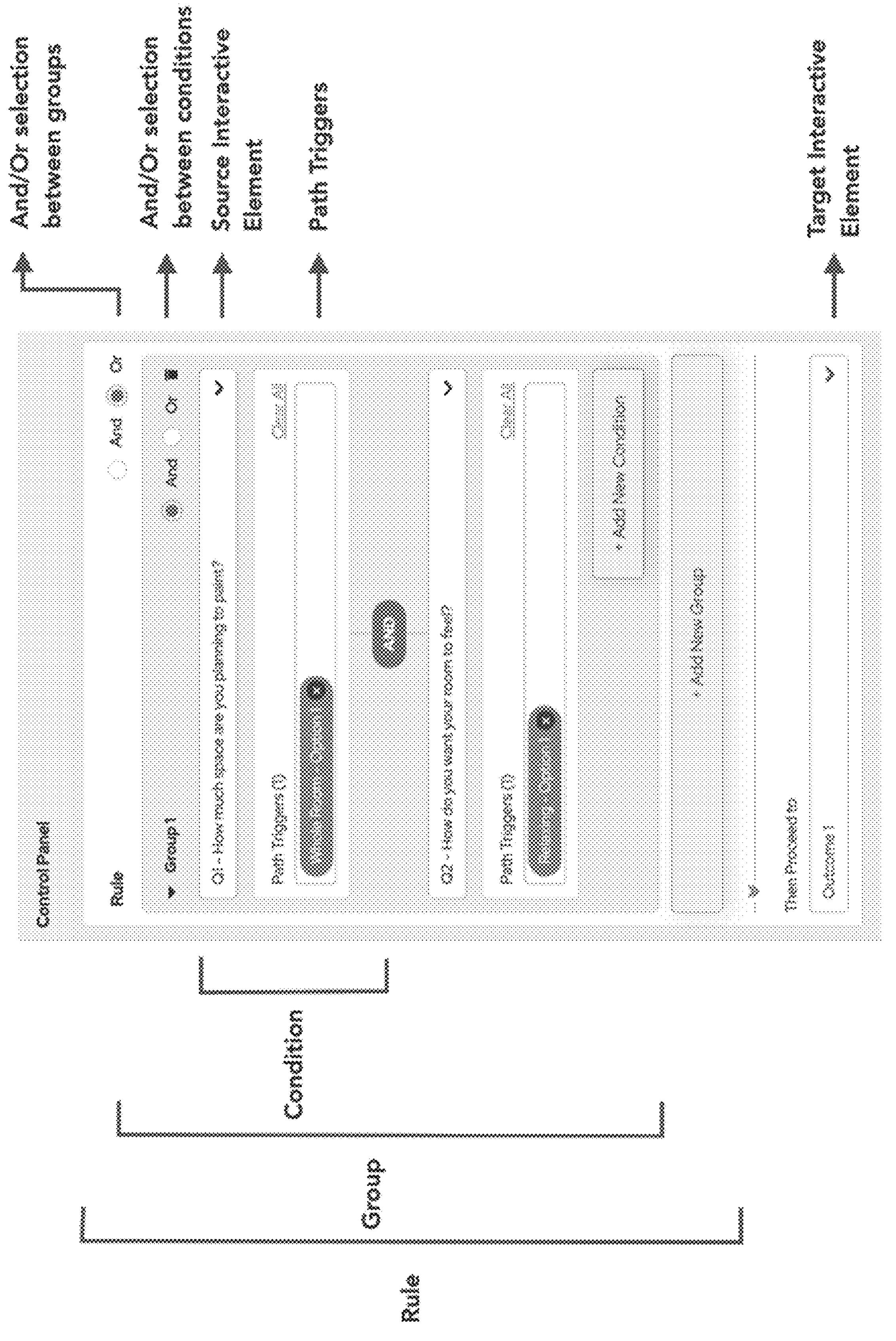
FIG. 16 illustrates an annotated example control panel.

FIG. 16 illustrates an annotated example control panel showing different parts of the control panel that can be used to build and configure a rule. As shown in FIG. 16, a rule can include one or more groups of conditions. More particularly, a rule can be constructed of a logical combination (e.g. and/or) of one or more groups. Each group, in turn, can be constructed of a logical combination (e.g. and/or) of one or more conditions. Each condition defines a set of triggers or applicable user responses to another identified interactive overlay in the packaged video segment that satisfy the condition. In the illustrated example of FIG. 16, the rule is satisfied and its associated overlay (which can be interactive or just static) is displayed when an end-user responds to the interactive overlays Q1 and Q2 as shown.

Figure 15D:
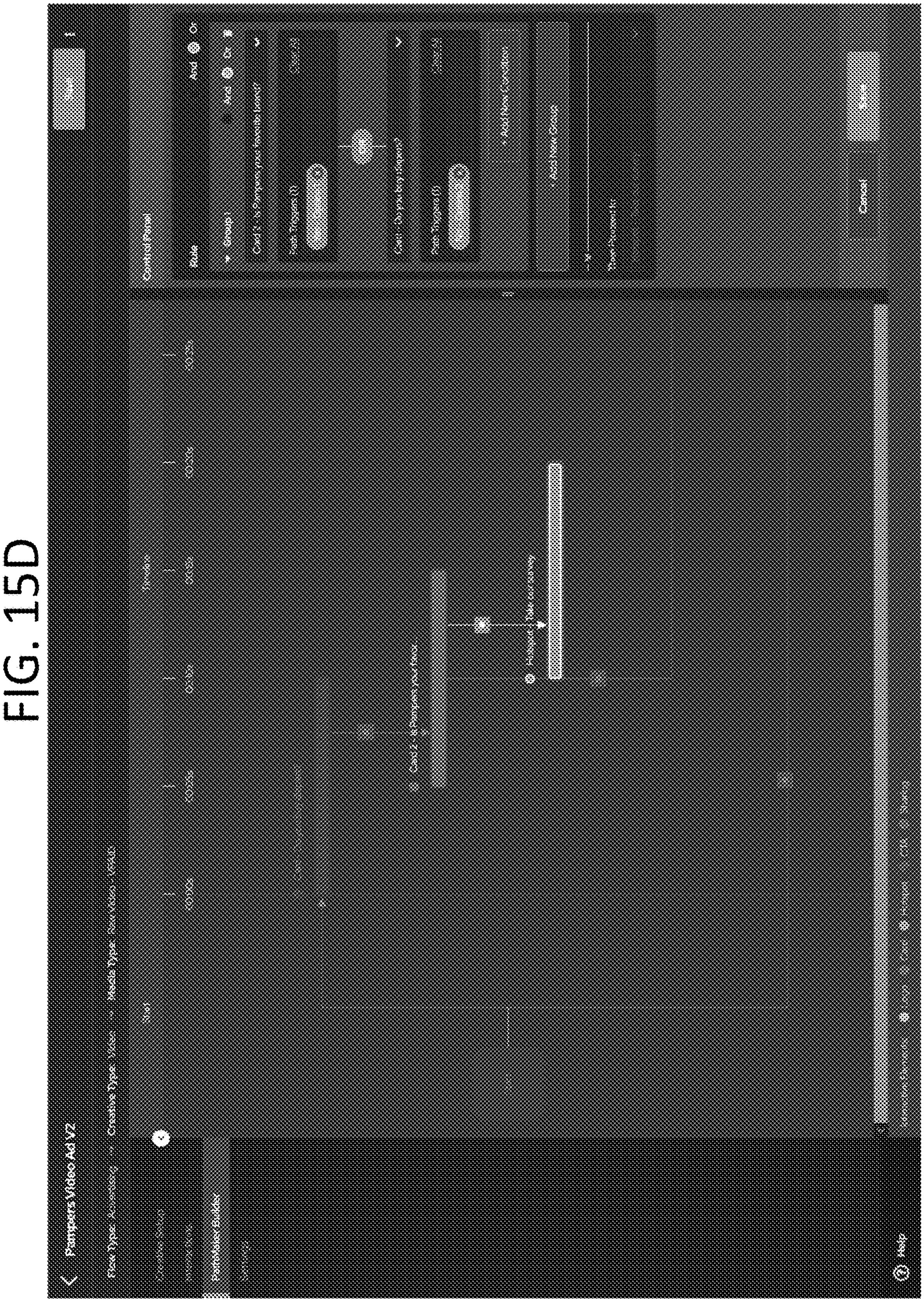

FIG. 15D shows the control panel after the design-user has updated the rule to trigger either when an end-user responds "yes" to the Card 2 interactive overlay "Is Pampers your favorite brand?" or when the end-user responds "no" to the Card interactive overlay which asks "Do you buy diapers?".

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 17:
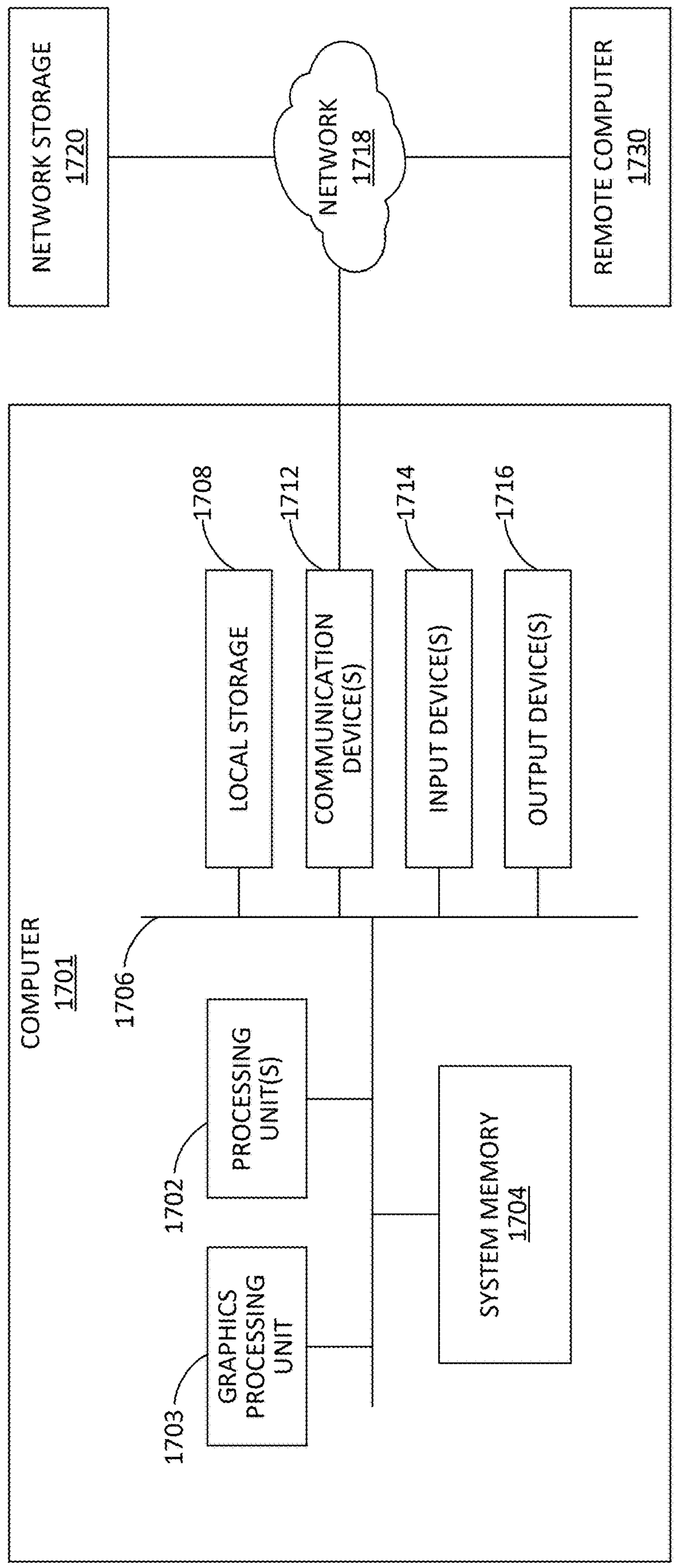
FIG. 17 illustrates an example computer system in the form of which the disclosed system can be implemented.

FIG. 17 illustrates a general computer architecture 1700 that can be appropriately configured to implement components disclosed in accordance with various embodiments. The computing architecture 1700 can include various common computing elements, such as a computer 1701, a network 1718, and one or more remote computers 1730. The embodiments disclosed herein, however, are not limited to implementation by the general computing architecture 1700.

Referring to FIG. 17, the computer 1701 can be any of a variety of general purpose computers such as, for example, a server, a desktop computer, a laptop computer, a tablet computer or a mobile computing device. The computer 1701 can include a processing unit 1702, a system memory 1704 and a system bus 1706.

The processing unit 1702 can be or include one or more of any of various commercially available computer processors, which can each include one or more processing cores that can operate independently of each other. Additional co-processing units, such as a graphics processing unit 1703, also can be present in the computer.

The system memory 1704 can include volatile devices, such as dynamic random access memory (DRAM) or other random access memory devices. The system memory 1704 can also or alternatively include non-volatile devices, such as a read-only memory or flash memory.

The computer 1701 can include local non-volatile secondary storage 1708 such as a disk drive, solid state disk, or removable memory card. The local storage 1708 can include one or more removable and/or non-removable storage units. The local storage 1708 can be used to store an operating system that initiates and manages various applications that execute on the computer. The local storage 1708 can also be used to store special purpose software configured to implement the components of the embodiments disclosed herein and that can be executed as one or more applications under the operating system.

The computer 1701 can also include communication device(s) 1712 through which the computer communicates with other devices, such as one or more remote computers 1730, over wired and/or wireless computer networks 1718. Communications device(s) 1712 can include, for example, a network interface for communicating data over a wired computer network. The communication device(s) 1712 can include, for example, one or more radio transmitters for communications over Wi-Fi, Bluetooth, and/or mobile telephone networks.

The computer 1701 can also access network storage 1720 through the computer network 1718. The network storage can include, for example, a network attached storage device located on a local network, or cloud-based storage hosted at one or more remote data centers. The operating system and/or special purpose software can alternatively be stored in the network storage 1720.

The computer 1701 can have various input device(s) 1714 such as a keyboard, mouse, touchscreen, camera, microphone, accelerometer, thermometer, magnetometer, or any other sensor. Output device(s) 1716 such as a display, speakers, printer, or eccentric rotating mass vibration motor can also be included.

The various storage 1708, communication device(s) 1712, output device(s) 1716 and input device(s) 1714 can be integrated within a housing of the computer, or can be connected through various input/output interface devices on the computer, in which case the reference numbers 1708, 1712, 1714 and 1716 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

CONCLUSION

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing. In method claims, any reference characters are used for convenience of description only, and do not indicate a particular order for performing a method.

The invention claimed is:

1. A method performed by a computer system having at least one processor and a memory, the method comprising:

displaying to a design-user, through a computer user interface, a design interface for creating a packaged video segment having a plurality of overlays that overlay the video segment during presentation;

receiving from the design-user through the design interface, for each of the overlays, a specification of the each overlay comprising:

an overlay type;

a timing for displaying the overlay; and a specification of at least one item of content for display within the overlay;

wherein one or more of the plurality of overlays are interactive overlays, and wherein the received specification of each interactive overlay further comprises:

a specification of at least one end-user selectable feature for inclusion within the interactive overlay;

presenting to the design-user within the design interface a schematic representation of the plurality of overlays in conjunction with a timeline corresponding to a duration of the video segment, wherein one or more of the overlays is represented in the schematic representation by a visual indication along the timeline of a duration for displaying the overlay relative to playback of the video segment; and receiving from the design-user through the design interface, a specification of each of one or more links between overlays, wherein for each link of the one or more links between overlays:

the link links an end-user selectable feature of a source interactive overlay to a target overlay;

the link is visually indicated on the schematic representation; and during an end-user presentation of the packaged video segment, selection of an end-user selectable feature of the source interactive overlay by an end-user causes a display of the target overlay to the end-user.

2. The method of claim 1, further comprising:

receiving from the design-user through the user interface, for one finale overlay of the plurality of overlays, a specification indicating that the one finale overlay is to be presented upon completion of presentation of the video segment during the end-user presentation in response to a determination that the end-user has not interacted with any of the one or more interactive overlays.

3. The method of claim 1, further comprising:

receiving from the design-user through the user interface, for each of at least one overlay of the plurality of overlays, a no-interaction specification indicating that the each overlay is to be presented upon determining, during the end-user presentation of the packaged video segment, that the end-user has not yet interacted with any of the one or more interactive overlays.

4. The method of claim 3, wherein the no-interaction specification for at least one overlay further defines a playback time during presentation of the packaged video segment by which it is to be determined whether the end-user has not yet interacted with any of the one or more interactive overlays.

5. The method of claim 4, wherein the defined playback time for at least one overlay corresponds to an end of the video segment.

6. The method of claim 1, wherein the timing for displaying the overlay for at least one of the plurality of overlays is a timing relative to a start of playback of the video segment.

7. The method of claim 1, wherein the timing for displaying the overlay for at least one of the plurality of overlays is a timing relative to selection of an end-user selectable feature of a source interactive overlay.

8. The method of claim 1, further comprising:

maintaining a set of warning rules defining disallowed combinations of overlays, wherein the set of warning rules comprises:

a rule based on overlapping timing for displaying multiple overlays.

9. The method of claim 8, wherein the set of warning rules further comprises:

a rule based on overlapping positioning for displaying multiple overlays.

10. The method of claim 8, wherein the set of warning rules further comprises:

a rule based on overlapping positioning and timing for displaying multiple overlays.

11. The method of claim 10, wherein the set of warning rules accounts for links between overlays in determining whether multiple overlays can have overlapping positioning or timing.

12. The method of claim 1, further comprising:

presenting the packaged video segment to each end-user of a plurality of end-users, wherein the packaged video segment is presented to each end-user on a respective personal computing device;

in response to presenting the packaged video segment to the each end-user, receiving from the respective personal computing device user responses collected in association with presentation of the packaged video segment to the end-user;

aggregating user responses by the plurality of end-users; and presenting the aggregated user responses in the design interface.

13. The method of claim 12, further comprising:

displaying in the design interface a graph-based representation of the interactive overlays and one or more of the links between overlays showing all possible paths from a start of presentation of the packaged video segment to each interactive overlay, wherein the aggregated user responses for each interactive overlay are presented within a user interface feature representing the each interactive overlay as a node within the graph-based representation.

14. A computer system having at least one processor and a memory, wherein the memory has instructions stored thereon that are executed by the at least one processor and cause the computer system to perform the method of claim 1.

15. A non-transitory computer readable medium having instructions stored thereon, wherein the instructions are executed by the at least one processor and cause the at least one processor to perform the method of claim 1.

16. A method performed by a computer system having at least one processor and a memory, the method comprising:

displaying to a design-user, through a computer user interface, a design interface for creating a packaged video segment having a plurality of overlays that overlay the video segment during presentation;

receiving from the design-user through the design interface, for each of the overlays, a specification of the each overlay comprising:

an overlay type;

a timing for displaying the overlay; and a specification of at least one item of content for display within the overlay;

wherein one or more of the plurality of overlays are interactive overlays, and wherein the received specification of each interactive overlay further comprises:

a specification of at least one end-user selectable feature for inclusion within the interactive overlay;

presenting to the design-user within the design interface a schematic representation of the plurality of overlays in conjunction with a timeline corresponding to a duration of the video segment, wherein one or more of the overlays is represented in the schematic representation by a visual indication along the timeline of a duration for displaying the overlay relative to playback of the video segment;

for at least one target overlay of the plurality of overlays, receiving from the design-user through the design interface, a specification of a rule comprising a logical combination of one or more conditions, wherein satisfaction of the logical combination of one or more conditions during presentation of the packaged video segment to an end-user triggers a display of the target overlay to the end-user, and wherein each of the one or more conditions defines a set of one or more end-user selectable features of a referenced source interactive overlay of the plurality of overlays for which selection by the end-user satisfies the condition; and for a referenced source interactive overlay of a target overlay, displaying on the schematic representation a visual link between the target overlay and the referenced source interactive overlay.

17. The method of claim 16, further comprising:

presenting the packaged video segment to each end-user of a plurality of end-users, wherein the packaged video segment is presented to each end-user on a respective personal computing device;

in response to presenting the packaged video segment to the each end-user, receiving from the respective personal computing device user responses collected in association with presentation of the packaged video segment to the end-user;

aggregating user responses by the plurality of end-users; and presenting the aggregated user responses in the design interface.

18. The method of claim 16, further comprising:

maintaining a set of warning rules defining disallowed combinations of overlays, wherein the set of warning rules comprises:

a rule based on overlapping timing for displaying multiple overlays.

19. A computer system having at least one processor and a memory, wherein the memory has instructions stored thereon that are executed by the at least one processor and cause the computer system to perform the method of claim 16.

20. A non-transitory computer readable medium having instructions stored thereon, wherein the instructions are executed by at least one processor and cause the at least one processor to perform the method of claim 16.

* * * * *